US012647999B2

(12) United States Patent
Thyagarajan et al.

(10) Patent No.: US 12,647,999 B2
(45) Date of Patent: Jun. 2, 2026

(54) SUB-BAND INDICATION IN DOWNLINK CONTROL INFORMATION IN SHARED RADIO FREQUENCY SPECTRUM BAND

(71) Applicant: Qualcomm Incorporated, San Diego, CA (US)

(72) Inventors: Ananta Narayanan Thyagarajan, Bangalore (IN); Jing Sun, San Diego, CA (US); Kapil Bhattad, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/774,568

(22) PCT Filed: Nov. 17, 2020

(86) PCT No.: PCT/US2020/060912
§ 371 (c)(1),
(2) Date: May 5, 2022

(87) PCT Pub. No.: WO2021/101906
PCT Pub. Date: May 27, 2021

(65) Prior Publication Data
US 2022/0393845 A1     Dec. 8, 2022

(30) Foreign Application Priority Data
Nov. 18, 2019    (IN) .............................. 201941046919

(51) Int. Cl.
*H04L 5/00*          (2006.01)
*H04W 16/14*         (2009.01)
(Continued)

(52) U.S. Cl.
CPC ........... *H04W 72/232* (2023.01); *H04L 5/001* (2013.01); *H04L 5/0098* (2013.01); *H04W 16/14* (2013.01);
(Continued)

(58) Field of Classification Search
CPC ............ H04L 5/0001–0098; H04W 8/18–245; H04W 16/02–16; H04W 28/02–26;
(Continued)

(56) References Cited

U.S. PATENT DOCUMENTS

2019/0222404 A1     7/2019  Ang et al.
2019/0306923 A1*   10/2019  Xiong ................... H04W 72/23
(Continued)

FOREIGN PATENT DOCUMENTS

CN        107453840 A     12/2017
EP          2905914 B1     8/2018
(Continued)

OTHER PUBLICATIONS

Nokia, et al., "Remaining NR-U enhancements for uplink signals and channels", 3GPP Draft, R1-1910594, vol. RAN WG1, No. Chongqing, P.R, China, Oct. 14, 2019-Oct. 20, 2019, Oct. 7, 2019 (Oct. 7, 2019), XP051808948, 13 Pages. (Year: 2019).*
(Continued)

*Primary Examiner* — Timothy J Weidner
(74) *Attorney, Agent, or Firm* — QUALCOMM Incorporated

(57) ABSTRACT

Methods, systems, and devices for wireless communications are described where a system bandwidth within a shared radio frequency spectrum band may be divided into multiple sub-bands. A base station may use a fallback downlink control information format to provide a resource grant to a user equipment, where the fallback downlink control information has a predetermined number of bits. To provide an
(Continued)

indication of one or more of the sub-bands that are to be used for uplink communications when using fallback downlink control information, an explicit or implicit indication may be provided. Such sub-band indication may allow for the user equipment to use a particular sub-band that is available for transmissions in a shared radio frequency spectrum band. Indications of one or more sub-bands may be provided explicitly by a sub-band indication field in a fallback downlink control information, or implicitly by one or more downlink transmissions of a base station.

28 Claims, 27 Drawing Sheets

(51) Int. Cl.

| | |
|---|---|
| *H04W 28/06* | (2009.01) |
| *H04W 72/0453* | (2023.01) |
| *H04W 72/23* | (2023.01) |
| *H04W 72/231* | (2023.01) |
| *H04W 72/232* | (2023.01) |
| *H04W 74/00* | (2009.01) |
| *H04W 74/0808* | (2024.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ....... *H04W 28/06* (2013.01); *H04W 72/0453* (2013.01); *H04W 72/23* (2023.01); *H04W 72/231* (2023.01); *H04W 74/006* (2013.01); *H04W 74/0808* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 48/02–20; H04W 56/001–0025; H04W 72/02–569; H04W 74/002–0891; H04W 76/10–50; H04W 84/02–16; H04W 88/02–12; H04W 92/02–04; H04W 92/10
See application file for complete search history.

(56) References Cited

U.S. PATENT DOCUMENTS

2019/0313378 A1* 10/2019 Abdoli .................. H04W 72/23
2022/0014314 A1* 1/2022 Wang ................ H04W 72/1268

FOREIGN PATENT DOCUMENTS

| | | |
|---|---|---|
| TW | 201944748 A | 11/2019 |
| WO | WO-2019098019 A1 | 5/2019 |
| WO | WO-2019193768 A1 | 10/2019 |

OTHER PUBLICATIONS

Taiwan Search Report—TW109140304—TIPO—Mar. 4, 2024.
Ericsson: "Summary of 7.3.1.4 (DCI Contents and Formats)", 3GPP Draft, R1-1721355, Summary of 7.3.1.4 (DCI Content), vol. RAN WG1, No. Reno, NV, US, Nov. 27, 2017-Dec. 1, 2017, Nov. 28, 2017 (Nov. 28, 2017), XP051363847, 6 Pages, Retrieved from the Internet: URL: http://www.3gpp.org/ftp/Meetings%5F3GPP%5FSYNC/RAN1/Docs/ the whole document.
International Search Report and Written Opinion—PCT/US2020/060912—ISA/EPO—Feb. 2, 2021.
Nokia, et al., "Remaining NR-U enhancements for uplink signals and channels", 3GPP Draft, R1-1910594, vol. RAN WG1, No. Chongqing, P.R, China, Oct. 14, 2019-Oct. 20, 2019, Oct. 7, 2019 (Oct. 7, 2019), XP051808948, 13 Pages, Retrieved from the Internet: URL: https://ftp.3gpp.org/tsg_ran/WG1_RL1/TSGR1_98b/Docs/R1-1910594.zip. Sec. 2 Sec. 3.
Ericsson: "Summary of 7.3.1.4 (DCI Contents and Formats)", 3GPP TSG RAN WG1 AdHoc 1801, R1-1801012, Vancouver, Canada, Jan. 22, 2018-Jan. 26, 2018, Jan. 23, 2018, 11 Pages, Part 1.
Nokia, et al., "Remaining NR-U Enhancements for Uplink Signals and Channels", 3GPP TSG RAN WG1 #98bis, R1-1910594, Chongqing, P.R. China, Oct. 14, 2019-Oct. 20, 2019, Oct. 7, 2019, 13 Pages, Part 1.

* cited by examiner

Configuration 215

DCI 220

Uplink Transmission 225

200

400

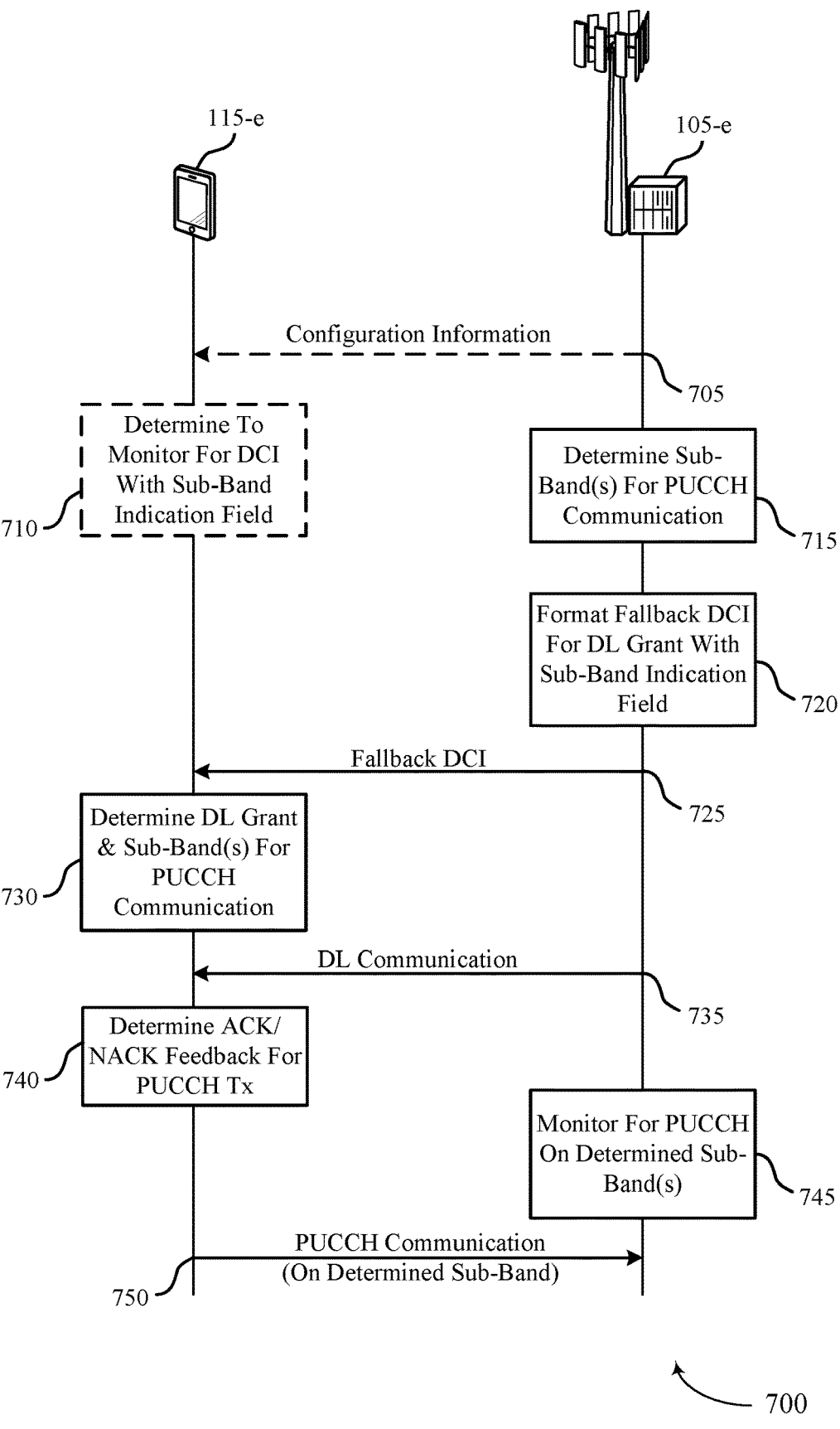

Configuration Information

705

Determine To
Monitor For DCI
With Sub-Band
Indication Field

710

Determine Sub-
Band(s) For PUCCH
Communication

715

Format Fallback DCI
For DL Grant With
Sub-Band Indication
Field

720

Fallback DCI

725

Determine DL Grant
& Sub-Band(s) For
PUCCH
Communication

730

DL Communication

735

Determine ACK/
NACK Feedback For
PUCCH Tx

740

Monitor For PUCCH
On Determined Sub-
Band(s)

745

PUCCH Communication
(On Determined Sub-Band)

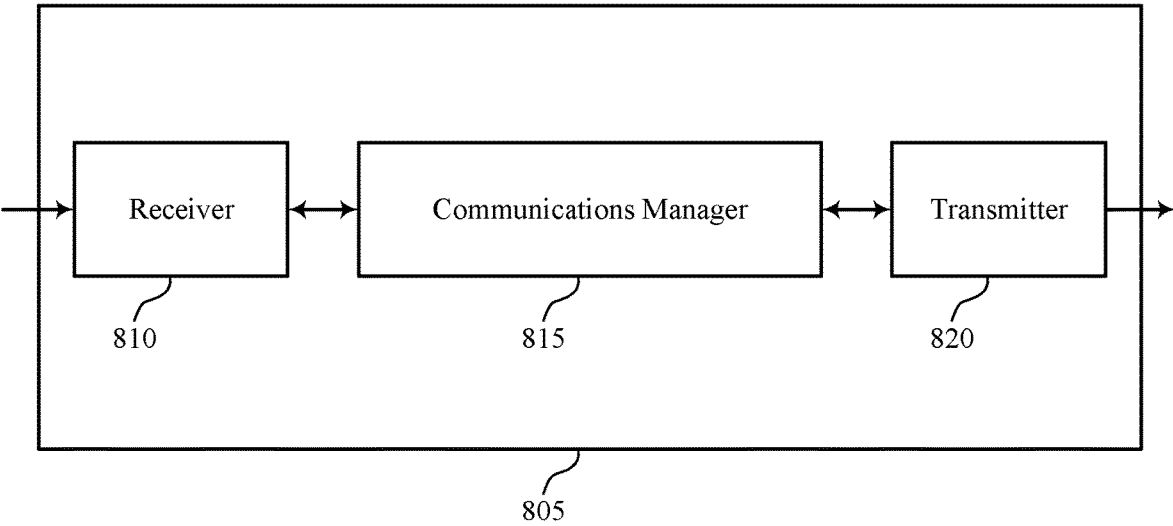
FIG. 8

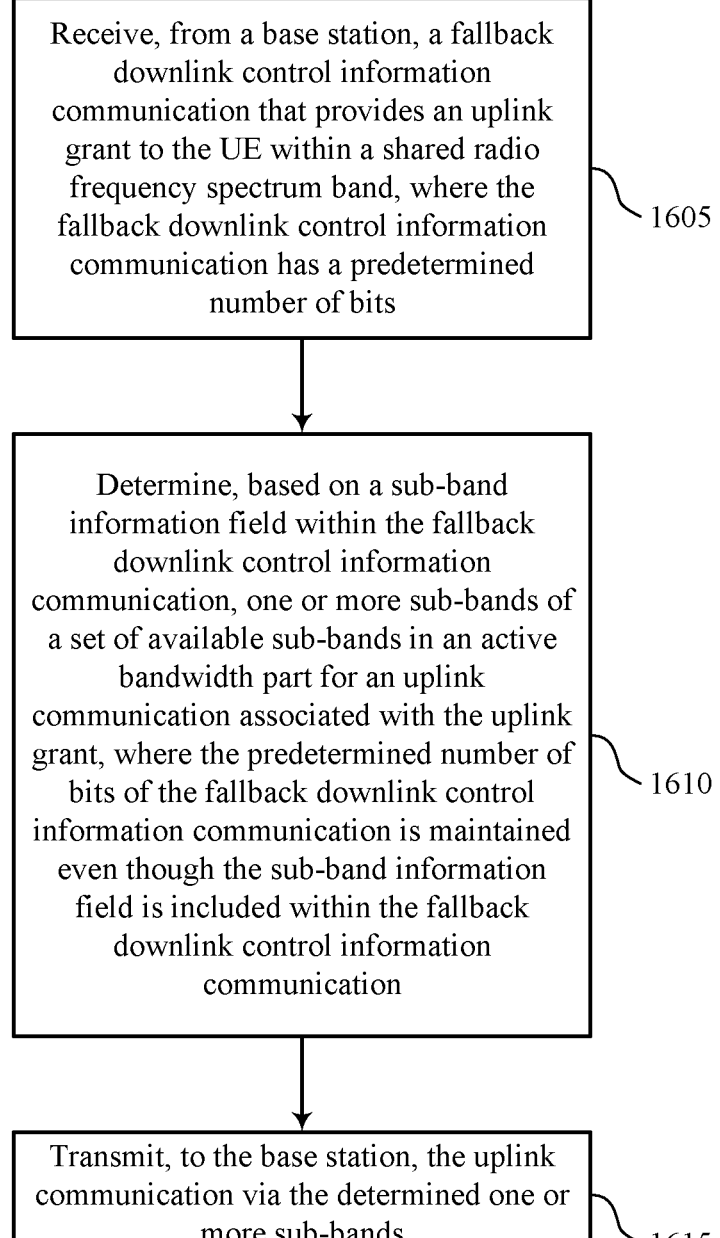

Receive, from a base station, a fallback downlink control information communication that provides an uplink grant to the UE within a shared radio frequency spectrum band, where the fallback downlink control information communication has a predetermined number of bits

1605

Determine, based on a sub-band information field within the fallback downlink control information communication, one or more sub-bands of a set of available sub-bands in an active bandwidth part for an uplink communication associated with the uplink grant, where the predetermined number of bits of the fallback downlink control information communication is maintained even though the sub-band information field is included within the fallback downlink control information communication

1610

Transmit, to the base station, the uplink communication via the determined one or more sub-bands

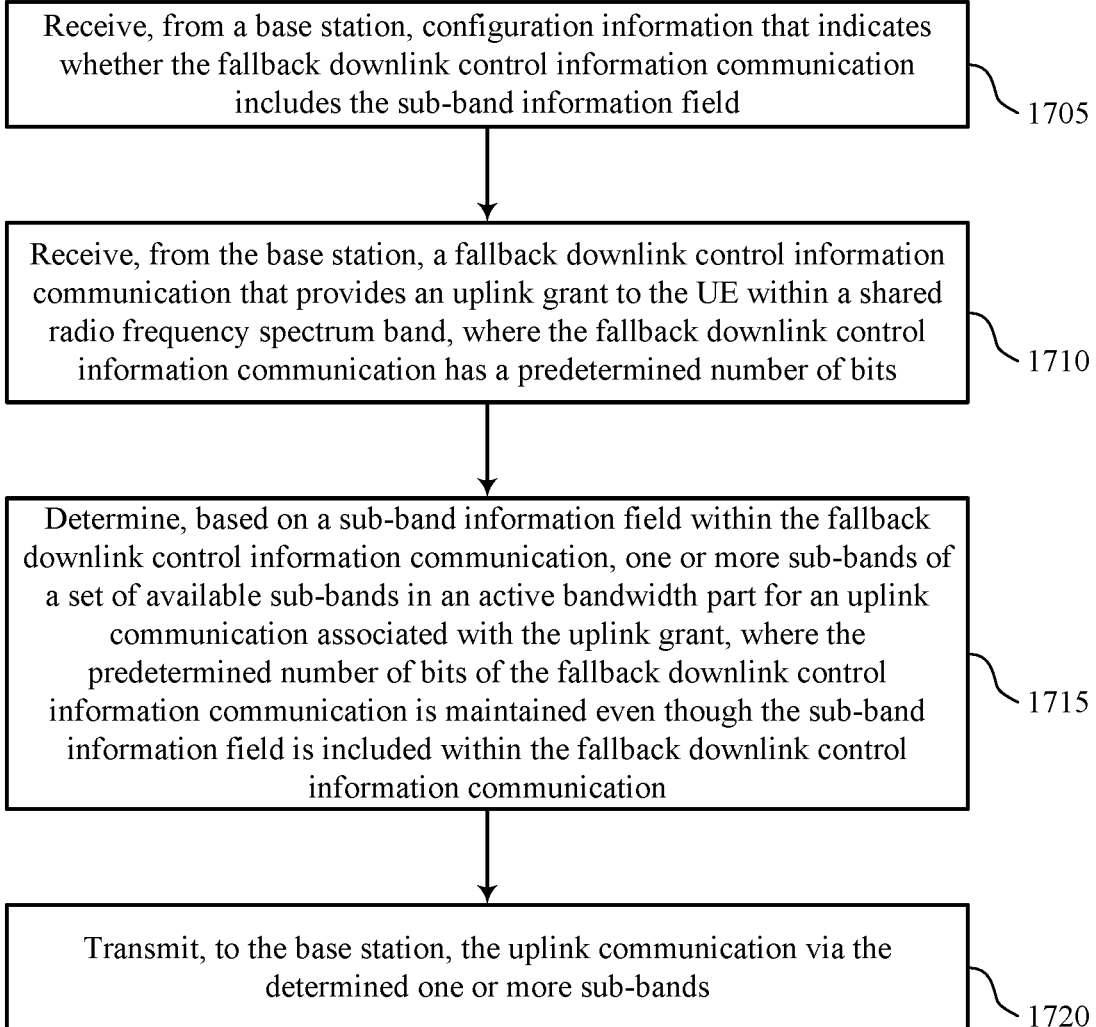

Receive, from a base station, configuration information that indicates whether the fallback downlink control information communication includes the sub-band information field — 1705

Receive, from the base station, a fallback downlink control information communication that provides an uplink grant to the UE within a shared radio frequency spectrum band, where the fallback downlink control information communication has a predetermined number of bits — 1710

Determine, based on a sub-band information field within the fallback downlink control information communication, one or more sub-bands of a set of available sub-bands in an active bandwidth part for an uplink communication associated with the uplink grant, where the predetermined number of bits of the fallback downlink control information communication is maintained even though the sub-band information field is included within the fallback downlink control information communication — 1715

Transmit, to the base station, the uplink communication via the determined one or more sub-bands — 1720

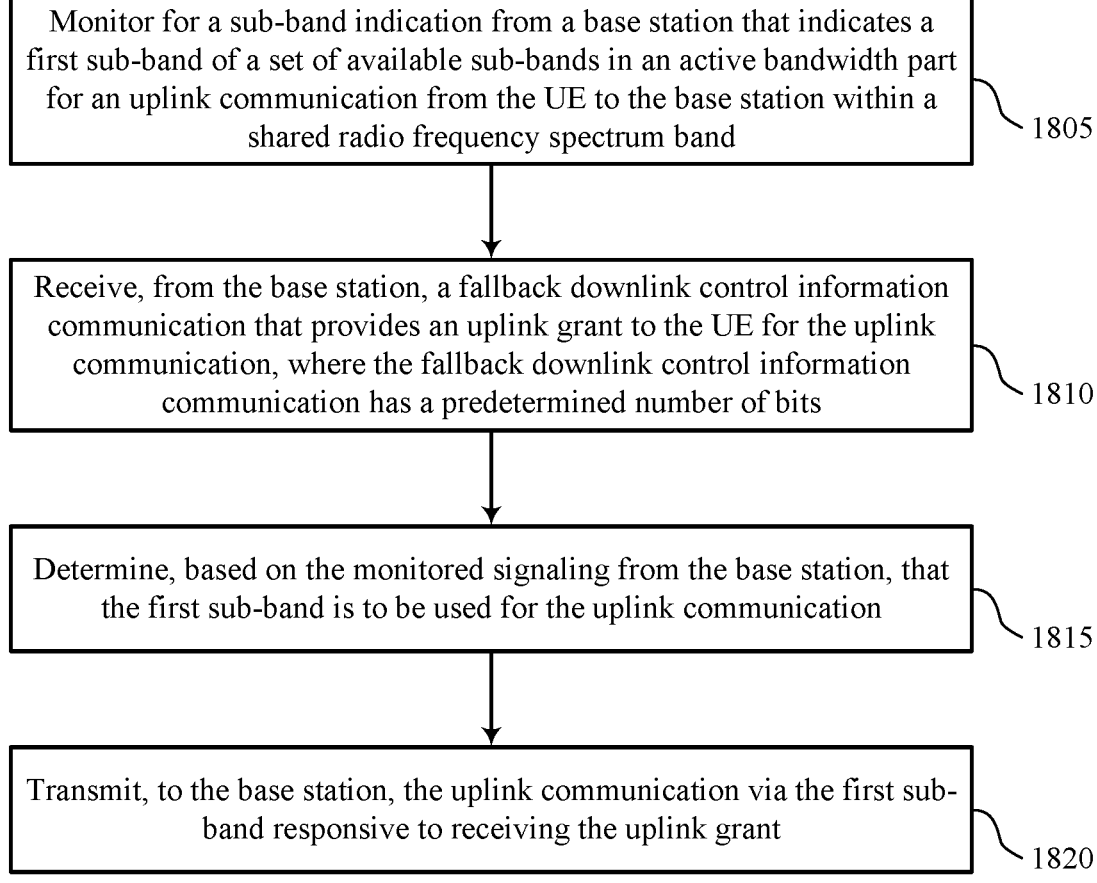

Monitor for a sub-band indication from a base station that indicates a first sub-band of a set of available sub-bands in an active bandwidth part for an uplink communication from the UE to the base station within a shared radio frequency spectrum band — 1805

Receive, from the base station, a fallback downlink control information communication that provides an uplink grant to the UE for the uplink communication, where the fallback downlink control information communication has a predetermined number of bits — 1810

Determine, based on the monitored signaling from the base station, that the first sub-band is to be used for the uplink communication — 1815

Transmit, to the base station, the uplink communication via the first sub-band responsive to receiving the uplink grant — 1820

Receive configuration information that indicates whether to monitor for the sub-band indication

╲ 1905

Monitor for a sub-band indication from a base station that indicates a first sub-band of a set of available sub-bands in an active bandwidth part for an uplink communication from the UE to the base station within a shared radio frequency spectrum band

╲ 1910

Receive, from the base station, a fallback downlink control information communication that provides an uplink grant to the UE for the uplink communication, where the fallback downlink control information communication has a predetermined number of bits

╲ 1915

Determine, based on the monitored signaling from the base station, that the first sub-band is to be used for the uplink communication

╲ 1920

Transmit, to the base station, the uplink communication via the first sub-band responsive to receiving the uplink grant

╲ 1925

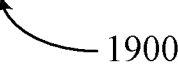

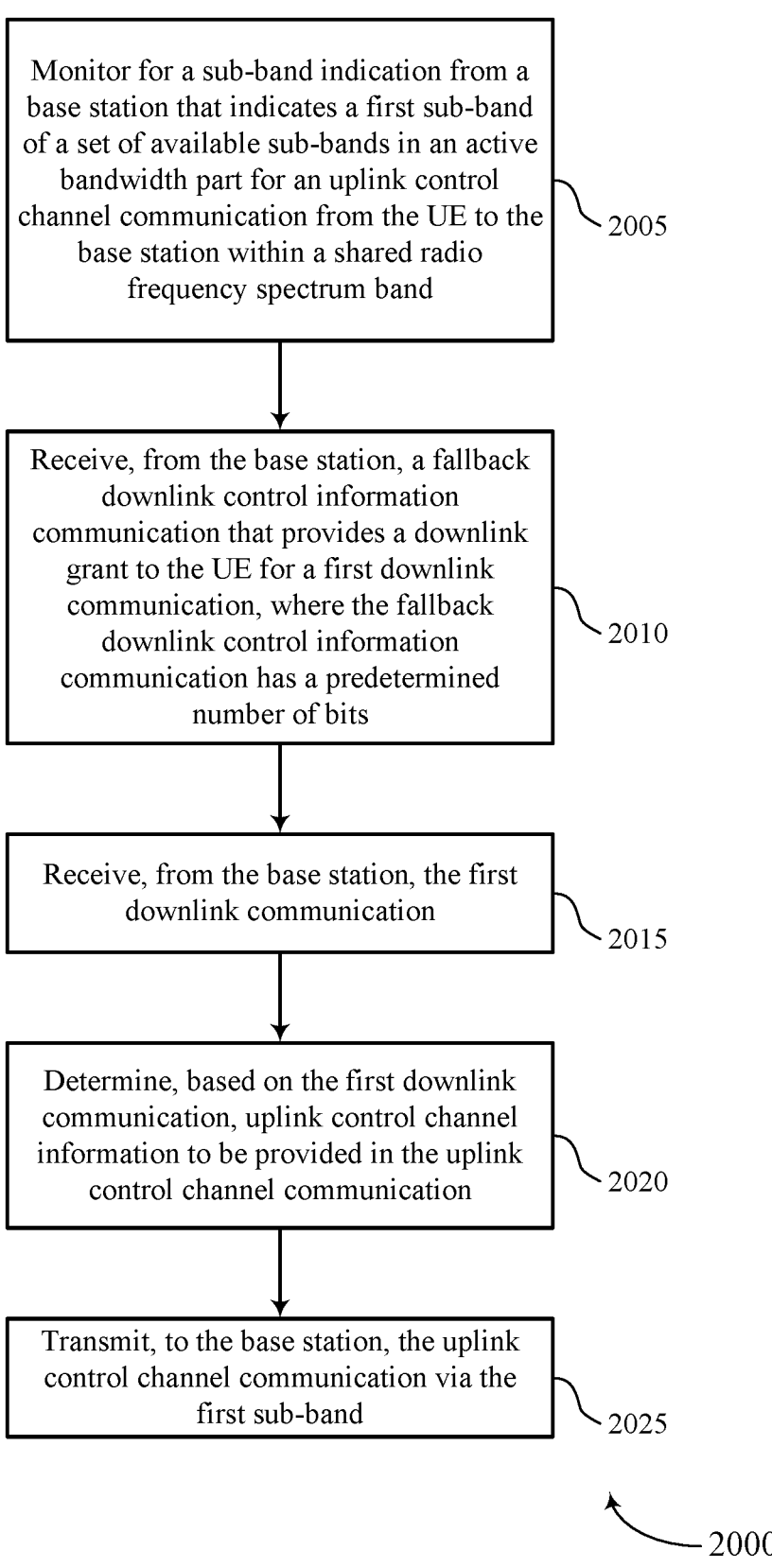

Monitor for a sub-band indication from a base station that indicates a first sub-band of a set of available sub-bands in an active bandwidth part for an uplink control channel communication from the UE to the base station within a shared radio frequency spectrum band
2005

Receive, from the base station, a fallback downlink control information communication that provides a downlink grant to the UE for a first downlink communication, where the fallback downlink control information communication has a predetermined number of bits
2010

Receive, from the base station, the first downlink communication
2015

Determine, based on the first downlink communication, uplink control channel information to be provided in the uplink control channel communication
2020

Transmit, to the base station, the uplink control channel communication via the first sub-band
2025

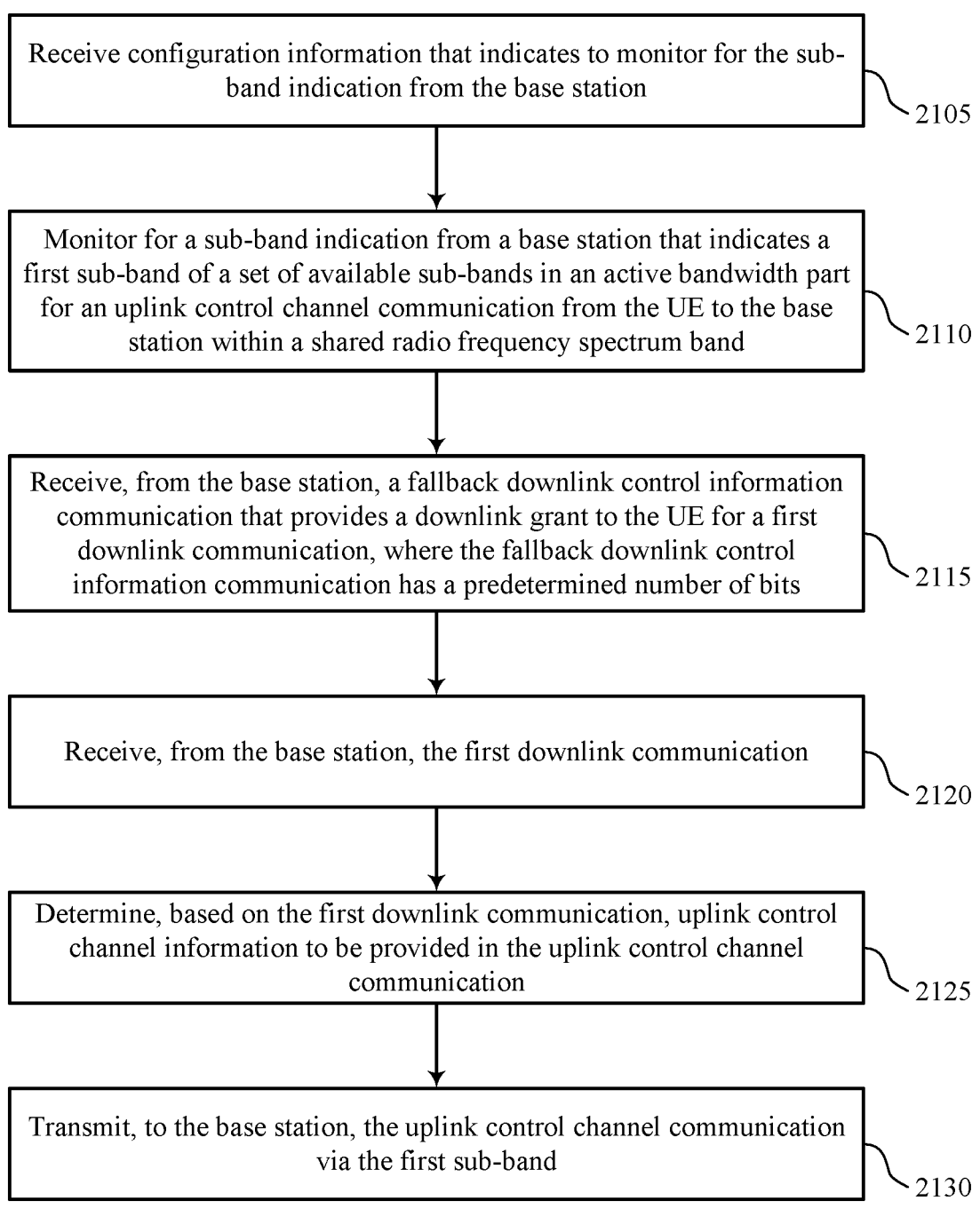

Receive configuration information that indicates to monitor for the sub-band indication from the base station ⟋ 2105

Monitor for a sub-band indication from a base station that indicates a first sub-band of a set of available sub-bands in an active bandwidth part for an uplink control channel communication from the UE to the base station within a shared radio frequency spectrum band ⟋ 2110

Receive, from the base station, a fallback downlink control information communication that provides a downlink grant to the UE for a first downlink communication, where the fallback downlink control information communication has a predetermined number of bits ⟋ 2115

Receive, from the base station, the first downlink communication ⟋ 2120

Determine, based on the first downlink communication, uplink control channel information to be provided in the uplink control channel communication ⟋ 2125

Transmit, to the base station, the uplink control channel communication via the first sub-band ⟋ 2130

Receive, from a base station, a fallback downlink control information communication that provides a downlink grant to the UE for a first downlink communication within a shared radio frequency spectrum band, where the fallback downlink control information communication has a predetermined number of bits

2205

Determine, based on a sub-band information field within the fallback downlink control information communication, one or more sub-bands of a set of available sub-bands in an active bandwidth part for an uplink control channel communication associated with the downlink grant, where the predetermined number of bits of the fallback downlink control information communication is maintained even though the sub-band information field is included within the fallback downlink control information communication

2210

Receive, from the base station, the first downlink communication

2215

Determine, based on the first downlink communication, uplink control channel information to be provided in the uplink control channel communication

2220

Transmit, to the base station, the uplink control channel communication via the determined one or more sub-bands

2225

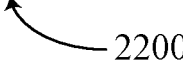

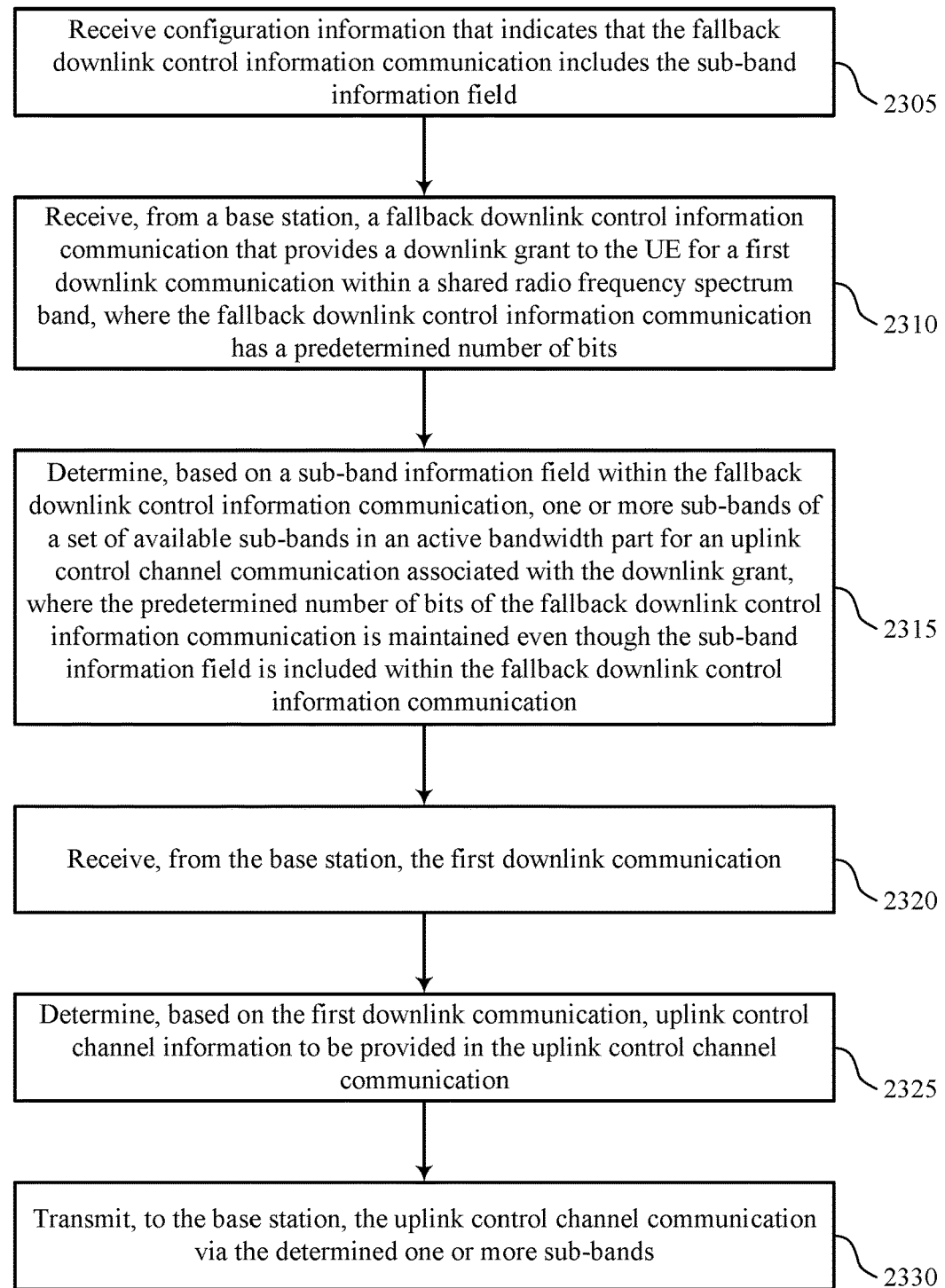

Receive configuration information that indicates that the fallback downlink control information communication includes the sub-band information field
2305

Receive, from a base station, a fallback downlink control information communication that provides a downlink grant to the UE for a first downlink communication within a shared radio frequency spectrum band, where the fallback downlink control information communication has a predetermined number of bits
2310

Determine, based on a sub-band information field within the fallback downlink control information communication, one or more sub-bands of a set of available sub-bands in an active bandwidth part for an uplink control channel communication associated with the downlink grant, where the predetermined number of bits of the fallback downlink control information communication is maintained even though the sub-band information field is included within the fallback downlink control information communication
2315

Receive, from the base station, the first downlink communication
2320

Determine, based on the first downlink communication, uplink control channel information to be provided in the uplink control channel communication
2325

Transmit, to the base station, the uplink control channel communication via the determined one or more sub-bands
2330

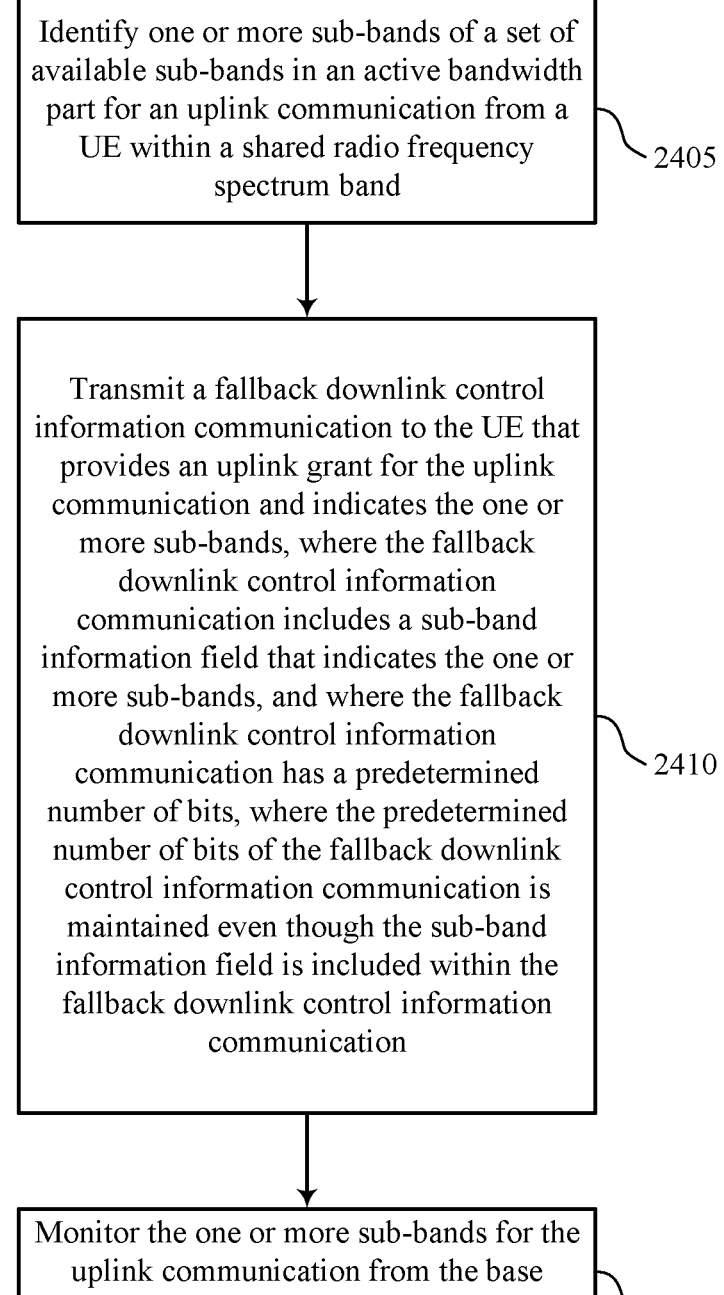

Identify one or more sub-bands of a set of available sub-bands in an active bandwidth part for an uplink communication from a UE within a shared radio frequency spectrum band ⎞ 2405

Transmit a fallback downlink control information communication to the UE that provides an uplink grant for the uplink communication and indicates the one or more sub-bands, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication ⎞ 2410

Monitor the one or more sub-bands for the uplink communication from the base station ⎞ 2415

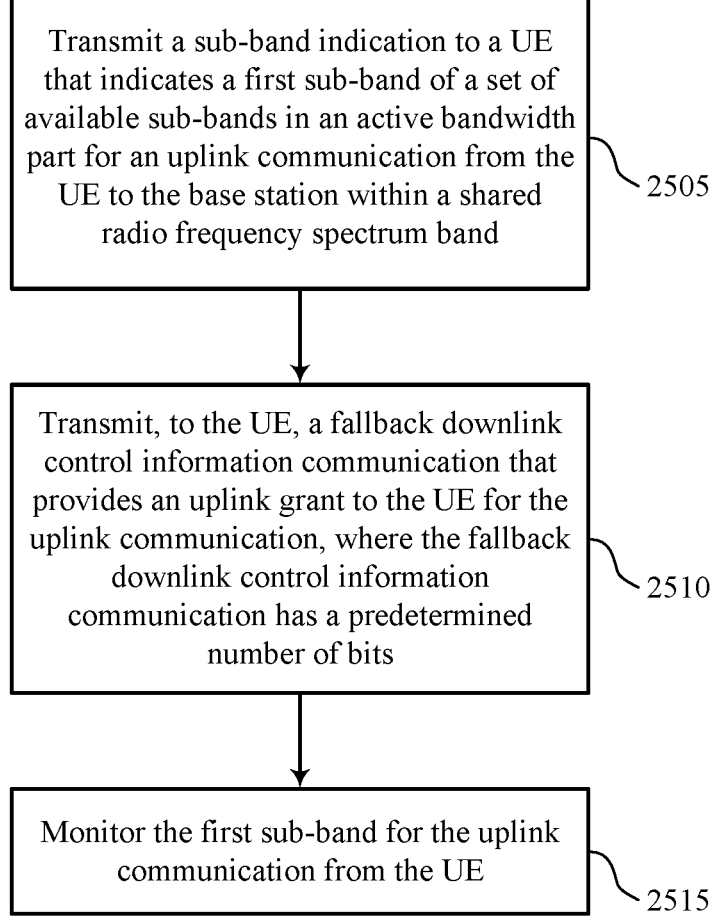

Transmit a sub-band indication to a UE that indicates a first sub-band of a set of available sub-bands in an active bandwidth part for an uplink communication from the UE to the base station within a shared radio frequency spectrum band

2505

Transmit, to the UE, a fallback downlink control information communication that provides an uplink grant to the UE for the uplink communication, where the fallback downlink control information communication has a predetermined number of bits

2510

Monitor the first sub-band for the uplink communication from the UE

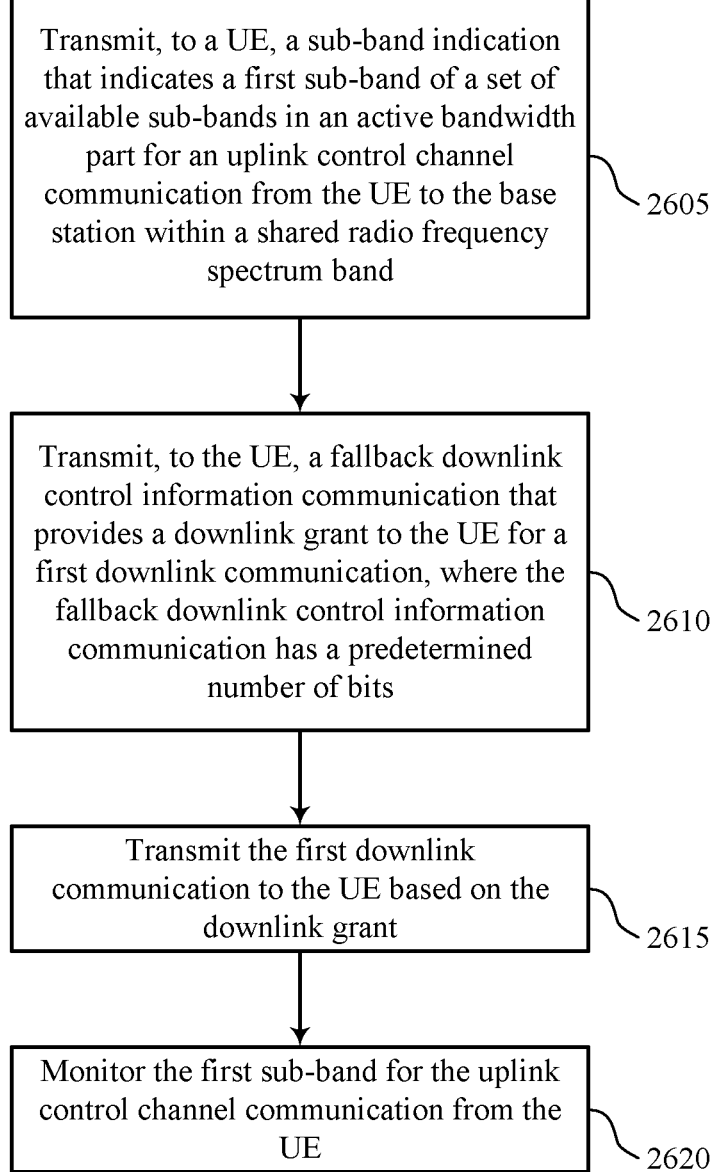

Transmit, to a UE, a sub-band indication that indicates a first sub-band of a set of available sub-bands in an active bandwidth part for an uplink control channel communication from the UE to the base station within a shared radio frequency spectrum band

2605

Transmit, to the UE, a fallback downlink control information communication that provides a downlink grant to the UE for a first downlink communication, where the fallback downlink control information communication has a predetermined number of bits

2610

Transmit the first downlink communication to the UE based on the downlink grant

2615

Monitor the first sub-band for the uplink control channel communication from the UE

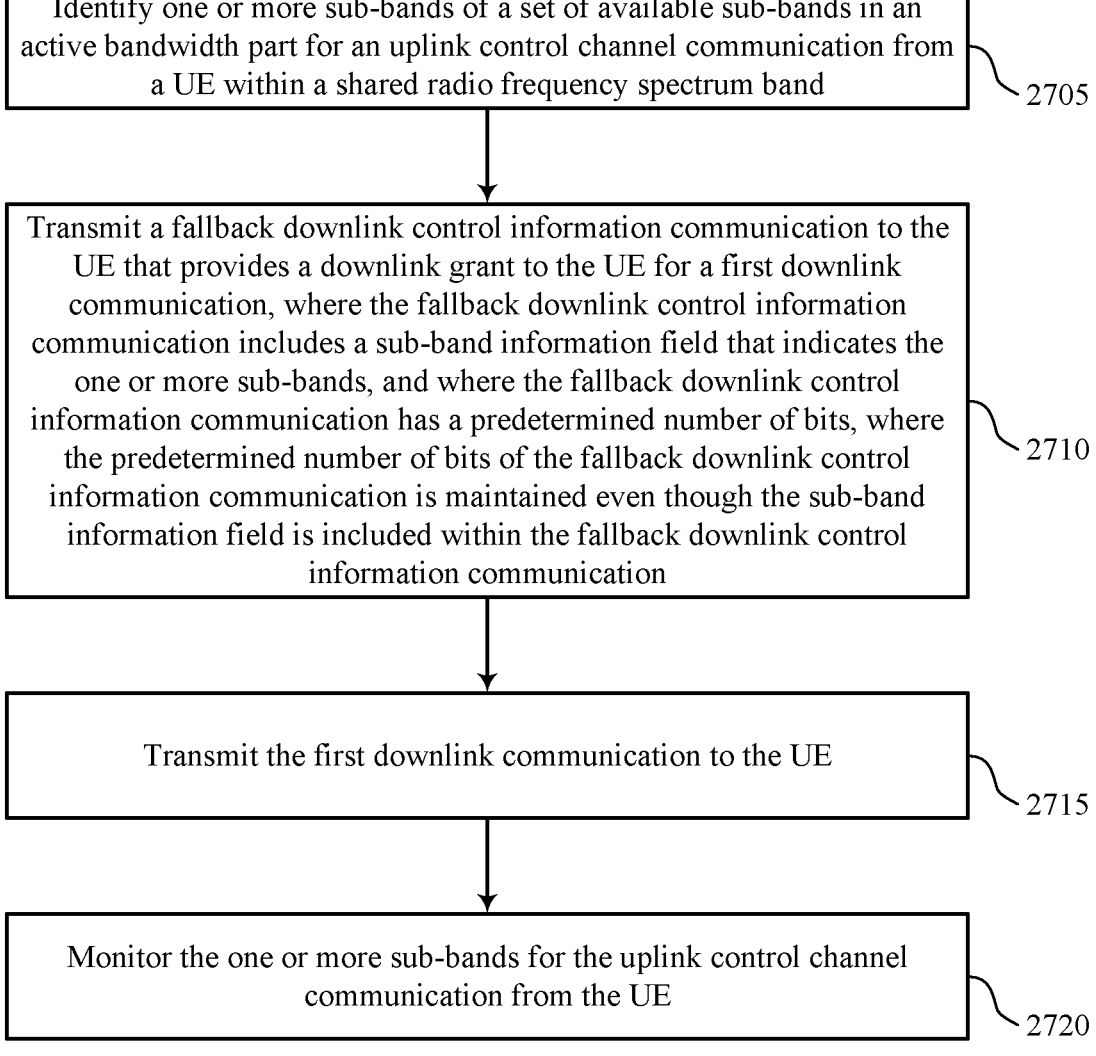

Identify one or more sub-bands of a set of available sub-bands in an active bandwidth part for an uplink control channel communication from a UE within a shared radio frequency spectrum band

2705

Transmit a fallback downlink control information communication to the UE that provides a downlink grant to the UE for a first downlink communication, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication

2710

Transmit the first downlink communication to the UE

2715

Monitor the one or more sub-bands for the uplink control channel communication from the UE

SUB-BAND INDICATION IN DOWNLINK CONTROL INFORMATION IN SHARED RADIO FREQUENCY SPECTRUM BAND

CROSS REFERENCE TO RELATED APPLICATIONS

The present Application is a 371 national stage filing of International PCT Application No. PCT/US2020/060912 by Thyagarajan et al., entitled "SUB-BAND INDICATION IN DOWNLINK CONTROL INFORMATION IN SHARED RADIO FREQUENCY SPECTRUM BAND," filed Nov. 17, 2020; and claims priority to India Provisional Patent Application No. 201941046919 by Thyagarajan et al., entitled "SUB-BAND INDICATION IN DOWNLINK CONTROL INFORMATION IN SHARED RADIO FRE-QUENCY SPECTRUM BAND," filed Nov. 18, 2019, each of which is assigned to the assignee hereof, and each of which is expressly incorporated by reference in its entirety herein.

BACKGROUND

The following relates generally to wireless communications, and more specifically to sub-band indication in downlink control information in shared radio frequency spectrum band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, UEs and base stations may use a portion of a radio frequency spectrum band, which may be referred to as a bandwidth part (BWP), for communications. Further, in some cases, the BWP may be in a shared radio frequency spectrum band in which various different users may access the radio frequency spectrum band using con-tention-based access techniques (e.g., using a listen-before-talk (LBT) procedure). In some cases, a BWP may be divided into multiple sub-bands, and communications between UEs and base stations may use one or more sub-bands within a BWP. In cases where communications use a shared radio frequency spectrum band, the particular sub-bands that are available for communications may change at some points. Thus, efficient techniques to maintain communications between base stations and UEs when sub-bands change would help to enhance system operation and efficiency.

SUMMARY

The present disclosure relates to methods, systems, devices, and apparatuses that support sub-band indication in downlink control information in a shared radio frequency spectrum band. Various aspects of the disclosure provide for sub-band indication when a base station uses fallback down-link control information (DCI) to provide a grant of uplink or downlink resources to a user equipment (UE). In some aspects, multiple DCI formats may be used to provide an indication of a resource grant for an uplink communication from a UE to a base station (e.g., physical uplink shared channel (PUSCH) resources), or for a downlink communi-cation from the base station to the UE (e.g., physical downlink shared channel (PDSCH) resources). Such mul-tiple DCI formats may include fallback DCI formats that have a predetermined number of bits, and non-fallback DCI formats in which different instances of DCI may have different numbers of bits based on particular information to be provided in a particular grant.

In some aspects of the disclosure, fallback DCI may include a sub-band indication field that may explicitly indicate that one or more sub-bands are to be used for an associated uplink or downlink transmission. In some cases, fallback DCI may provide an uplink grant, and may have a predetermined number of bits that is a same number of bits as a fallback DCI that provides a downlink grant. Such fallback DCI that provides an uplink grant may include the sub-band indication field while still maintaining the same number of predetermined bits. In some aspects, the fallback DCI that provides the downlink grant may have a number of padding bits, which may be reduced by a number of bits of the sub-band indication field when the sub-band indication field is included in the fallback DCI. Additionally or alter-natively, the fallback DCI may provide a downlink grant and may include a sub-band indication field that identifies one or more sub-bands for uplink control channel communications of the UE that are associated with the downlink grant (e.g., acknowledgment feedback information transmitted by the UE).

In some aspects of the disclosure, an implicit indication of a sub-band for transmission of an uplink communication may be provided. In such aspects, a UE may monitor for a downlink transmission from a base station, which may provide an indication of the sub-band that is to be used. In some cases, the indication of the sub-band may be provided by a physical uplink control channel (PUCCH) resource indicator (PRI) field of the fallback DCI, where the sub-band for the uplink communication may correspond to a sub-band of a PUCCH resource indicated from a table entry identified by the PRI field. In some cases, the sub-band may be based on a sub-band used to transmit a synchronization signal block (SSB), a sub-band indicated in a physical broadcast channel (PBCH), a sub-band indicated in a remaining mini-mum system information (RMSI) communication, a sub-band used to transmit the fallback DCI, or a lowest sub-band used to transmit the fallback DCI. The UE, responsive to the fallback DCI, may transmit an uplink communication using the indicated sub-band.

A method is described. The method may include receiv-ing, from a base station, a fallback downlink control infor-mation communication that provides an uplink grant to the user equipment (UE) within a shared radio frequency spec-trum band, where the fallback downlink control information communication has a predetermined number of bits, deter-mining, based on a sub-band information field within the fallback downlink control information communication, one or more sub-bands of a set of multiple available sub-bands in an active bandwidth part for an uplink communication associated with the uplink grant, where the predetermined number of bits of the fallback downlink control information communication is maintained even though the sub-band information field is included within the fallback downlink control information communication, and transmitting, to the base station, the uplink communication via the determined one or more sub-bands.

An apparatus is described. The apparatus may include a processor, memory in electronic communication with the processor, and instructions stored in the memory. The instructions may be executable by the processor to cause the apparatus to receive, from a base station, a fallback downlink control information communication that provides an uplink grant to the UE within a shared radio frequency spectrum band, where the fallback downlink control information communication has a predetermined number of bits, determine, based on a sub-band information field within the fallback downlink control information communication, one or more sub-bands of a set of multiple available sub-bands in an active bandwidth part for an uplink communication associated with the uplink grant, where the predetermined number of bits of the fallback downlink control information communication is maintained even though the sub-band information field is included within the fallback downlink control information communication, and transmit, to the base station, the uplink communication via the determined one or more sub-bands.

Another apparatus is described. The apparatus may include means for receiving, from a base station, a fallback downlink control information communication that provides an uplink grant to the UE within a shared radio frequency spectrum band, where the fallback downlink control information communication has a predetermined number of bits, means for determining, based on a sub-band information field within the fallback downlink control information communication, one or more sub-bands of a set of multiple available sub-bands in an active bandwidth part for an uplink communication associated with the uplink grant, where the predetermined number of bits of the fallback downlink control information communication is maintained even though the sub-band information field is included within the fallback downlink control information communication, and means for transmitting, to the base station, the uplink communication via the determined one or more sub-bands.

A non-transitory computer-readable medium storing code is described. The code may include instructions executable by a processor to receive, from a base station, a fallback downlink control information communication that provides an uplink grant to the UE within a shared radio frequency spectrum band, where the fallback downlink control information communication has a predetermined number of bits, determine, based on a sub-band information field within the fallback downlink control information communication, one or more sub-bands of a set of multiple available sub-bands in an active bandwidth part for an uplink communication associated with the uplink grant, where the predetermined number of bits of the fallback downlink control information communication is maintained even though the sub-band information field is included within the fallback downlink control information communication, and transmit, to the base station, the uplink communication via the determined one or more sub-bands.

In some aspects of the method, apparatuses, and non-transitory computer-readable medium described herein, the fallback downlink control information communication may have a fallback downlink control information format, and the predetermined number of bits may be based on a length of a separate fallback downlink control information format for a downlink grant to the UE.

Some aspects of the method, apparatuses, and non-transitory computer-readable medium described herein may further include operations, features, means, or instructions for receiving, from the base station, configuration information that indicates whether the fallback downlink control information communication includes the sub-band information field.

In some aspects of the method, apparatuses, and non-transitory computer-readable medium described herein, the configuration information may be received in radio resource control signaling, in remaining minimum system information signaling, in a physical broadcast channel transmission, or any combinations thereof.

In some aspects of the method, apparatuses, and non-transitory computer-readable medium described herein, the sub-band information field may be located adjacent to a frequency division multiplexing resource assignment field in the fallback downlink control information communication, or may be located subsequent to a latest information field in the fallback downlink control information communication that may be present in an absence of the sub-band information field from the fallback downlink control information communication.

In some aspects of the method, apparatuses, and non-transitory computer-readable medium described herein, the sub-band information field occupies one or more bits that may be used as zero-padding bits when the sub-band information field may be absent from the fallback downlink control information communication.

In some aspects of the method, apparatuses, and non-transitory computer-readable medium described herein, a number of bits in the sub-band information field may be determined based on a number of sub-bands of the set of multiple available sub-bands.

In some aspects of the method, apparatuses, and non-transitory computer-readable medium described herein, the number of bits in the sub-band information field corresponds to a number of sub-bands in the active bandwidth part, a number of sub-bands in an initial bandwidth part used to establish a connection between the UE and the base station, may be a predetermined number of sub-bands, may be based on a maximum number of sub-bands that may be supported in a largest configurable bandwidth, or any combinations thereof.

In some aspects of the method, apparatuses, and non-transitory computer-readable medium described herein, the sub-band information field may be a bitmap having a bit length that corresponds to a number of sub-bands of the set of multiple available sub-bands.

In some aspects of the method, apparatuses, and non-transitory computer-readable medium described herein, the sub-band information field may be a bitfield, and different available values of the bitfield may be mapped to different contiguous sets of sub-bands.

A method is described. The method may include monitoring for a sub-band indication from a base station that indicates a first sub-band of a set of multiple available sub-bands in an active bandwidth part for an uplink communication from the UE to the base station within a shared radio frequency spectrum band, receiving, from the base station, a fallback downlink control information communication that provides an uplink grant to the UE for the uplink communication, where the fallback downlink control information communication has a predetermined number of bits, determining, based on the monitored signaling from the base station, that the first sub-band is to be used for the uplink communication, and transmitting, to the base station, the uplink communication via the first sub-band responsive to receiving the uplink grant.

An apparatus is described. The apparatus may include a processor, memory in electronic communication with the processor, and instructions stored in the memory. The instructions may be executable by the processor to cause the apparatus to monitor for a sub-band indication from a base station that indicates a first sub-band of a set of multiple available sub-bands in an active bandwidth part for an uplink communication from the UE to the base station within a shared radio frequency spectrum band, receive, from the base station, a fallback downlink control information communication that provides an uplink grant to the UE for the uplink communication, where the fallback downlink control information communication has a predetermined number of bits, determine, based on the monitored signaling from the base station, that the first sub-band is to be used for the uplink communication, and transmit, to the base station, the uplink communication via the first sub-band responsive to receiving the uplink grant.

Another apparatus is described. The apparatus may include means for monitoring for a sub-band indication from a base station that indicates a first sub-band of a set of multiple available sub-bands in an active bandwidth part for an uplink communication from the UE to the base station within a shared radio frequency spectrum band, means for receiving, from the base station, a fallback downlink control information communication that provides an uplink grant to the UE for the uplink communication, where the fallback downlink control information communication has a predetermined number of bits, means for determining, based on the monitored signaling from the base station, that the first sub-band is to be used for the uplink communication, and means for transmitting, to the base station, the uplink communication via the first sub-band responsive to receiving the uplink grant.

A non-transitory computer-readable medium storing code is described. The code may include instructions executable by a processor to monitor for a sub-band indication from a base station that indicates a first sub-band of a set of multiple available sub-bands in an active bandwidth part for an uplink communication from the UE to the base station within a shared radio frequency spectrum band, receive, from the base station, a fallback downlink control information communication that provides an uplink grant to the UE for the uplink communication, where the fallback downlink control information communication has a predetermined number of bits, determine, based on the monitored signaling from the base station, that the first sub-band is to be used for the uplink communication, and transmit, to the base station, the uplink communication via the first sub-band responsive to receiving the uplink grant.

In some aspects of the method, apparatuses, and non-transitory computer-readable medium described herein, the first sub-band may be a lowest sub-band of the active bandwidth part, or a sub-band used to receive a synchronization signal block from the base station, or a sub-band indicated in a physical broadcast channel received from the base station, or a sub-band indicated in a remaining minimum system information communication received from the base station, or a sub-band used to transmit the fallback downlink control information communication, or a lowest sub-band used to transmit the fallback downlink control information communication, or a combination thereof.

A method is described. The method may include identifying one or more sub-bands of a set of multiple available sub-bands in an active bandwidth part for an uplink control channel communication associated with a downlink grant, receiving, from a base station, a fallback downlink control information communication that provides the downlink grant to the UE for a first downlink communication, where the fallback downlink control information communication has a predetermined number of bits, receiving, from the base station, the first downlink communication, determining, based on the first downlink communication, uplink control channel information to be provided in the uplink control channel communication, and transmitting, to the base station, the uplink control channel communication via the one or more sub-bands.

An apparatus is described. The apparatus may include a processor, memory in electronic communication with the processor, and instructions stored in the memory. The instructions may be executable by the processor to cause the apparatus to identify one or more sub-bands of a set of multiple available sub-bands in an active bandwidth part for an uplink control channel communication associated with a downlink grant, receive, from a base station, a fallback downlink control information communication that provides the downlink grant to the UE for a first downlink communication, where the fallback downlink control information communication has a predetermined number of bits, receive, from the base station, the first downlink communication, determine, based on the first downlink communication, uplink control channel information to be provided in the uplink control channel communication, and transmit, to the base station, the uplink control channel communication via the one or more sub-bands.

Another apparatus is described. The apparatus may include means for identifying one or more sub-bands of a set of multiple available sub-bands in an active bandwidth part for an uplink control channel communication associated with a downlink grant, means for receiving, from a base station, a fallback downlink control information communication that provides the downlink grant to the UE for a first downlink communication, where the fallback downlink control information communication has a predetermined number of bits, means for receiving, from the base station, the first downlink communication, means for determining, based on the first downlink communication, uplink control channel information to be provided in the uplink control channel communication, and means for transmitting, to the base station, the uplink control channel communication via the one or more sub-bands.

A non-transitory computer-readable medium storing code is described. The code may include instructions executable by a processor to identify one or more sub-bands of a set of multiple available sub-bands in an active bandwidth part for an uplink control channel communication associated with a downlink grant, receive, from a base station, a fallback downlink control information communication that provides the downlink grant to the UE for a first downlink communication, where the fallback downlink control information communication has a predetermined number of bits, receive, from the base station, the first downlink communication, determine, based on the first downlink communication, uplink control channel information to be provided in the uplink control channel communication, and transmit, to the base station, the uplink control channel communication via the one or more sub-bands.

In some aspects of the method, apparatuses, and non-transitory computer-readable medium described herein, identifying the one or more sub-bands may include operations, features, means, or instructions for monitoring for a sub-band indication from the base station that indicates a first sub-band of the set of multiple available sub-bands in the active bandwidth part for the uplink control channel communication from the UE to the base station, where the first sub-band may be one of the one or more sub-bands.

In some aspects of the method, apparatuses, and non-transitory computer-readable medium described herein, identifying the one or more sub-bands may include operations, features, means, or instructions for determining the one or more sub-bands based on a sub-band information field with the fallback downlink control information communication, where the predetermined number of bits of the fallback downlink control information communication may be maintained even though the sub-band information field may be included within the fallback downlink control information communication.

In some aspects of the method, apparatuses, and non-transitory computer-readable medium described herein, the configuration information and a physical uplink control channel resource indicator field in the fallback downlink control information communication may be indicative of the one or more sub-bands.

In some aspects of the method, apparatuses, and non-transitory computer-readable medium described herein, the configuration information may be received in radio resource control signaling, in remaining minimum system information signaling, in a physical broadcast channel transmission, or any combinations thereof.

Some aspects of the method, apparatuses, and non-transitory computer-readable medium described herein may further include operations, features, means, or instructions for receiving, from the base station, configuration information that includes information for a sub-band indication from the base station.

In some aspects of the method, apparatuses, and non-transitory computer-readable medium described herein, a first sub-band of the one or more sub-bands may be a lowest sub-band of the active bandwidth part, or a sub-band used to receive a synchronization signal block from the base station, or a sub-band indicated in a physical broadcast channel received from the base station, or a sub-band indicated in a remaining minimum system information communication received from the base station, or a sub-band used to transmit the fallback downlink control information communication, or a lowest sub-band used to transmit the fallback downlink control information communication, or a combination thereof.

In some aspects of the method, apparatuses, and non-transitory computer-readable medium described herein, the fallback downlink control information communication may have a fallback downlink control information format which may be indicative that the UE may be to identify the one or more sub-bands by monitoring for a sub-band indication.

Some aspects of the method, apparatuses, and non-transitory computer-readable medium described herein may further include operations, features, means, or instructions for receiving, from the base station, configuration information that indicates that the fallback downlink control information communication includes a sub-band information field.

In some aspects of the method, apparatuses, and non-transitory computer-readable medium described herein, the configuration information indicates that a physical uplink control channel (PUCCH) resource indicator (PRI) field in the fallback downlink control information communication provides the sub-band information.

In some aspects of the method, apparatuses, and non-transitory computer-readable medium described herein, the configuration information may be received in radio resource control (RRC) signaling, in remaining minimum system information (RMSI) signaling, in a physical broadcast (PBCH) transmission, or any combinations thereof.

Some aspects of the method, apparatuses, and non-transitory computer-readable medium described herein may further include operations, features, means, or instructions for receiving, from the base station, configuration information that indicates whether the fallback downlink control information communication includes a sub-band information field.

In some aspects of the method, apparatuses, and non-transitory computer-readable medium described herein, the configuration information may be received in radio resource control signaling, in remaining minimum system information signaling, in a physical broadcast channel transmission, or any combinations thereof.

BRIEF DESCRIPTION OF THE DRAWINGS

FIGS. 4 through 7 illustrate aspects of process flows that support sub-band indication in downlink control information in shared radio frequency spectrum bands in accordance with aspects of the present disclosure.

FIGS. 8 and 9 show block diagrams of devices that support sub-band indication in downlink control information in shared radio frequency spectrum bands in accordance with aspects of the present disclosure.

FIGS. 16 through 27 show flowcharts illustrating methods that support sub-band indication in downlink control information in shared radio frequency spectrum bands in accordance with aspects of the present disclosure.

DETAILED DESCRIPTION

Figure 1:
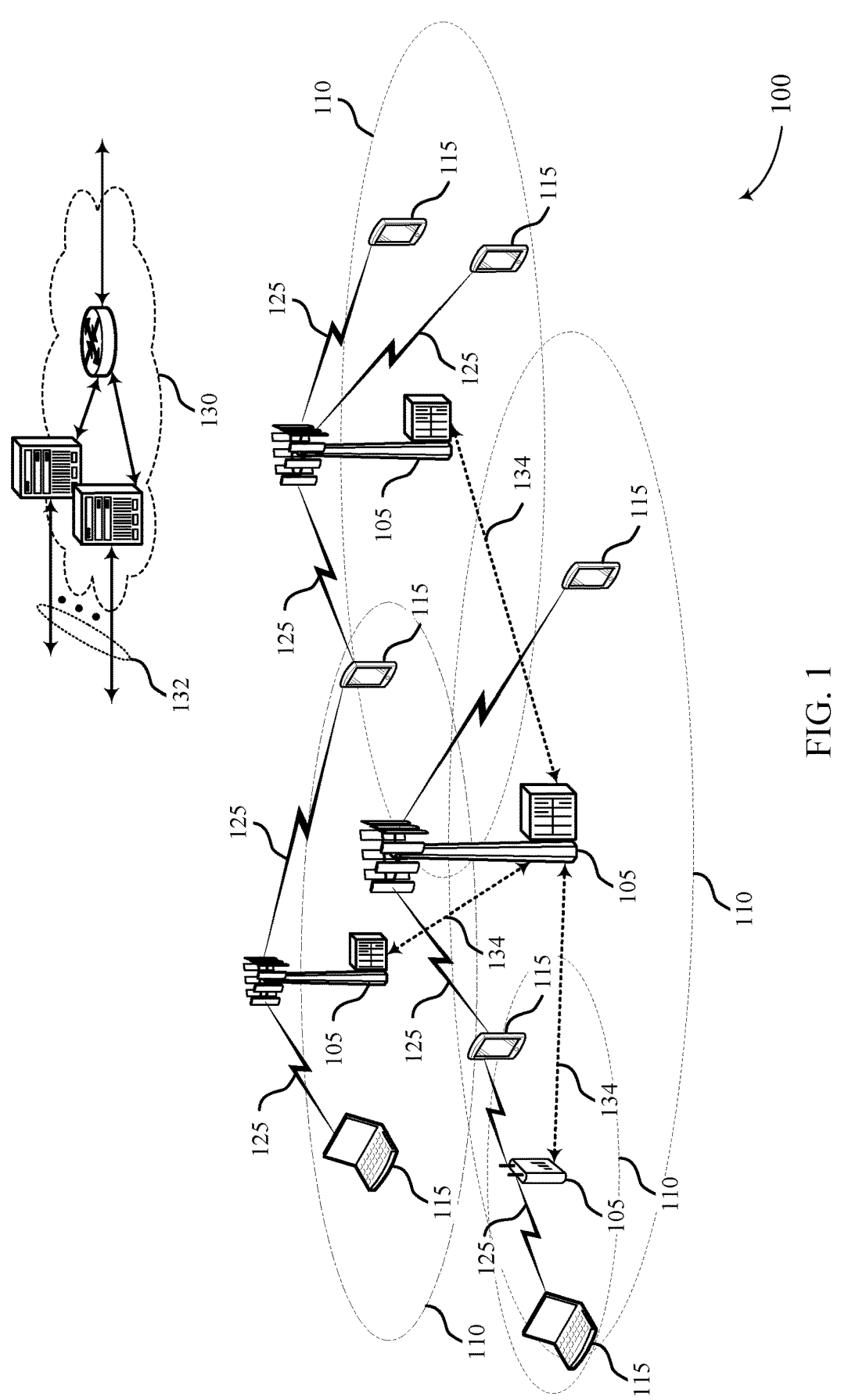
FIG. 1 illustrates an aspect of a system for wireless communications that supports sub-band indication in downlink control information in shared radio frequency spectrum bands in accordance with aspects of the present disclosure.

Various aspects of the present disclosure provide techniques for sub-band indication in downlink control information in a shared radio frequency spectrum band. In some aspects, a base station and a user equipment (UE) may use fallback downlink control information (DCI) formats and non-fallback DCI formats to communicate information for a grant of uplink or downlink resources. The fallback DCI formats may have a predetermined number of bits for multiple instances of DCI, and non-fallback DCI formats may have different numbers of bits across multiple instances of DCI based on particular information to be provided in a particular grant.

In some aspects of the disclosure, when using fallback DCI, one or more sub-bands for the associated uplink communication may be indicated to a UE. Such sub-band indication may allow for the UE to use a particular sub-band that is available for transmissions in a shared radio frequency spectrum band. As indicated above, in aspects that use a shared radio frequency spectrum band, various different users may access the radio frequency spectrum band using contention-based access techniques (e.g., using a listen-before-talk (LBT) procedure), and the particular sub-bands that are available for communications in such deployments may change at some points. However, existing fallback DCI formats do not provide a sub-band indication for associated uplink transmissions, and in instances where the sub-band for uplink communications may change (e.g., due to one or more sub-bands in a bandwidth part (BWP) not passing an LBT procedure) the UE may be unable to identify which sub-band(s) to use for uplink transmissions (e.g., for physical uplink control channel (PUCCH) transmissions, physical uplink shared channel (PUSCH) transmission, or combinations thereof).

Further, in some aspects, it may be beneficial for uplink communications to use interlaced allocations in order for the uplink communication to occupy more of a BWP or sub-band than a non-interlaced or contiguous allocation (e.g., in order to use a minimum occupied channel bandwidth (OCB) in a shared radio frequency spectrum band). However, fallback DCI formats provide support for contiguous allocations of frequency resources, and providing a non-contiguous allocation with fallback DCI may further necessitate the indication of sub-bands in which the uplink communication is to be transmitted, in order to avoid an allocation spanning into a sub-band for which an LBT procedure has not passed.

In some aspects, an indication of one or more sub-bands for uplink communications when using fallback DCI allow for unambiguous determination of the one or more sub-bands at the UE for use in uplink communications. In some cases, the indication of the one or more sub-bands may be an explicit indication provided in the fallback DCI, or may be an implicit indication based on one or more other downlink transmissions to the UE or indications provided in the fallback DCI. In some cases, fallback DCI that provides an uplink grant for a UE (e.g., fallback DCI format 0_0) may contain fewer information bits than fallback DCI that provides a downlink grant for the UE (e.g., fallback DCI format 1_0). Such fallback DCIs may be used, in some cases, used during initial access or during a radio resource control (RRC) reconfiguration, or in physical downlink control channel (PDCCH) grants in order to avoid ambiguity in DCI sizes that are of smaller size than fallback DCI.

In order to have both the fallback DCI for uplink grants and the fallback DCI for downlink grants have a same total length, zero-padding bits may be added to the fallback DCI for uplink grants. In some aspects, a separate sub-band indication field may be provided in fallback DCI for uplink grants that explicitly indicate one or more sub-bands for uplink communications and a number of zero-bits in the fallback DCI for uplink grants may be reduced by a size that corresponds to the number of bits used to indicate the one or more sub-bands.

In other aspects, the UE may be configured to implicitly determine one or more sub-bands for uplink communications based on one or more downlink transmissions of the base station or other indications in a fallback DCI for either downlink communications or uplink communications. In such aspects, the UE may monitor for a downlink transmission from the base station, which may provide an indication of the sub-band that is to be used. In some cases, the indication of the sub-band may be provided by a PUCCH resource indicator (PRI) field of the fallback DCI, where the sub-band for the uplink communication may correspond to a sub-band of a PUCCH resource indicated from a table entry identified by the PRI field. In some cases, the indication of the sub-band may be based on a sub-band used to transmit a synchronization signal block (SSB), a sub-band indicated in a physical broadcast channel (PBCH), a sub-band indicated in a remaining minimum system information (RMSI) communication, a sub-band used to transmit the fallback DCI, or a lowest sub-band used to transmit the fallback DCI. The UE, responsive to the fallback DCI, may transmit an uplink communication using the indicated sub-band.

Such techniques may provide for consistent interpretation and size of the fallback DCI formats that are independent of a specific radio resource control (RRC) configuration (e.g., there may be no ambiguity in fallback DCI format in case of RRC reconfiguration). Accordingly, techniques according to various aspects may allow for efficient and reliable use of shared radio frequency spectrum bands in which available sub-bands for uplink communications may change.

Aspects of the disclosure are initially described in the context of a wireless communications system. Various fallback DCI formats are then discussed in some aspects of the disclosure. Aspects of the disclosure are further illustrated by and described with reference to apparatus diagrams, system diagrams, and flowcharts that relate to sub-band indication in downlink control information in shared radio frequency spectrum band.

FIG. 1 illustrates an aspect of a wireless communications system 100 that supports sub-band indication in downlink control information in shared radio frequency spectrum band in accordance with aspects of the present disclosure. The wireless communications system 100 includes base stations 105, UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. In this example, each base station 105 may provide communication coverage for a macro cell, a small cell, a hot spot, or other types of cells, or various combinations thereof. In some aspects, a base station 105 may be movable and therefore provide communication coverage for a moving geographic coverage area 110. In some aspects, different geographic coverage areas 110 associated with different technologies may overlap, and overlapping geographic coverage areas 110 associated with different technologies may be supported by the same base station 105 or by different base stations 105. The wireless communications system 100 may include, in some aspects, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some aspects, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some aspects, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Some aspects of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. In some aspects, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some aspects, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. In some aspects, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some aspects, base station 105 or UE 115 may be equipped with multiple antennas, which may be used to employ techniques such as transmit diversity, receive diversity, multiple-input multiple-output (MIMO) communications, or beamforming. In some aspects, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, in some aspects, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, in some aspects, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, in some aspects. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. in some aspects, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink e.g., in an FDD mode), or be configured to carry downlink and uplink communications (e.g., in a TDD mode). In some aspects, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). In some aspects, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some aspects (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, in some aspects, using time division multiplexing (TDM) techniques, frequency division multiplexing (FDM) techniques, or hybrid TDM-FDM techniques. In some aspects, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some aspects the carrier bandwidth may be referred to as a "system bandwidth" of the carrier or the wireless communications system 100. In some aspects, the carrier bandwidth may be one of a number of predetermined bandwidths for carriers of a particular radio access technology (e.g., 1.4, 3, 5, 10, 15, 20, 40, or 80 MHz). In some aspects, each served UE 115 may be configured for operating over portions or all of the carrier bandwidth. In other aspects, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some aspects, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some aspects, system bandwidth may be divided into multiple sub-bands, and when using fallback DCI one or more sub-bands for uplink communication may be indicated to a UE 115. Such sub-band indication may allow for the UE 115 to use a particular sub-band that is available for transmissions in a shared radio frequency spectrum band. Indications of one or more sub-bands may be provided explicitly by a sub-band indication field in a fallback DCI, or may be provided implicitly by one or more downlink transmissions of a base station 105. In some cases, a UE 115 may be configured (e.g., via RRC signaling) to monitor for the explicit or implicit indications of sub-bands to be used for uplink communications.

Figure 2:
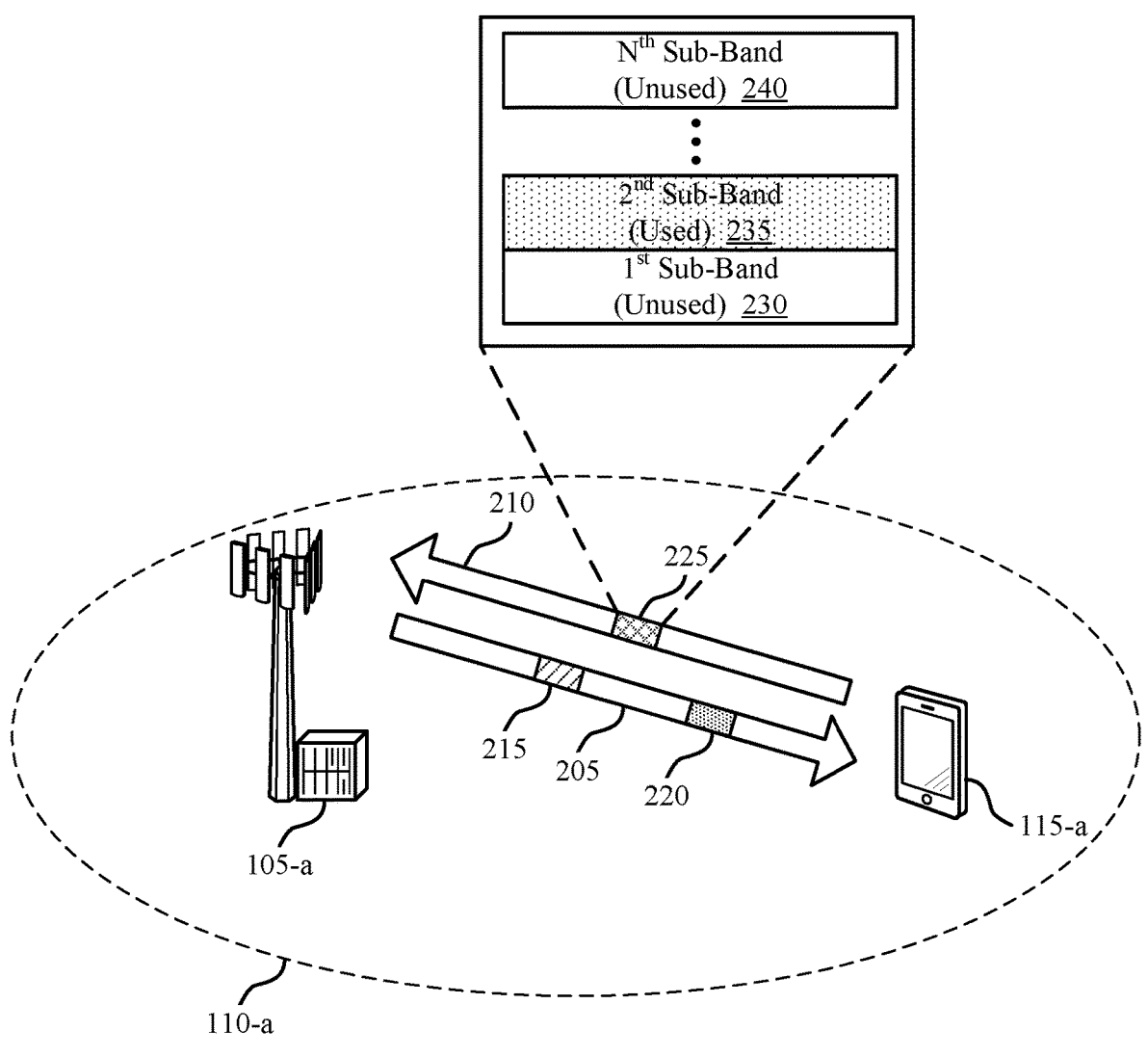
FIG. 2 illustrates an aspect of a portion of a wireless communications system that supports sub-band indication in downlink control information in shared radio frequency spectrum bands in accordance with aspects of the present disclosure.

FIG. 2 illustrates an aspect of a wireless communications system 200 that supports sub-band indication in downlink control information in shared radio frequency spectrum band in accordance with aspects of the present disclosure. In some aspects, wireless communications system 200 may implement aspects of wireless communications system 100. Wireless communications system 200 may include base station 105-a and UE 115-a, which may be respective examples of a base station 105 and a UE 115 as described herein.

UE 115-a and base station 105-a may communicate via downlink carrier 205 and uplink carrier 210. In some cases, carriers 205 and 210 may be the same carrier. In some cases, carriers 205 and 210 may be component carriers (CCs), and a number of different CCs may be used for communications between the UE 115-a and the base station 105-a. In some cases, carriers 205 and 210 may use a shared radio frequency spectrum band. In this aspect, the base station 105-a may transmit configuration information 215 to the UE 115-a. Such configuration information may be provided via RRC signaling, in some cases. In some aspects, configuration information 215 may configure the UE 115-a to monitor for fallback DCI 220, and may further configure the UE 115-a to monitor for an indication of one or more sub-bands that are to be used for uplink transmissions 225.

The base station 105-a may, in such aspects, configure a system bandwidth or bandwidth part (BWP) that spans a number of sub-bands that may include a first sub-band 230, a second sub-band 235, through an nth sub-band 240. Each sub-band 230 through 240 may have a separate associated LBT procedure for contention-based access in the shared radio frequency spectrum band. As discussed herein, in order to indicate to the UE 115-a which of the sub-bands 230 through 240 are to be use for uplink transmission 225, the base station 105-a may provide, and the UE 115-a may monitor for, one or more implicit indications, one or more explicit indications, or combinations thereof. In the illustration of FIG. 2, the second sub-band 235 may be used for uplink communications. In some cases, a single sub-band may be used for uplink transmission 225, and in other cases two or more sub-bands may be used for uplink transmission 225.

In some aspects, one or more of the configuration information 215 or fallback DCI 220 may provide an explicit indication of which sub-band may be used for uplink transmission 225. A sub-band indication field in fallback DCI 220 is discussed with reference to FIG. 3 for some aspects that provide an explicit sub-band indication. In other aspects, the UE 115-a may determine which of sub-bands 230 through 240 are to be used for uplink transmission 225 through an implicit indication. In some cases, the fallback DCI 220 may provide an uplink grant to the UE 115-a (e.g., fallback DCI 220 has DCI format 0_0), and the UE 115-a may use the single sub-band 235 for the uplink transmission 225. In various aspects, the UE 115-a may determine the single sub-band 235 based on a lowest sub-band configured in the system bandwidth, a sub-band used for SSB transmissions by the base station 105-a, a sub-band indicated in a physical broadcast channel (PBCH) transmission of the base station 105-a, a sub-band indicated in a remaining minimum system information (RMSI) transmission of the base station 105-a, a same sub-band as used to transmit the fallback DCI 220, or a lowest sub-band that is used to transmit the fallback DCI 220.

In some aspects, the fallback DCI 220 may provide a downlink grant to the UE 115-a (e.g., for a PDSCH or PDCCH transmission according to DCI format 1_0) and the UE 115-a may determine the sub-band 235 for transmission of uplink control information (e.g., HARQ ACK/NACK feedback for the downlink communication provided in a PUCCH transmission). In some aspects, such fallback DCI 220 for a downlink grant may include a PRI field, which may identify a table entry of a PRI table for a corresponding PUCCH communication. In such aspects, the table entry of the PRI table that is indicated in the PRI field (e.g., an index value), may implicitly indicate which sub-band is to be used for the uplink communication from the UE 115-a, and a separate sub-band indication field may not be provided in the fallback DCI 220. In some cases, the fallback DCI 220 format for a downlink grant (e.g., DCI format 1_0) may have a length that is already longer than a length of a fallback DCI for an uplink grant (e.g., DCI format 0_0), and in order to maintain the predetermined bit length, the indication of the sub-band 235 for the uplink transmission 225 may be implicitly indicated rather than explicitly indicated in a separate DCI field. Thus, in some aspects, the base station 105-a may include the sub-band indication in the resource configuration for PUCCH (e.g., through RRC configuration or a prespecified sub-band), so that the PRI which is already present in the fallback DCI 220 for the downlink grant automatically indicates the sub-band(s).

In other aspects, when the fallback DCI 220 is for a downlink grant, a single sub-band may be allowed for the uplink transmission 225, and the sub-band index can be chosen from one of a same sub-band that contains the fallback DCI 220, a same sub-band that contains the PDSCH allocation if is in single sub-band, a lowest (or highest) sub-band in the PDSCH allocation if it spans multiple sub-bands, or an SSB sub-band if the fallback DCI 220 or PDCCH contains that sub-band (if not, one of the other options may be used).

In further aspects, one or more bits may be added to the fallback DCI 220 to indicate sub-band resources. In such cases, a number of bits may be added to the fallback DCI 220 that corresponds to a number of sub-bands 230 through 240 (e.g., to provide a bitmap of sub-bands that are to be used for the uplink transmission 225). In other cases, the number of bits added to the fallback DCI 220 may be determined as a ceiling of $\log_2(N)$, where N is the number of sub-bands in the system bandwidth or number of sub-bands in an initial BWP, or N is fixed as a number of sub-bands in a largest supported system bandwidth. In such aspects, each potential value of the indication may be mapped to a different sub-band index. As indicated herein, in some aspects fallback DCI formats may be used to provide resource grants to UE 115-*a*, and FIG. 3 provides illustrations of some fallback DCI formats.

Figure 3:
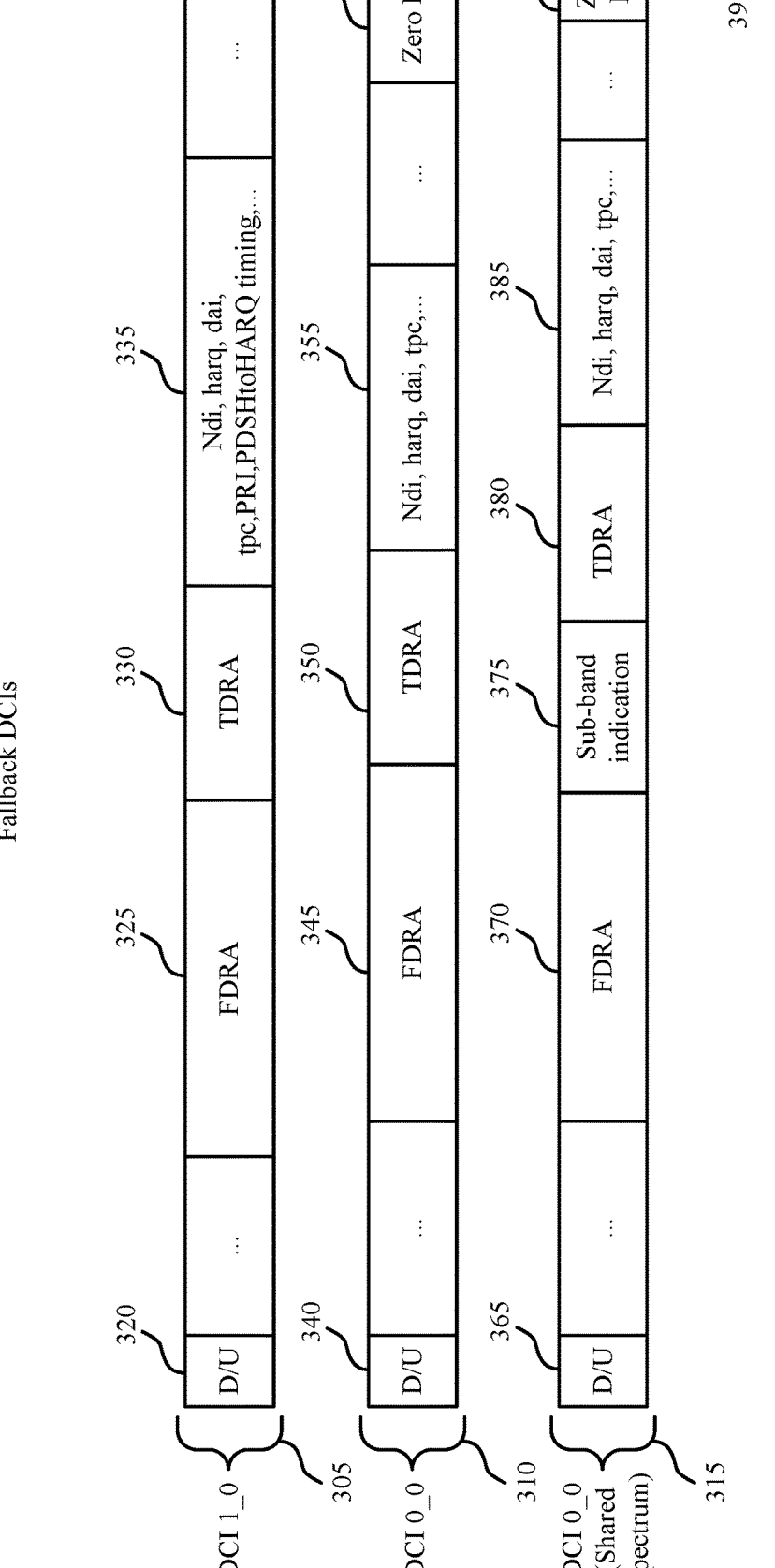
FIG. 3 illustrates an aspect of DCI formats that support sub-band indication in shared radio frequency spectrum bands in accordance with aspects of the present disclosure.

FIG. 3 illustrates an aspect of a DCI formats 300 that support sub-band indications in downlink control information in shared radio frequency spectrum band, in accordance with aspects of the present disclosure. In some aspects, DCI formats 300 may implement aspects of wireless communications system 100 or 200. In this case, a downlink fallback DCI 305 (e.g., DCI format 1_0), an uplink fallback DCI 310 (e.g., DCI format 0_0), and an uplink fallback DCI for shared spectrum 315 (e.g., DCI format 0_0 for shared spectrum) are illustrated.

In the aspects illustrated by FIG. 3, the downlink fallback DCI 305 may include a number of fields, including a downlink/uplink field 320 that indicates if the DCI 305 is a downlink or uplink DCI, a frequency division resource assignment (FDRA) field 325 that indicates frequency resources (e.g., based on RB indices) for the downlink grant, a time division resource assignment (TDRA) field 330 that indicates time resources for the downlink grant, a parameter field 335 that indicates various parameters, such as a new data indicator (NDI), HARQ process information, a downlink assignment index (DAI), transmit power control (TPC), a PUCCH resource indicator (PRI), feedback timing, and one or more other parameters. Further, downlink fallback DCI 305 may include one or more other fields that provide parameters, such as for resource mapping or modulation and coding. As discussed with reference to FIG. 2, in some aspects the downlink fallback DCI 305 may provide an implicit indication of a sub-band for an associated PUCCH transmission (e.g., based on a table entry of the PRI, or one or more other indications provided by a downlink transmission of the base station).

The uplink fallback DCI 310 as illustrated in FIG. 3 may include a number of fields, including a downlink/uplink field 340 that indicates if the DCI 310 is a downlink or uplink DCI, a FDRA field 345 for the uplink grant, a TDRA field 350 for the uplink grant, a parameter field 355 that indicates various parameters, such as a NDI, HARQ process information, a DAI, TPC, and one or more other parameters. Further, uplink fallback DCI 310 may include one or more other fields (e.g., that provide parameters, such as for redundancy version, uplink or supplementary uplink indication, etc.). As discussed herein, uplink fallback DCI 310 may include a number of zero-pad bits 360 to provide a total DCI length that corresponds to a predetermined number of bits 395 so as to provide that downlink fallback DCI 305 and the uplink fallback DCI 310 have a same bit length. In some aspects, such as discussed with reference to FIG. 2, the uplink fallback DCI 310 may provide an implicit indication of a sub-band for an associated PUSCH transmission, such as based on an indications provided by one or more downlink transmission of the base station.

In some aspects, the uplink fallback DCI for shared spectrum 315, such as illustrated in FIG. 3, may provide an explicit indication of sub-bands for the associated uplink communication. In one aspect, uplink fallback DCI for shared spectrum 315 may include a number of fields, including a downlink/uplink field 365 that indicates if the DCI for shared spectrum 315 is a downlink or uplink DCI, a FDRA field 370 for the uplink grant, a sub-band indication field 375 that indicates one or more sub-bands for the uplink communication, a TDRA field 380 for the uplink grant, a parameter field 385 that indicates various parameters (e.g., NDI, HARQ process information, DAI, TPC, etc.). Further, uplink fallback DCI for shared spectrum 315 may include one or more other fields (e.g., that provide parameters, such as for redundancy version, uplink or supplementary uplink indication, etc.). As discussed herein, uplink fallback DCI for shared spectrum 315 may include a number of zero-pad bits 390 that are reduced relative to zero-pad bits 360 to provide a total DCI length that corresponds to the predetermined number of bits 395 so as to provide that all of the fallback DCIs 305, 310, and 315 have a same bit length.

In some cases, the number of bits in the sub-band indication field 375 may be included along with bits of the FDRA field 370. In other cases, the sub-band indication field 375 may be provided at the end of the uplink fallback DCI for shared spectrum 315, replacing some of the zero-padding bits. In some cases, a number of bits of the sub-band indication field 375 may correspond to a number of sub-bands (N), and may provide a bitmap sub-bands that are to be used for the corresponding uplink communication. In other cases, the sub-band indication field 375 may be a bitfield that can indicate one sub-band of a contiguous allocation of two or more sub-bands based on a ceiling of $(\log_2(N*(N+1)/2)$, which is less than the number of available sub-bands. In still other cases, a single sub-band may be indicated in the sub-band indication field 375, and the number of bits in the field correspond to a ceiling of $\log_2(N)$ to provide a sub-band index of the selected sub-band.

The number N of the sub-bands may be an actual number of sub-bands in the BWP the UE is monitoring, may be a number of sub-bands in an initial BWP or active BWP, depending on a common or UE specific search space. In some aspects, an initial BWP may be an active BWP when establishing a connection between a base station and a UE. In some aspects, if an initial BWP or active BWP contains one sub-band, then N=1, and no extra bits are needed for sub-band indication. In other cases, N may correspond to a maximum number of sub-bands for a largest system bandwidth supported even though the actual BWP may be smaller (e.g., allocate a fixed 4 bits in DCI). In such cases, N is fixed, independent of a size of a current BWP, and based on the maximum number of sub-bands in the system bandwidth. in some aspects, if the system bandwidth for uplink is 80 MHz and active uplink BWP is 40 MHz, 4 bits in fallback DCI for sub-band indication are used whereas in non-fallback DCI (e.g., DCI format 0_1) two bits may be used to refer to sub-bands in the current BWP.

In some aspects, the bits of the sub-band indication field 375 may be selected to provide that the uplink fallback DCI for shared spectrum 315 has the predetermined number of bits 395. In some cases, the number of zero-pad bits 360, referred to as 'Z,' may correspond to a difference in bit lengths between the downlink fallback DCI 305 and the uplink fallback DCI 310 (before padding). Further, the value 'S' may be a number of bits needed for sub-band indication, and a value 'M' may be a minimum number of margin bits that are to be reserved for potential future use. The value S may be, in some aspects, a maximum number of number of sub-bands in a largest supported system bandwidth (e.g., 5 bits for 100 MHz) or can be the actual number of sub-bands in an active/initial BWP. In some aspects, if $Z \geq M+S$, then S bits may be used in the sub-band indication field 375 (e.g., to provide a bitmap of sub-bands). In other aspects, if $M < Z < S+M$, then Z-M bits ($<S$) may be used in the sub-band indication field 375, and some combinations out of $2^S$ combinations may be allowed (e.g., if S=4 bits for 4 sub-bands and Z-M=2 bits, the sub-band indication field 375 may indicate the lower 2 sub-bands). A special case of this is M=0 (e.g., up to Z bits or min(S, Z) bits for sub-band indication).

Figure 4:
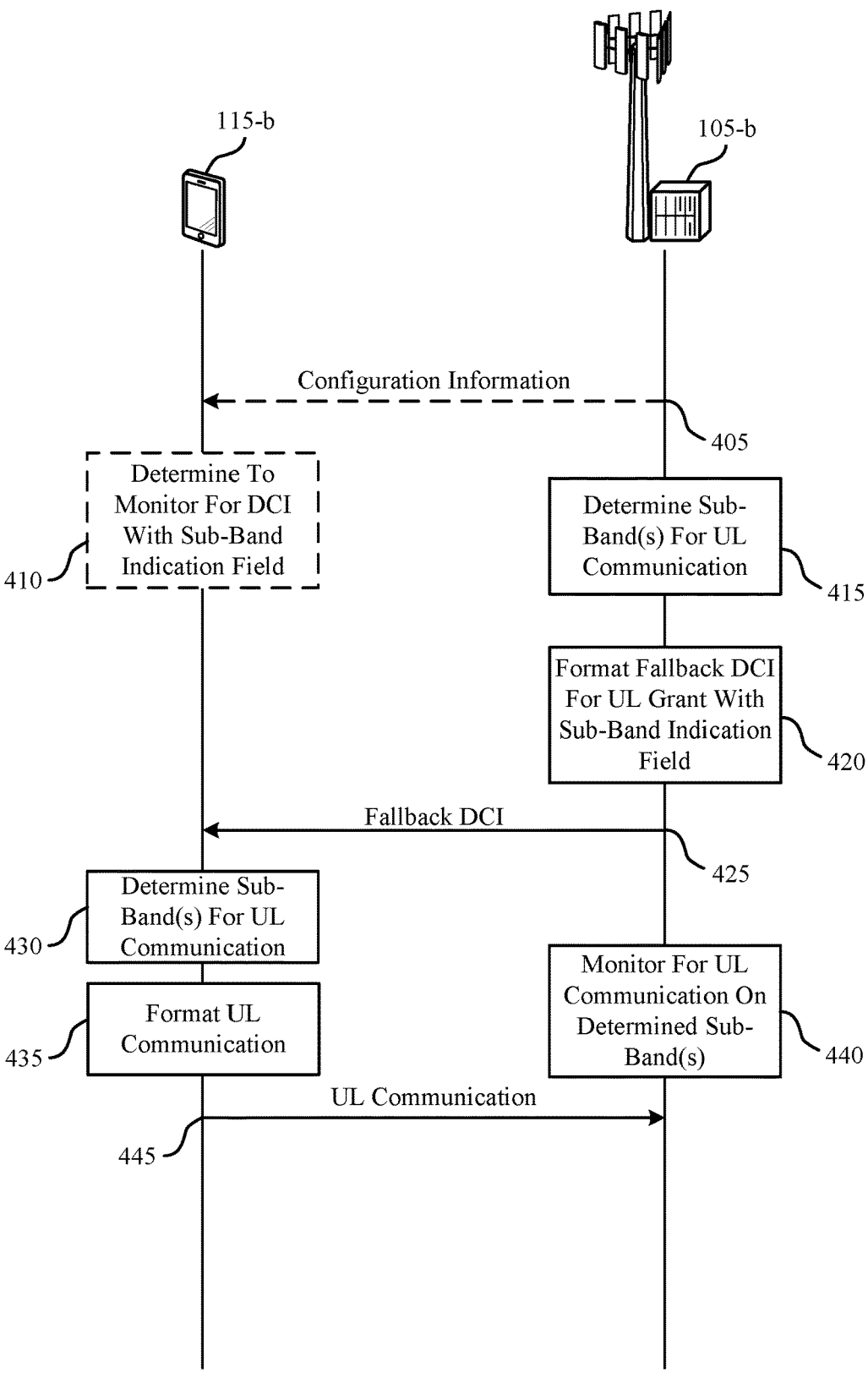

FIG. 4 illustrates an aspect of a process flow 400 that supports sub-band indication in downlink control information in shared radio frequency spectrum band in accordance with aspects of the present disclosure. In some aspects, process flow 400 may implement aspects of wireless communications system 100 or 200. Process flow 400 may be implemented by UE 115-*b* and base station 105-*b*, as described herein. Alternative aspects of the following may be implemented, where some steps are performed in a different order than described or are not performed at all. In some cases, steps may include additional features not mentioned below, or further steps may be added.

Optionally, at 405, the base station 105-*b* may transmit configuration information to the UE 115-*b*. Such configuration may, in some cases, configure the UE 115-*b* to monitor for an indication of sub-bands for uplink communications when a fallback DCI is used to provide a resource grant to the UE 115-*b*. Optionally, at 410, the UE 115-*b* may determine to monitor for fallback DCI transmissions that include a sub-band indication field.

At 415, the base station 105-*b* may determine one or more sub-bands that are to be used by the UE 115-*b* for uplink communications to the base station 105-*b*. In some cases, the base station 105-*b* may determine the number of sub-bands based on one or more sub-bands for which a contention-based channel access procedure (e.g., an LBT procedure) has passed in a shared radio frequency spectrum band. In some cases, the base station 105-*b* may perform the contention-based channel access procedure and a time duration of the channel access may include sufficient time for both downlink and uplink transmissions, such that the UE 115-*b* may perform an abbreviated channel access procedure (e.g., a one-shot LBT procedure) and have a high likelihood of gaining channel access for the indicated one or more sub-bands.

At 420, the base station 105-*b* may format a fallback DCI for an uplink grant, which includes a sub-band indication field. In some cases, the sub-band indication field may indicate the determined one or more sub-bands that the UE 115-*b* is to use for uplink communications. In some cases, a number of bits of the sub-band indication field may be configured by the base station 105-*b* in the configuration information that is provided to the UE 115-*b*. At 425, the base station 105-*b* may transmit the fallback DCI to the UE 115-*b*.

At 430, the UE 115-*b* may receive the fallback DCI and determine the one or more sub-bands for the uplink communication to the base station 105-*b*. In some cases, the UE 115-*b* may identify the sub-bands based on the sub-band indication field of the fallback DCI. In some cases, the sub-band indication field may include a bitmap that indicates which of a number of available sub-bands are to be used by the UE 115-*b* for the uplink communication. In other cases, the sub-band indication field may provide a bitfield in which a value of the bits provided may be mapped to one or more sub-band index values.

At 435, the UE 115-*b* may format the uplink communication for transmission to the base station 105-*b*. In some cases, the uplink communication may be formatted according to the information provided in the fallback DCI.

At 440, the base station 105-*b* may monitor for the uplink communication from the UE 115-*b* on the determined sub-band(s). At 445, the UE 115-*b* may transmit the uplink communication to the base station 105-*b*. The uplink communication may be transmitted on the one or more sub-bands that were determined to be used for the uplink communication based on the sub-band indication field in the fallback DCI.

Figure 5:
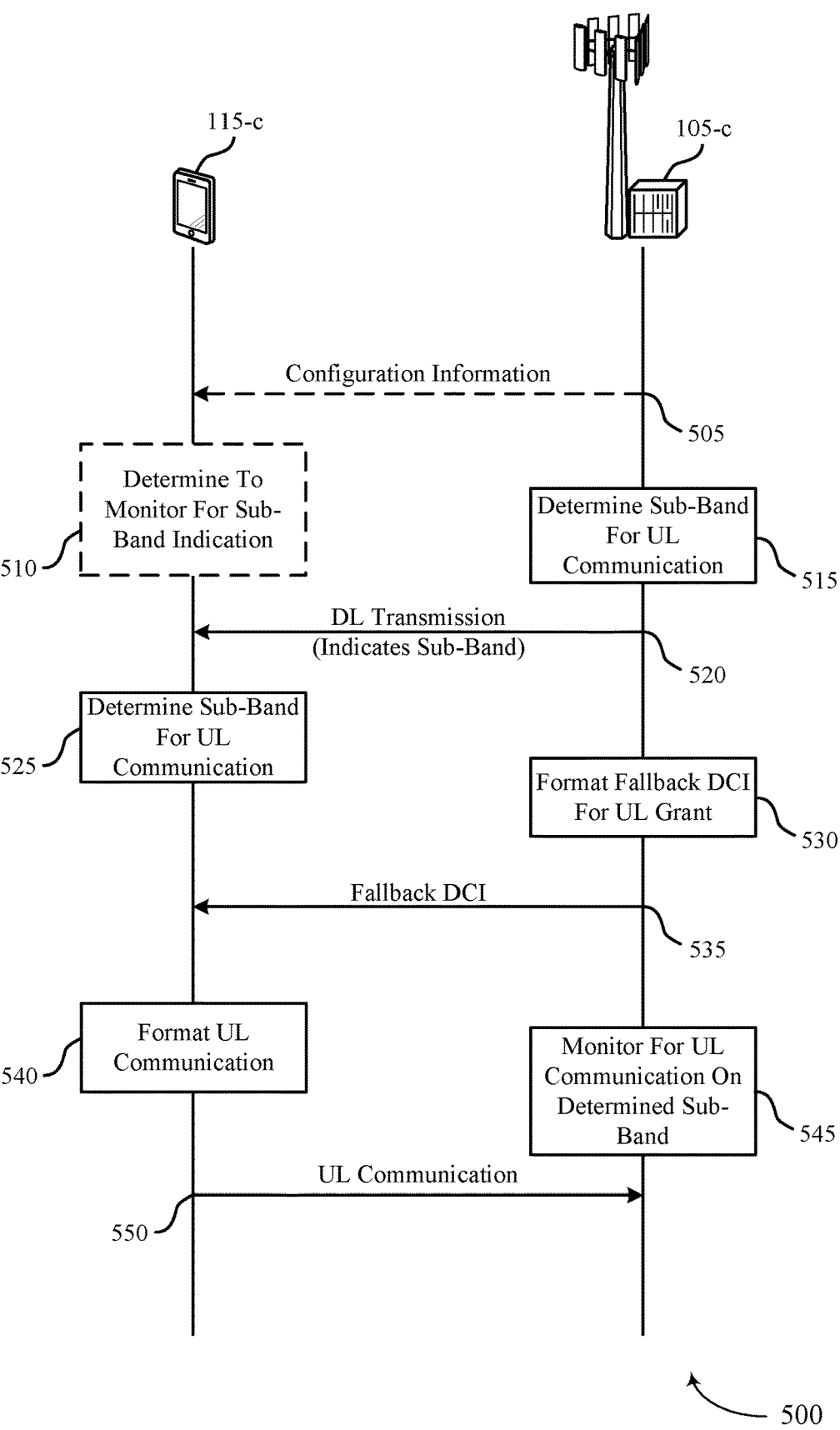

FIG. 5 illustrates an aspect of a process flow 500 that supports sub-band indication in downlink control information in shared radio frequency spectrum band in accordance with aspects of the present disclosure. In some aspects, process flow 500 may implement aspects of wireless communications system 100 or 200. Process flow 500 may be implemented by UE 115-*c* and base station 105-*c*, as described herein. Alternative aspects of the following may be implemented, where some steps are performed in a different order than described or are not performed at all. In some cases, steps may include additional features not mentioned below, or further steps may be added.

Optionally, at 505, the base station 105-*c* may transmit configuration information to the UE 115-*c*. Such configuration information may, in some cases, configure the UE 115-*c* to monitor for an indication of sub-bands for uplink communications when a fallback DCI is used to provide a resource grant to the UE 115-*c*. Optionally, at 510, the UE 115-*c* may determine to monitor for fallback DCI transmissions and for sub-band indications from the base station 105-*b*.

At 515, the base station 105-*c* may determine one or more sub-bands that are to be used by the UE 115-*c* for uplink communications to the base station 105-*c*. In some cases, the base station 105-*c* may determine the number of sub-bands based on one or more sub-bands for which a contention-based channel access procedure (e.g., an LBT procedure) has passed in a shared radio frequency spectrum band.

At 520, the base station 105-*c* may transmit a downlink transmission that may be used to indicate a selected sub-band for uplink communications from the UE 115-*c*. In some cases, the downlink transmission may be an SSB transmission on the selected sub-band, a PBCH transmission that indicates the selected sub-band or is transmitted on the selected sub-band, an RMSI communication that indicates the selected sub-band or is transmitted on the selected sub-band, or any combinations thereof. In some cases, the sub-band used to transmit the fallback DCI, or a lowest sub-band used to transmit the fallback DCI, may be used to indicate the selected sub-band.

At 525, the UE 115-*c* may determine the one or more sub-bands for the uplink communication to the base station 105-*c*. The UE 115-*c* may make such a determination in accordance with any of the various techniques provided for implicit indication of sub-bands as discussed herein.

At 530, the base station 105-*c* may format a fallback DCI for an uplink grant. At 535, the base station 105-*c* may transmit the fallback DCI to the UE 115-*c*.

At 540, the UE 115-*c* may receive the fallback DCI and format the uplink communication for transmission to the base station 105-*c*. In some cases, the uplink communication may be formatted according to the information provided in the fallback DCI, and may be formatted to be transmitted in the determined sub-bands for the uplink communication.

At 545, the base station 105-*c* may monitor for the uplink communication from the UE 115-*c* on the determined sub-band(s). At 545, the UE 115-*c* may transmit the uplink communication to the base station 105-*c*. The uplink communication may be transmitted on the one or more sub-bands that were determined to be used for the uplink communication based on the implicit sub-band indication provided by the base station 105-*c*.

Figure 6:
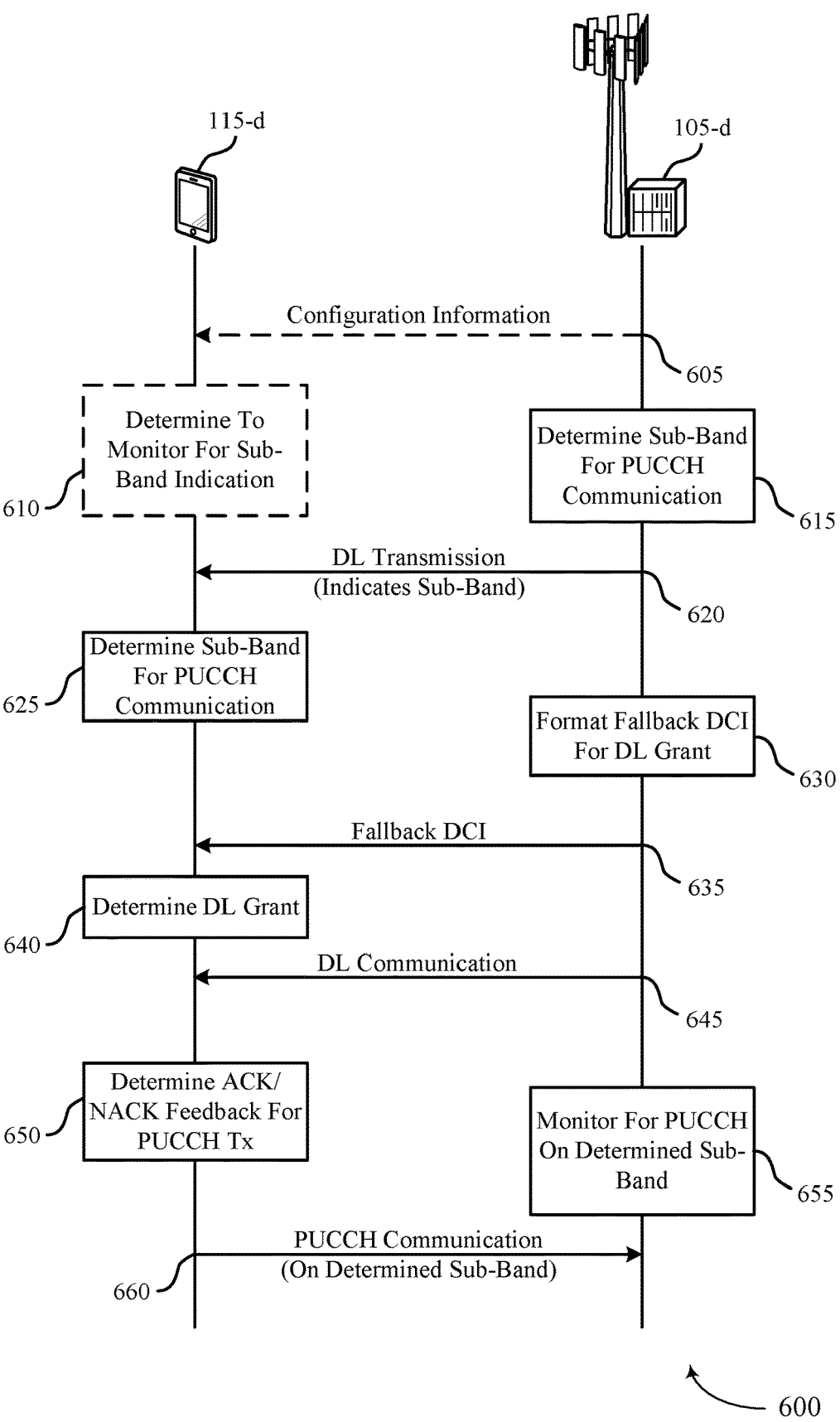

FIG. 6 illustrates an aspect of a process flow 600 that supports sub-band indication in downlink control information in shared radio frequency spectrum band in accordance with aspects of the present disclosure. In some aspects, process flow 600 may implement aspects of wireless communications system 100 or 200. Process flow 600 may be implemented by UE 115-*d* and base station 105-*d*, as described herein. Alternative aspects of the following may be implemented, where some steps are performed in a different order than described or are not performed at all. In some cases, steps may include additional features not mentioned below, or further steps may be added.

Optionally, at 605, the base station 105-*d* may transmit configuration information to the UE 115-*d*. Such configuration information may, in some cases, configure the UE 115-*d* to monitor for an indication of sub-bands for uplink communications when a fallback DCI is used to provide a resource grant to the UE 115-*d*. Optionally, at 610, the UE 115-*d* may determine to monitor for fallback DCI transmissions and for sub-band indications from the base station 105-*d*.

At 615, the base station 105-*d* may determine one or more sub-bands that are to be used by the UE 115-*d* for uplink control channel communications to the base station 105-*d*. In some cases, the base station 105-*d* may determine the number of sub-bands based on one or more sub-bands for which a contention-based channel access procedure (e.g., an LBT procedure) has passed in a shared radio frequency spectrum band.

At 620, the base station 105-*d* may transmit a downlink transmission that may be used to indicate a selected sub-band for uplink control channel communications from the UE 115-*d*, such as a control channel transmission to provide a HARQ ACK/NACK feedback transmission. In some cases, the downlink transmission may be an SSB transmission on the selected sub-band, a PBCH transmission that indicates the selected sub-band or is transmitted on the selected sub-band, an RMSI communication that indicates the selected sub-band or is transmitted on the selected sub-band, or any combinations thereof. In some cases, the sub-band used to transmit the fallback DCI, or a lowest sub-band used to transmit the fallback DCI, may be used to indicate the selected sub-band. In some cases, the fallback DCI may provide a downlink resource grant to the UE 115-*d*, and the indication of the selected sub-band may be provided by a PRI field of the fallback DCI, where the sub-band for the uplink communication may correspond to a sub-band of a PUCCH resource indicated from a table entry identified by the PRI field. In some cases, the table may be preconfigured by RRC signaling. In other cases the table may be a prespecified table defined in a specification. Such a table may, in some cases, include a number of entries that are indexed and mapped to a value of the PRI field. In some cases, one or more of the table entries can indicate more than one sub-band, and consequently the PRI field in the fallback DCI can identify one or more sub-bands for transmitting the PUCCH.

At 625, the UE 115-*d* may determine the one or more sub-bands for the uplink communication to the base station

105-*d*. The UE 115-*d* may make such a determination in accordance with any of the various techniques provided for implicit indication of sub-bands as discussed herein.

At 630, the base station 105-*d* may format a fallback DCI for an uplink grant. At 635, the base station 105-*d* may transmit the fallback DCI to the UE 115-*d*. At 640, the UE 115-*d* may determine the downlink grant based on the fallback DCI.

At 645, the base station 105-*d* may transmit the downlink communication to the UE 115-*d*. At 650, the UE 115-*d* may determine ACK/NACK feedback associated with the downlink communication, for transmission in the control channel communication.

At 655, the base station 105-*d* may monitor for the uplink control channel communication from the UE 115-*d* on the determined sub-band(s). At 660, the UE 115-*d* may transmit the uplink control channel communication to the base station 105-*d*. The uplink communication may be transmitted on the one or more sub-bands that were determined to be used for the uplink control channel communication based on the implicit sub-band indication provided by the base station 105-*d*.

FIG. 7 illustrates an aspect of a process flow 700 that supports sub-band indication in downlink control information in shared radio frequency spectrum band in accordance with aspects of the present disclosure. In some aspects, process flow 700 may implement aspects of wireless communications system 100 or 200. Process flow 700 may be implemented by UE 115-*e* and base station 105-*e*, as described herein. Alternative aspects of the following may be implemented, where some steps are performed in a different order than described or are not performed at all. In some cases, steps may include additional features not mentioned below, or further steps may be added.

Optionally, at 705, the base station 105-*e* may transmit configuration information to the UE 115-*e*. Such configuration may, in some cases, configure the UE 115-*e* to monitor for an indication of sub-bands for uplink communications when a fallback DCI is used to provide a resource grant to the UE 115-*e*. Optionally, at 710, the UE 115-*e* may determine to monitor for fallback DCI transmissions from the base station 105-*e*.

At 715, the base station 105-*e* may determine one or more sub-bands that are to be used by the UE 115-*e* for uplink control channel communications to the base station 105-*e*. In some cases, the base station 105-*e* may determine the number of sub-bands based on one or more sub-bands for which a contention-based channel access procedure (e.g., an LBT procedure) has passed in a shared radio frequency spectrum band.

At 720, the base station 105-*e* may format a fallback DCI for a downlink grant, which includes a sub-band indication field. In some cases, the sub-band indication field may indicate the determined one or more sub-bands that the UE 115-*e* is to use for uplink control channel communications. In some cases, a number of bits of the sub-band indication field may be configured by the base station 105-*e* in the configuration information that is provided to the UE 115-*e*. At 725, the base station 105-*e* may transmit the fallback DCI to the UE 115-*e*.

At 730, the UE 115-*e* may receive the fallback DCI and determine the one or more sub-bands for the uplink control channel communication to the base station 105-*e*. In some cases, the UE 115-*e* may identify the sub-bands based on the sub-band indication field of the fallback DCI. In some cases, the sub-band indication field may include a bitmap that indicated which of a number of available sub-bands are to be used by the UE 115-*e* for the uplink communication. In other cases, the sub-band indication field may provide a bitfield in which a value of the bits provided may be mapped to one or more sub-band index values.

At 735, the base station 105-*e* may transmit the downlink communication to the UE 115-*e*. At 740, the UE 115-*e* may determine ACK/NACK feedback associated with the downlink communication for transmission in the control channel communication.

At 745, the base station 105-*e* may monitor for the uplink control channel communication from the UE 115-*e* on the determined sub-band(s). At 750, the UE 115-*e* may transmit the uplink control channel communication to the base station 105-*e*. The uplink communication may be transmitted on the one or more sub-bands that were determined to be used for the uplink control channel communication based on the explicit sub-band indication provided by the base station 105-*e* in the sub-band indication field.

FIG. 8 shows a block diagram 800 of a device 805 that supports sub-band indication in downlink control information in shared radio frequency spectrum in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to sub-band indication in downlink control information in shared radio frequency spectrum, etc.). Information may be passed on to other components of the device 805. The receiver 810 may be an example of aspects of the transceiver 1120 described with reference to FIG. 11. The receiver 810 may utilize a single antenna or a set of antennas.

In some aspects, the communications manager 815 may receive, from a base station, a fallback downlink control information communication that provides an uplink grant to the UE within a shared radio frequency spectrum band, where the fallback downlink control information communication has a predetermined number of bits, determine, based on a sub-band information field within the fallback downlink control information communication, one or more sub-bands of a set of available sub-bands in an active bandwidth part for an uplink communication associated with the uplink grant, where the predetermined number of bits of the fallback downlink control information communication is maintained even though the sub-band information field is included within the fallback downlink control information communication, and transmit, to the base station, the uplink communication via the determined one or more sub-bands.

In some aspects, the communications manager 815 may monitor for a sub-band indication from a base station that indicates a first sub-band of a set of available sub-bands in an active bandwidth part for an uplink communication from the UE to the base station within a shared radio frequency spectrum band, determine, based on the monitored signaling from the base station, that the first sub-band is to be used for the uplink communication, receive, from the base station, a fallback downlink control information communication that provides an uplink grant to the UE for the uplink communication, where the fallback downlink control information communication has a predetermined number of bits, and transmit, to the base station, the uplink communication via the first sub-band responsive to receiving the uplink grant.

In some aspects, the communications manager 815 may monitor for a sub-band indication from a base station that indicates a first sub-band of a set of available sub-bands in an active bandwidth part for an uplink control channel communication from the UE to the base station within a shared radio frequency spectrum band, receive, from the base station, a fallback downlink control information communication that provides a downlink grant to the UE for a first downlink communication, where the fallback downlink control information communication has a predetermined number of bits, receive, from the base station, the first downlink communication, determine, based on the first downlink communication, uplink control channel information to be provided in the uplink control channel communication, and transmit, to the base station, the uplink control channel communication via the first sub-band.

In some aspects, the communications manager 815 may receive, from a base station, a fallback downlink control information communication that provides a downlink grant to the UE for a first downlink communication within a shared radio frequency spectrum band, where the fallback downlink control information communication has a predetermined number of bits, determine, based on a sub-band information field within the fallback downlink control information communication, one or more sub-bands of a set of available sub-bands in an active bandwidth part for an uplink control channel communication associated with the downlink grant, where the predetermined number of bits of the fallback downlink control information communication is maintained even though the sub-band information field is included within the fallback downlink control information communication, receive, from the base station, the first downlink communication, determine, based on the first downlink communication, uplink control channel information to be provided in the uplink control channel communication, and transmit, to the base station, the uplink control channel communication via the determined one or more sub-bands. The communications manager 815 may be an example of aspects of the communications manager 1110 described herein.

The actions performed by the communications manager 815 as described herein may be implemented to realize one or more potential advantages. One implementation may allow a UE 115 to save power and increase battery life by maintaining the predetermined number of bits of the fallback downlink control information communication even though the sub-band information field is included within the fallback downlink control information communication. Additionally or alternatively, the UE 115 may further increase reliability while communicating with a base station 105 using shared radio frequency spectrum bands in which available sub-bands for uplink communications may change. Another implementation may provide improved quality at the UE 115, as latency may be reduced.

The communications manager 815, or its sub-components, may be implemented in hardware, code (e.g., software or firmware) executed by a processor, or any combination thereof. If implemented in code executed by a processor, the functions of the communications manager 815, or its subcomponents may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some aspects, the communications manager 815, or its sub-components, may be a separate and distinct component in accordance with various aspects of the present disclosure. In some aspects, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some aspects, the transmitter 820 may be collocated with a receiver 810 in a transceiver module. In some aspects, the transmitter 820 may be an example of aspects of the transceiver 1120 described with reference to FIG. 11. The transmitter 820 may utilize a single antenna or a set of antennas.

Figure 9:
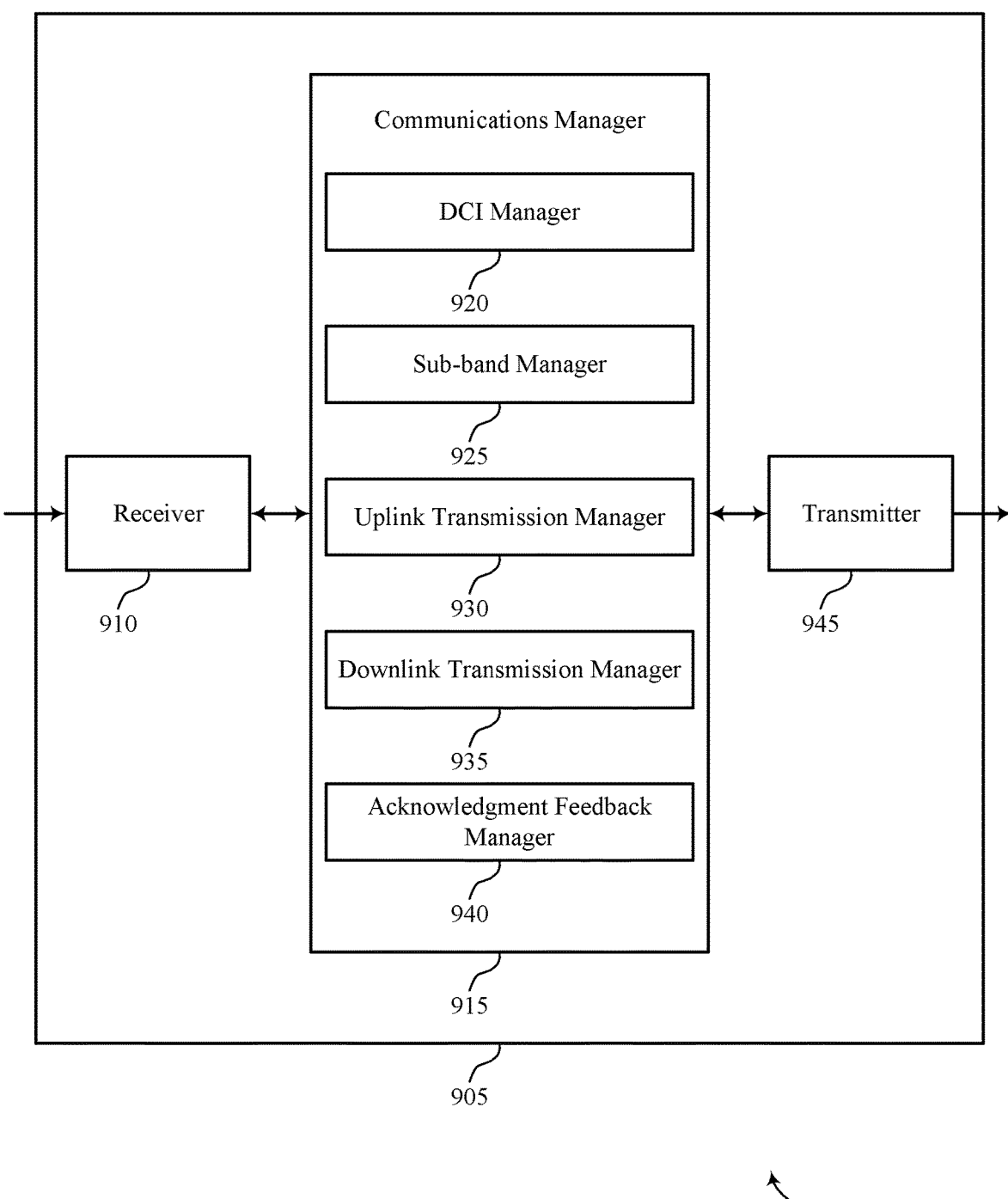

FIG. 9 shows a block diagram 900 of a device 905 that supports sub-band indication in downlink control information in shared radio frequency spectrum in accordance with aspects of the present disclosure. The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to sub-band indication in downlink control information in shared radio frequency spectrum, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a DCI manager 920, a sub-band manager 925, an uplink transmission manager 930, a downlink transmission manager 935, and an acknowledgment feedback manager 940. The communications manager 915 may be an example of aspects of the communications manager 1110 described herein.

In some aspects, the DCI manager 920 may receive, from a base station, a fallback downlink control information communication that provides an uplink grant to the UE within a shared radio frequency spectrum band, where the fallback downlink control information communication has a predetermined number of bits. The sub-band manager 925 may determine, based on a sub-band information field within the fallback downlink control information communication, one or more sub-bands of a set of available sub-bands in an active bandwidth part for an uplink communication associated with the uplink grant, where the predetermined number of bits of the fallback downlink control information communication is maintained even though the sub-band information field is included within the fallback downlink control information communication. The uplink transmission manager 930 may transmit, to the base station, the uplink communication via the determined one or more sub-bands.

In some aspects, the sub-band manager 925 may monitor for a sub-band indication from a base station that indicates a first sub-band of a set of available sub-bands in an active bandwidth part for an uplink communication from the UE to the base station within a shared radio frequency spectrum band and determine, based on the monitored signaling from the base station, that the first sub-band is to be used for the uplink communication. The DCI manager 920 may receive, from the base station, a fallback downlink control information communication that provides an uplink grant to the UE for the uplink communication, where the fallback downlink control information communication has a predetermined number of bits. The uplink transmission manager 930 may transmit, to the base station, the uplink communication via the first sub-band responsive to receiving the uplink grant.

In some aspects, the sub-band manager 925 may monitor for a sub-band indication from a base station that indicates a first sub-band of a set of available sub-bands in an active bandwidth part for an uplink control channel communication from the UE to the base station within a shared radio frequency spectrum band. The DCI manager 920 may receive, from the base station, a fallback downlink control information communication that provides a downlink grant to the UE for a first downlink communication, where the fallback downlink control information communication has a predetermined number of bits. The downlink transmission manager 935 may receive, from the base station, the first downlink communication. The acknowledgment feedback manager 940 may determine, based on the first downlink communication, uplink control channel information to be provided in the uplink control channel communication. The uplink transmission manager 930 may transmit, to the base station, the uplink control channel communication via the first sub-band.

In some aspects, the DCI manager 920 may receive, from a base station, a fallback downlink control information communication that provides a downlink grant to the UE for a first downlink communication within a shared radio frequency spectrum band, where the fallback downlink control information communication has a predetermined number of bits. The sub-band manager 925 may determine, based on a sub-band information field within the fallback downlink control information communication, one or more sub-bands of a set of available sub-bands in an active bandwidth part for an uplink control channel communication associated with the downlink grant, where the predetermined number of bits of the fallback downlink control information communication is maintained even though the sub-band information field is included within the fallback downlink control information communication. The downlink transmission manager 935 may receive, from the base station, the first downlink communication. The acknowledgment feedback manager 940 may determine, based on the first downlink communication, uplink control channel information to be provided in the uplink control channel communication. The uplink transmission manager 930 may transmit, to the base station, the uplink control channel communication via the determined one or more sub-bands.

The transmitter 945 may transmit signals generated by other components of the device 905. In some aspects, the transmitter 945 may be collocated with a receiver 910 in a transceiver module. In some aspects, the transmitter 945 may be an example of aspects of the transceiver 1120 described with reference to FIG. 11. The transmitter 945 may utilize a single antenna or a set of antennas.

Figure 10:
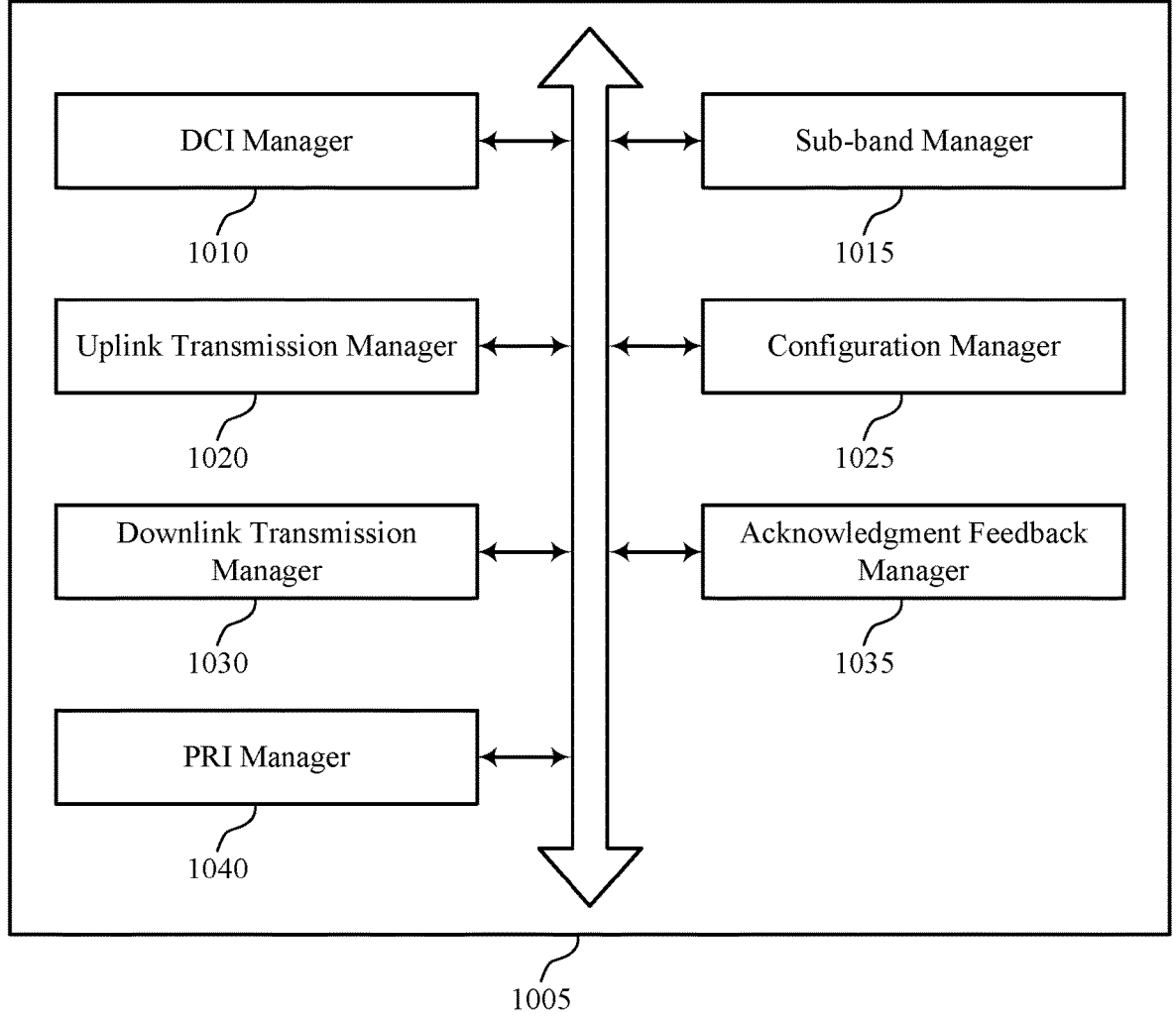
FIG. 10 shows a block diagram of a communications manager that supports sub-band indication in downlink control information in shared radio frequency spectrum bands in accordance with aspects of the present disclosure.

FIG. 10 shows a block diagram 1000 of a communications manager 1005 that supports sub-band indication in downlink control information in shared radio frequency spectrum in accordance with aspects of the present disclosure. The communications manager 1005 may be an example of aspects of a communications manager 815, a communications manager 915, or a communications manager 1110 described herein. The communications manager 1005 may include a DCI manager 1010, a sub-band manager 1015, an uplink transmission manager 1020, a configuration manager 1025, a downlink transmission manager 1030, an acknowledgment feedback manager 1035, and a PRI manager 1040. Each of these modules may communicate, directly or indirectly, with one another (e.g., via one or more buses).

The DCI manager 1010 may receive, from a base station, a fallback downlink control information communication that provides an uplink grant to the UE within a shared radio frequency spectrum band, where the fallback downlink control information communication has a predetermined number of bits. In some aspects, the DCI manager 1010 may receive, from a base station, a fallback downlink control information communication that provides a downlink grant to the UE for a first downlink communication within a shared radio frequency spectrum band, where the fallback downlink control information communication has a predetermined number of bits.

In some cases, the fallback downlink control information communication has a fallback downlink control information format, and where the predetermined number of bits is based on a length of a separate fallback downlink control information format for a downlink grant to the UE.

In some cases, the sub-band information field is located adjacent to a frequency division multiplexing resource assignment field in the fallback downlink control information communication, or is located subsequent to a latest information field in the fallback downlink control information communication that is present in an absence of the sub-band information field from the fallback downlink control information communication. In some cases, the sub-band information field occupies one or more bits that are used as zero-padding bits when the sub-band information field is absent from the fallback downlink control information communication. In some cases, the fallback downlink control information communication has a fallback downlink control information format, and where the monitoring for the sub-band indication is based on the fallback downlink control information format.

The sub-band manager 1015 may determine, based on a sub-band information field within the fallback downlink control information communication, one or more sub-bands of a set of available sub-bands in an active bandwidth part for an uplink communication associated with the uplink grant, where the predetermined number of bits of the fallback downlink control information communication is maintained even though the sub-band information field is included within the fallback downlink control information communication.

In some aspects, the sub-band manager 1015 may monitor for a sub-band indication from a base station that indicates a first sub-band of a set of available sub-bands in an active bandwidth part for an uplink communication from the UE to the base station within a shared radio frequency spectrum band. In some aspects, the sub-band manager 1015 may determine, based on the monitored signaling from the base station, that the first sub-band is to be used for the uplink communication.

In some aspects, the sub-band manager 1015 may monitor for a sub-band indication from a base station that indicates a first sub-band of a set of available sub-bands in an active bandwidth part for an uplink control channel communication from the UE to the base station within a shared radio frequency spectrum band. In some aspects, the sub-band manager 1015 may determine, based on a sub-band information field within the fallback downlink control information communication, one or more sub-bands of a set of available sub-bands in an active bandwidth part for an uplink control channel communication associated with the downlink grant, where the predetermined number of bits of the fallback downlink control information communication is maintained even though the sub-band information field is included within the fallback downlink control information communication. In some cases, a number of bits in the sub-band information field is determined based on a number of sub-bands of the set of available sub-bands. In some cases, the number of bits in the sub-band information field corresponds to a number of sub-bands in the active bandwidth part, a number of sub-bands in an initial bandwidth part used to establish a connection between the UE and the base station, is a predetermined number of sub-bands, is based on a maximum number of sub-bands that is supported in a largest configurable bandwidth, or any combinations thereof. In some cases, the sub-band information field is a bitmap having a bit length that corresponds to a number of sub-bands of the set of available sub-bands. In some cases, the sub-band information field is a bitfield, and where different available values of the bitfield are mapped to different contiguous sets of sub-bands. In some cases, the sub-band information field is a bitfield, and where different available values of the bitfield are mapped to a different single sub-band of the set of available sub-bands.

In some cases, a number of sub-bands of the set of available sub-bands is based on an actual number of sub-bands in the active bandwidth part, or a maximum number of sub-bands for a largest configurable bandwidth. In some cases, the first sub-band is one of a lowest sub-band of the active bandwidth part, a sub-band used to receive an SSB from the base station, a sub-band indicated in a PBCH received from the base station, a sub-band indicated in an RMSI communication received from the base station, a sub-band used to transmit the fallback downlink control information communication, or a lowest sub-band used to transmit the fallback downlink control information communication.

In some cases, a PRI field in the fallback downlink control information communication provides the sub-band indication. In some cases, the first sub-band is one of a lowest sub-band of the active bandwidth part, a sub-band used to receive an SSB from the base station, a sub-band indicated in a PBCH received from the base station, a sub-band indicated in an RMSI communication received from the base station, a sub-band used to transmit the fallback downlink control information communication, or a lowest sub-band used to transmit the fallback downlink control information communication. In some cases, the sub-band information field occupies one or more bits that are appended to downlink control information that is otherwise provided when the sub-band information field is absent from the fallback downlink control information communication.

In some cases, a number of bits in the sub-band information field corresponds to a number of sub-bands in the set of available sub-bands. In some cases, a number of bits of the sub-band information field is based on a number of different sub-bands of the set of available sub-bands in the active bandwidth part or an initial bandwidth part. In some cases, a number of bits of the sub-band information field is configured by the base station based on a number of different sub-bands of a largest supported system bandwidth.

The uplink transmission manager 1020 may transmit, to the base station, the uplink communication via the determined one or more sub-bands. The downlink transmission manager 1030 may receive, from the base station, the first downlink communication. The acknowledgment feedback manager 1035 may determine, based on the first downlink communication, uplink control channel information to be provided in the uplink control channel communication.

The configuration manager 1025 may receive, from the base station, configuration information that indicates whether the fallback downlink control information communication includes the sub-band information field. In some aspects, the configuration manager 1025 may receive, from the base station, configuration information that indicates whether to monitor for the sub-band indication.

In some cases, the configuration information is received in RRC signaling, in RMSI signaling, in a PBCH transmission, or any combinations thereof.

The PRI manager 1040 may identify a PRI provided by the base station and a corresponding PRI table with corresponding parameters for uplink control channel resources. In some cases, the configuration information indicates that a PRI field in the fallback downlink control information communication provides the sub-band information.

Figure 11:
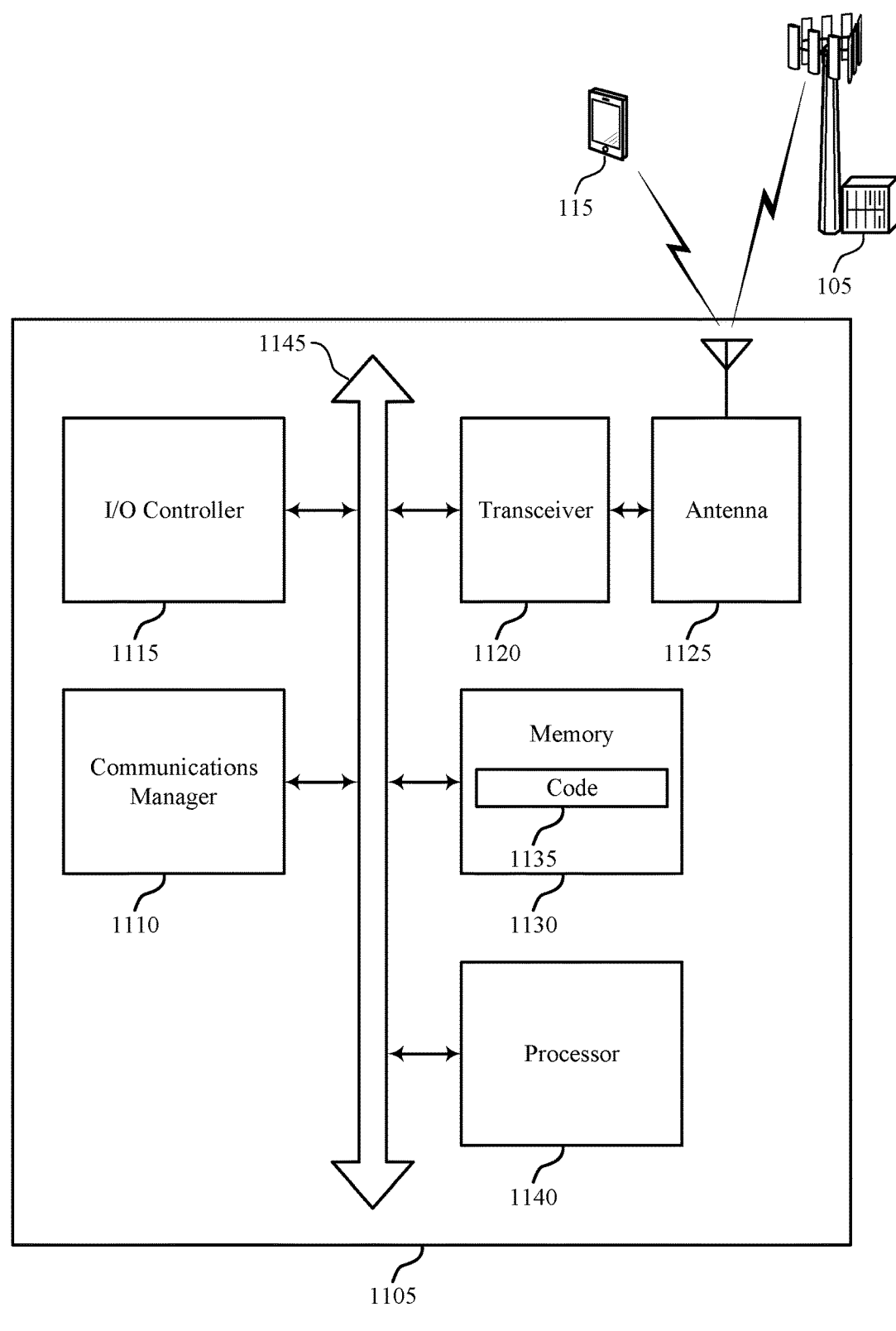
FIG. 11 shows a diagram of a system including a device that supports sub-band indication in downlink control information in shared radio frequency spectrum bands in accordance with aspects of the present disclosure.

FIG. 11 shows a diagram of a system 1100 including a device 1105 that supports sub-band indication in downlink control information in shared radio frequency spectrum in accordance with aspects of the present disclosure. The device 1105 may be an example of or include the components of device 805, device 905, or a UE 115 as described herein. The device 1105 may include components for bidirectional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

In some aspects, the communications manager 1110 may receive, from a base station, a fallback downlink control information communication that provides an uplink grant to the UE within a shared radio frequency spectrum band, where the fallback downlink control information communication has a predetermined number of bits, determine, based on a sub-band information field within the fallback downlink control information communication, one or more sub-bands of a set of available sub-bands in an active bandwidth part for an uplink communication associated with the uplink grant, where the predetermined number of bits of the fallback downlink control information communication is maintained even though the sub-band information field is included within the fallback downlink control information communication, and transmit, to the base station, the uplink communication via the determined one or more sub-bands.

In some aspects, the communications manager 1110 may monitor for a sub-band indication from a base station that indicates a first sub-band of a set of available sub-bands in an active bandwidth part for an uplink communication from the UE to the base station within a shared radio frequency spectrum band, determine, based on the monitored signaling from the base station, that the first sub-band is to be used for the uplink communication, receive, from the base station, a fallback downlink control information communication that provides an uplink grant to the UE for the uplink communication, where the fallback downlink control information communication has a predetermined number of bits, and transmit, to the base station, the uplink communication via the first sub-band responsive to receiving the uplink grant.

In some aspects, the communications manager 1110 may monitor for a sub-band indication from a base station that indicates a first sub-band of a set of available sub-bands in an active bandwidth part for an uplink control channel communication from the UE to the base station within a shared radio frequency spectrum band, receive, from the base station, a fallback downlink control information communication that provides a downlink grant to the UE for a first downlink communication, where the fallback downlink control information communication has a predetermined number of bits, receive, from the base station, the first downlink communication, determine, based on the first downlink communication, uplink control channel information to be provided in the uplink control channel communication, and transmit, to the base station, the uplink control channel communication via the first sub-band.

In some aspects, the communications manager 1110 may receive, from a base station, a fallback downlink control information communication that provides a downlink grant to the UE for a first downlink communication within a shared radio frequency spectrum band, where the fallback downlink control information communication has a predetermined number of bits, determine, based on a sub-band information field within the fallback downlink control information communication, one or more sub-bands of a set of available sub-bands in an active bandwidth part for an uplink control channel communication associated with the downlink grant, where the predetermined number of bits of the fallback downlink control information communication is maintained even though the sub-band information field is included within the fallback downlink control information communication, receive, from the base station, the first downlink communication, determine, based on the first downlink communication, uplink control channel information to be provided in the uplink control channel communication, and transmit, to the base station, the uplink control channel communication via the determined one or more sub-bands.

Based on receiving, from a base station 105, a fallback downlink control information communication that provides a downlink grant to the UE for a first downlink communication within a shared radio frequency spectrum band, a processor of a UE 115 (e.g., controlling the receiver 910, the transmitter 945, as described with reference to FIG. 9 or the transceiver 1120) may efficiently determine one or more sub-bands of a set of available sub-bands in an active bandwidth part for an uplink control channel communication associated with the downlink grant. Further, the processor of UE 115 may transmit the uplink control channel communication via the determined one or more sub-bands. The processor of the UE 115 may turn on one or more processing units for receiving the downlink grant, increase a processing clock, or a similar mechanism within the UE 115. As such, when the downlink grant is received, the processor may be ready to respond more efficiently through the reduction of a ramp up in processing power.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. In some aspects, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include random access-memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting sub-band indication in downlink control information in shared radio frequency spectrum).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
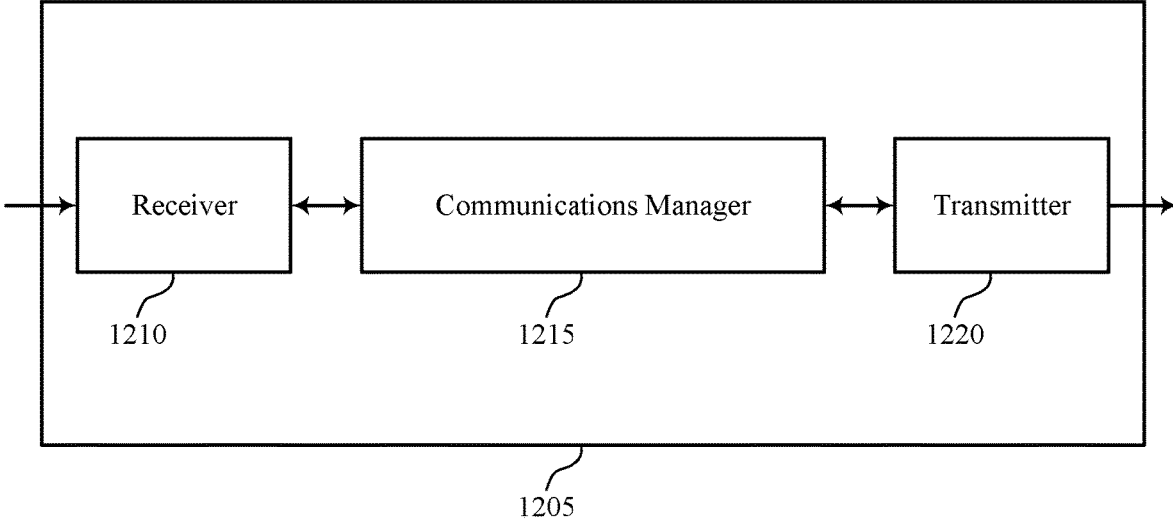
FIGS. 12 and 13 show block diagrams of devices that support sub-band indication in downlink control information in shared radio frequency spectrum bands in accordance with aspects of the present disclosure.

FIG. 12 shows a block diagram 1200 of a device 1205 that supports sub-band indication in downlink control information in shared radio frequency spectrum in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to sub-band indication in downlink control information in shared radio frequency spectrum, etc.). Information may be passed on to other components of the device 1205. The receiver 1210 may be an example of aspects of the transceiver 1520 described with reference to FIG. 15. The receiver 1210 may utilize a single antenna or a set of antennas.

In some aspects, the communications manager 1215 may identify one or more sub-bands of a set of available sub-bands in an active bandwidth part for an uplink communication from a UE within a shared radio frequency spectrum band, transmit a fallback downlink control information communication to the UE that provides an uplink grant for the uplink communication and indicates the one or more sub-bands, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication, and monitor the one or more sub-bands for the uplink communication from the base station.

In some aspects, the communications manager 1215 may transmit a sub-band indication to a UE that indicates a first sub-band of a set of available sub-bands in an active bandwidth part for an uplink communication from the UE to the base station within a shared radio frequency spectrum band, transmit, to the UE, a fallback downlink control information communication that provides an uplink grant to the UE for the uplink communication, where the fallback downlink control information communication has a predetermined number of bits, and monitor the first sub-band for the uplink communication from the UE.

In some aspects, the communications manager 1215 may transmit, to a UE, a sub-band indication that indicates a first sub-band of a set of available sub-bands in an active bandwidth part for an uplink control channel communication from the UE to the base station within a shared radio frequency spectrum band, transmit, to the UE, a fallback downlink control information communication that provides a downlink grant to the UE for a first downlink communication, where the fallback downlink control information communication has a predetermined number of bits, transmit the first downlink communication to the UE based on the downlink grant, and monitor the first sub-band for the uplink control channel communication from the UE.

In some aspects, the communications manager 1215 may identify one or more sub-bands of a set of available sub-bands in an active bandwidth part for an uplink control channel communication from a UE within a shared radio frequency spectrum band, transmit a fallback downlink control information communication to the UE that provides a downlink grant to the UE for a first downlink communication, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication, transmit the first downlink communication to the UE, and monitor the one or more sub-bands for the uplink control channel communication from the UE. The communications manager 1215 may be an example of aspects of the communications manager 1510 described herein.

The actions performed by the communications manager 1215 as described herein may be implemented to realize one or more potential advantages. One implementation may allow a UE 115 to save power and increase battery life by maintaining the predetermined number of bits of the fallback downlink control information communication even though the sub-band information field is included within the fallback downlink control information communication. Additionally or alternatively, the base station 105 may further increase reliability while communicating with a UE 115 using shared radio frequency spectrum bands in which available sub-bands for uplink communications may change. Another implementation may provide improved quality at the base station 105, as latency may be reduced.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some aspects, the communications manager 1215, or its sub-components, may be a separate and distinct component in accordance with various aspects of the present disclosure. In some aspects, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some aspects, the transmitter 1220 may be collocated with a receiver 1210 in a transceiver module. In some aspects, the transmitter 1220 may be an example of aspects of the transceiver 1520 described with reference to FIG. 15. The transmitter 1220 may utilize a single antenna or a set of antennas.

Figure 13:
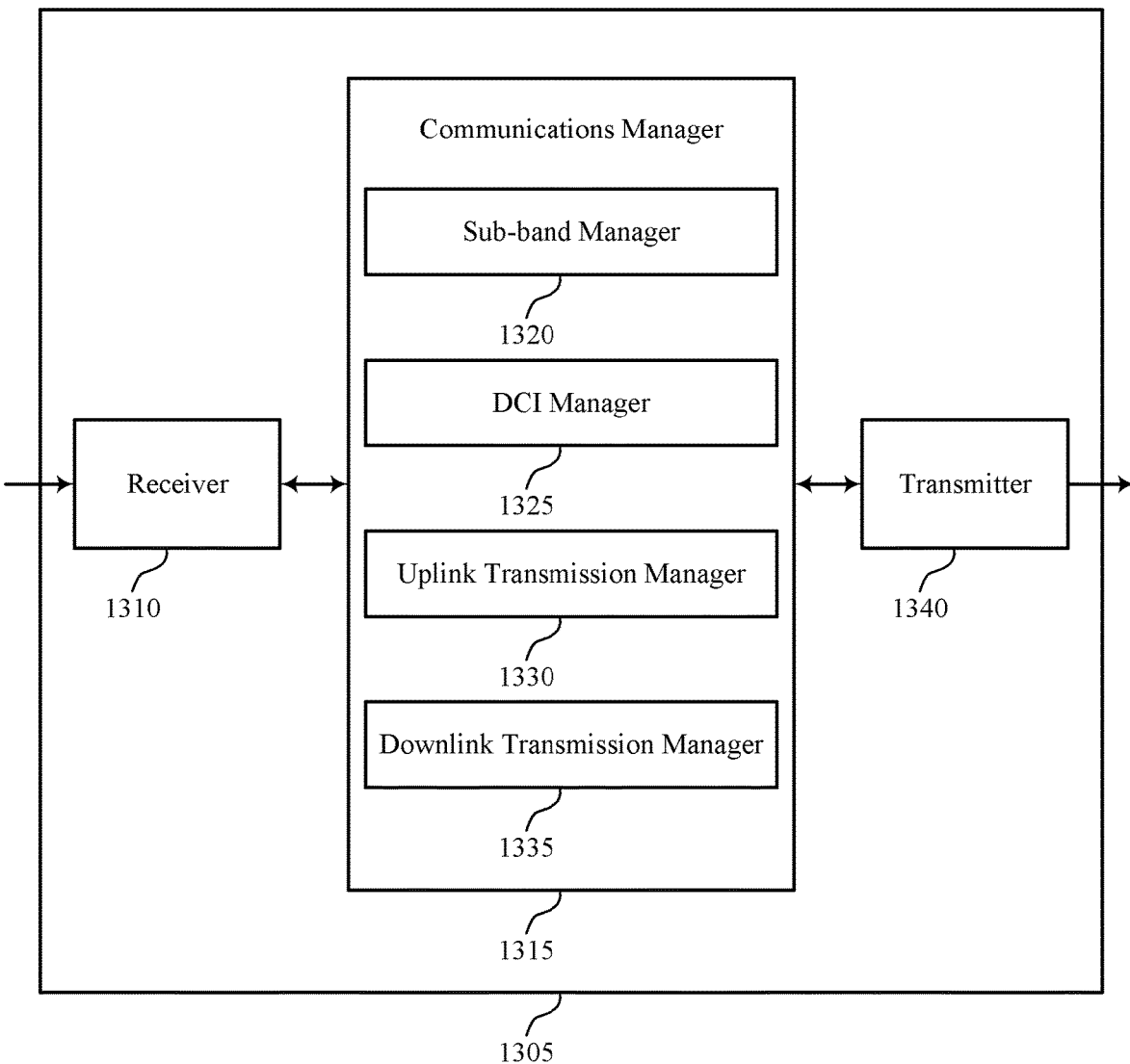

FIG. 13 shows a block diagram 1300 of a device 1305 that supports sub-band indication in downlink control information in shared radio frequency spectrum in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to sub-band indication in downlink control information in shared radio frequency spectrum, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a sub-band manager 1320, a DCI manager 1325, an uplink transmission manager 1330, and a downlink transmission manager 1335. The communications manager 1315 may be an example of aspects of the communications manager 1510 described herein.

In some aspects, the sub-band manager 1320 may identify one or more sub-bands of a set of available sub-bands in an active bandwidth part for an uplink communication from a UE within a shared radio frequency spectrum band. The DCI manager 1325 may transmit a fallback downlink control information communication to the UE that provides an uplink grant for the uplink communication and indicates the one or more sub-bands, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication. The uplink transmission manager 1330 may monitor the one or more sub-bands for the uplink communication from the base station.

In some aspects, the sub-band manager 1320 may transmit a sub-band indication to a UE that indicates a first sub-band of a set of available sub-bands in an active bandwidth part for an uplink communication from the UE to the base station within a shared radio frequency spectrum band. The DCI manager 1325 may transmit, to the UE, a fallback downlink control information communication that provides an uplink grant to the UE for the uplink communication, where the fallback downlink control information communication has a predetermined number of bits. The uplink transmission manager 1330 may monitor the first sub-band for the uplink communication from the UE.

In some aspects, the sub-band manager 1320 may transmit, to a UE, a sub-band indication that indicates a first sub-band of a set of available sub-bands in an active bandwidth part for an uplink control channel communication from the UE to the base station within a shared radio frequency spectrum band. The DCI manager 1325 may transmit, to the UE, a fallback downlink control information communication that provides a downlink grant to the UE for a first downlink communication, where the fallback downlink control information communication has a predetermined number of bits. The downlink transmission manager 1335 may transmit the first downlink communication to the UE based on the downlink grant. The uplink transmission manager 1330 may monitor the first sub-band for the uplink control channel communication from the UE.

In some aspects, the sub-band manager 1320 may identify one or more sub-bands of a set of available sub-bands in an active bandwidth part for an uplink control channel communication from a UE within a shared radio frequency spectrum band. The DCI manager 1325 may transmit a fallback downlink control information communication to the UE that provides a downlink grant to the UE for a first downlink communication, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication. The downlink transmission manager 1335 may transmit the first downlink communication to the UE. The uplink transmission manager 1330 may monitor the one or more sub-bands for the uplink control channel communication from the UE.

The transmitter 1340 may transmit signals generated by other components of the device 1305. In some aspects, the transmitter 1340 may be collocated with a receiver 1310 in a transceiver module. In some aspects, the transmitter 1340 may be an example of aspects of the transceiver 1520 described with reference to FIG. 15. The transmitter 1340 may utilize a single antenna or a set of antennas.

Figure 14:
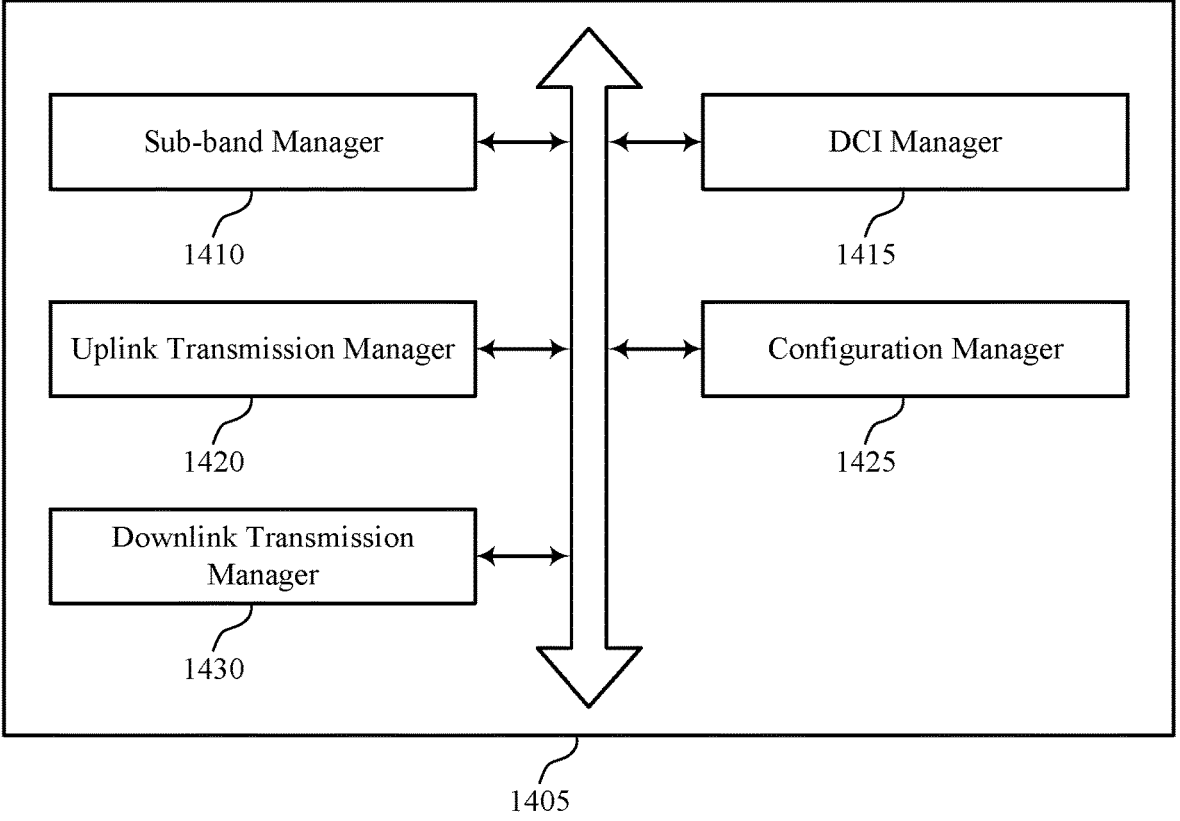
FIG. 14 shows a block diagram of a communications manager that supports sub-band indication in downlink control information in shared radio frequency spectrum bands in accordance with aspects of the present disclosure.

FIG. 14 shows a block diagram 1400 of a communications manager 1405 that supports sub-band indication in downlink control information in shared radio frequency spectrum in accordance with aspects of the present disclosure. The communications manager 1405 may be an example of aspects of a communications manager 1215, a communications manager 1315, or a communications manager 1510 described herein. The communications manager 1405 may include a sub-band manager 1410, a DCI manager 1415, an uplink transmission manager 1420, a configuration manager 1425, and a downlink transmission manager 1430. Each of these modules may communicate, directly or indirectly, with one another (e.g., via one or more buses).

The sub-band manager 1410 may identify one or more sub-bands of a set of available sub-bands in an active bandwidth part for an uplink communication from a UE within a shared radio frequency spectrum band. In some aspects, the sub-band manager 1410 may transmit a sub-band indication to a UE that indicates a first sub-band of a set of available sub-bands in an active bandwidth part for an uplink communication from the UE to the base station within a shared radio frequency spectrum band. In some aspects, the sub-band manager 1410 may transmit, to a UE, a sub-band indication that indicates a first sub-band of a set of available sub-bands in an active bandwidth part for an uplink control channel communication from the UE to the base station within a shared radio frequency spectrum band.

In some cases, the sub-band information field is located adjacent to a frequency division multiplexing resource assignment field in the fallback downlink control information communication, or is located subsequent to a latest information field in the fallback downlink control information communication that is present in an absence of the sub-band information field from the fallback downlink control information communication. In some cases, the sub-band information field occupies one or more bits that are used as zero-padding bits when the sub-band information field is absent from the fallback downlink control information communication. In some cases, a number of bits in the sub-band information field is determined based on a number of sub-bands of the set of available sub-bands. In some cases, the number of bits in the sub-band information field corresponds to a number of sub-bands in the active bandwidth part, a number of sub-bands in an initial bandwidth part used to establish a connection between the UE and the base station, is a predetermined number of sub-bands, is based on a maximum number of sub-bands that is supported in a largest configurable bandwidth, or any combinations thereof. In some cases, the sub-band information field is a bitmap having a bit length that corresponds to a number of sub-bands of the set of available sub-bands. In some cases, the sub-band information field is a bitfield, and where different available values of the bitfield are mapped to different contiguous sets of sub-bands. In some cases, the sub-band information field is a bitfield, and where different available values of the bitfield are mapped to a different single sub-bands of the set of available sub-bands. In some cases, a number of sub-bands of the set of available sub-bands is based on an actual number of sub-bands in the active bandwidth part, or a maximum number of sub-bands for a largest configurable bandwidth.

In some cases, the first sub-band is one of a lowest sub-band of the active bandwidth part, a sub-band used to receive an SSB from the base station, a sub-band indicated in a PBCH received from the base station, a sub-band indicated in an RMSI communication received from the base station, a sub-band used to transmit the fallback downlink control information communication, or a lowest sub-band used to transmit the fallback downlink control information communication. In some cases, a PRI field in the fallback downlink control information communication provides the sub-band indication.

In some cases, the first sub-band is one of a lowest sub-band of the active bandwidth part, a sub-band used to receive an SSB from the base station, a sub-band indicated in a PBCH received from the base station, a sub-band indicated in an RMSI communication received from the base station, a sub-band used to transmit the fallback downlink control information communication, or a lowest sub-band used to transmit the fallback downlink control information communication. In some cases, the sub-band information field occupies one or more bits that are appended to downlink control information that is otherwise provided when the sub-band information field is absent from the fallback downlink control information communication.

The DCI manager 1415 may transmit a fallback downlink control information communication to the UE that provides an uplink grant for the uplink communication and indicates the one or more sub-bands, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication. In some aspects, the DCI manager 1415 may transmit, to the UE, a fallback downlink control information communication that provides an uplink grant to the UE for the uplink communication, where the fallback downlink control information communication has a predetermined number of bits. In some aspects, the DCI manager 1415 may transmit, to the UE, a fallback downlink control information communication that provides a downlink grant to the UE for a first downlink communication, where the fallback downlink control information communication has a predetermined number of bits.

In some aspects, the DCI manager 1415 may transmit a fallback downlink control information communication to the UE that provides a downlink grant to the UE for a first downlink communication, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication. In some cases, the fallback downlink control information communication has a fallback downlink control information format, and where the predetermined number of bits is based on a length of a separate downlink control information format for a downlink grant to the UE.

The uplink transmission manager 1420 may monitor the one or more sub-bands for the uplink communication from the base station. The downlink transmission manager 1430 may transmit the first downlink communication to the UE based on the downlink grant. In some aspects, the downlink transmission manager 1430 may transmit the first downlink communication to the UE.

The configuration manager 1425 may transmit, to the UE, configuration information that indicates whether the fallback downlink control information communication includes the sub-band information field. In some aspects, the configuration manager 1425 may transmit, to the UE, configuration information that indicates whether to monitor for the sub-band indication. In some aspects, the configuration manager 1425 may transmit configuration information to the UE that indicates to monitor for the sub-band indication from the base station. In some cases, the configuration information is transmitted in RRC signaling, in RMSI signaling, in a PBCH transmission, or any combinations thereof.

Figure 15:
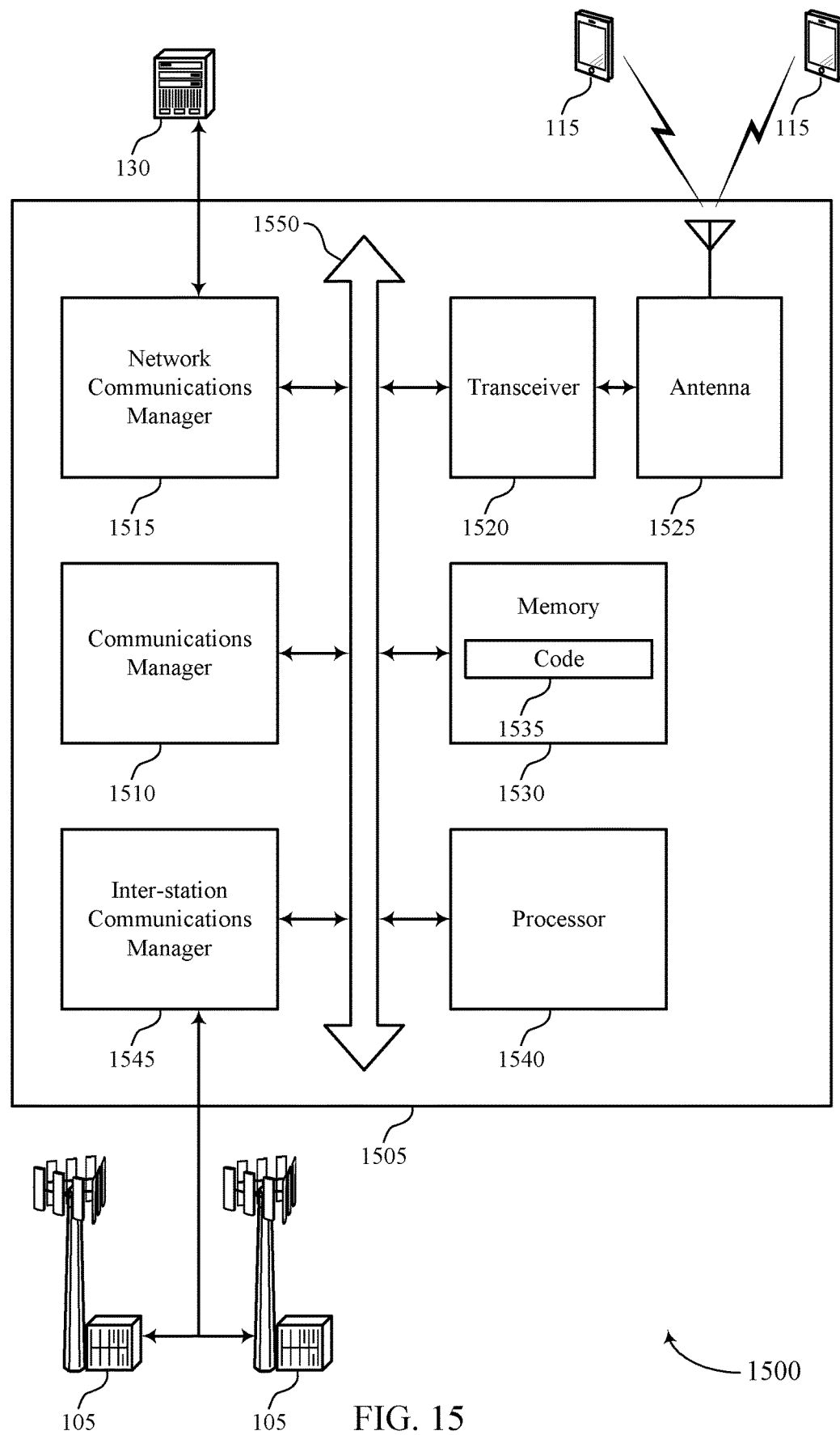
FIG. 15 shows a diagram of a system including a device that supports sub-band indication in downlink control information in shared radio frequency spectrum bands in accordance with aspects of the present disclosure.

FIG. 15 shows a diagram of a system 1500 including a device 1505 that supports sub-band indication in downlink control information in shared radio frequency spectrum in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

In some aspects, the communications manager 1510 may identify one or more sub-bands of a set of available sub-bands in an active bandwidth part for an uplink communication from a UE within a shared radio frequency spectrum band, transmit a fallback downlink control information communication to the UE that provides an uplink grant for the uplink communication and indicates the one or more sub-bands, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication, and monitor the one or more sub-bands for the uplink communication from the base station.

In some aspects, the communications manager 1510 may transmit a sub-band indication to a UE that indicates a first sub-band of a set of available sub-bands in an active bandwidth part for an uplink communication from the UE to the base station within a shared radio frequency spectrum band, transmit, to the UE, a fallback downlink control information communication that provides an uplink grant to the UE for the uplink communication, where the fallback downlink control information communication has a predetermined number of bits, and monitor the first sub-band for the uplink communication from the UE.

In some aspects, the communications manager 1510 may transmit, to a UE, a sub-band indication that indicates a first sub-band of a set of available sub-bands in an active bandwidth part for an uplink control channel communication from the UE to the base station within a shared radio frequency spectrum band, transmit, to the UE, a fallback downlink control information communication that provides a downlink grant to the UE for a first downlink communication, where the fallback downlink control information communication has a predetermined number of bits, transmit the first downlink communication to the UE based on the downlink grant, and monitor the first sub-band for the uplink control channel communication from the UE.

In some aspects, the communications manager 1510 may identify one or more sub-bands of a set of available sub-bands in an active bandwidth part for an uplink control channel communication from a UE within a shared radio frequency spectrum band, transmit a fallback downlink control information communication to the UE that provides a downlink grant to the UE for a first downlink communication, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication, transmit the first downlink communication to the UE, and monitor the one or more sub-bands for the uplink control channel communication from the UE.

Based on transmitting, to a UE 115, a fallback downlink control information communication that provides a downlink grant to the UE 115 for a first downlink communication within a shared radio frequency spectrum band, a processor of a base station (e.g., controlling the receiver 1410, the transmitter 1340, as described with reference to FIG. 13, or the transceiver 1520) may efficiently transmit the first downlink communication to the UE. Further, the processor of UE 115 may transmit the uplink control channel communication via the determined one or more sub-bands. The processor of the base station 105 may turn on one or more processing units for transmitting the first downlink communication to the UE, increase a processing clock, or a similar mechanism within the UE 115. As such, when the first downlink communication is transmitted, the processor may be ready to respond more efficiently through the reduction of a ramp up in processing power.

The network communications manager 1515 may manage communications with the core network (e.g., via one or more wired backhaul links). In some aspects, the network communications manager 1515 may manage the transfer of data communications for client devices, such as one or more UEs 115.

The transceiver 1520 may communicate bi-directionally, via one or more antennas, wired, or wireless links as described herein. In some aspects, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases, the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting sub-band indication in downlink control information in shared radio frequency spectrum).

The inter-station communications manager 1545 may manage communications with other base station 105, and may include a controller or scheduler for controlling communications with UEs 115 in cooperation with other base stations 105. In some aspects, the inter-station communications manager 1545 may coordinate scheduling for transmissions to UEs 115 for various interference mitigation techniques such as beamforming or joint transmission. In some aspects, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

FIG. 16 shows a flowchart illustrating a method 1600 that supports sub-band indication in downlink control information in shared radio frequency spectrum in accordance with aspects of the present disclosure. The operations of method 1600 may be implemented by a UE 115 or its components as described herein. In some aspects, the operations of method 1600 may be performed by a communications manager as described with reference to FIGS. 8 through 11. In some aspects, a UE may execute a set of instructions to control the functional elements of the UE to perform the functions described herein. Additionally or alternatively, a UE may perform aspects of the functions described herein using special-purpose hardware.

At 1605, the UE may receive, from a base station, a fallback downlink control information communication that provides an uplink grant to the UE within a shared radio frequency spectrum band, where the fallback downlink control information communication has a predetermined number of bits. The operations of 1605 may be performed according to the methods described herein. In some aspects, aspects of the operations of 1605 may be performed by a DCI manager as described with reference to FIGS. 8 through 11.

At 1610, the UE may determine, based on a sub-band information field within the fallback downlink control information communication, one or more sub-bands of a set of available sub-bands in an active bandwidth part for an uplink communication associated with the uplink grant, where the predetermined number of bits of the fallback downlink control information communication is maintained even though the sub-band information field is included within the fallback downlink control information communication. The operations of 1610 may be performed according to the methods described herein. In some aspects, aspects of the operations of 1610 may be performed by a sub-band manager as described with reference to FIGS. 8 through 11.

At 1615, the UE may transmit, to the base station, the uplink communication via the determined one or more sub-bands. The operations of 1615 may be performed according to the methods described herein. In some aspects, aspects of the operations of 1615 may be performed by an uplink transmission manager as described with reference to FIGS. 8 through 11.

FIG. 17 shows a flowchart illustrating a method 1700 that supports sub-band indication in downlink control information in shared radio frequency spectrum in accordance with aspects of the present disclosure. The operations of method 1700 may be implemented by a UE 115 or its components as described herein. In some aspects, the operations of method 1700 may be performed by a communications manager as described with reference to FIGS. 8 through 11. In some aspects, a UE may execute a set of instructions to control the functional elements of the UE to perform the functions described herein. Additionally or alternatively, a UE may perform aspects of the functions described herein using special-purpose hardware.

At 1705, the UE may receive, from a base station, configuration information that indicates whether the fallback downlink control information communication includes the sub-band information field. The operations of 1705 may be performed according to the methods described herein. In some aspects, aspects of the operations of 1705 may be performed by a configuration manager as described with reference to FIGS. 8 through 11. In some cases, the configuration information is received in RRC signaling, in RMSI signaling, in a PBCH transmission, or any combinations thereof.

At 1710, the UE may receive, from the base station, a fallback downlink control information communication that provides an uplink grant to the UE within a shared radio frequency spectrum band, where the fallback downlink control information communication has a predetermined number of bits. The operations of 1710 may be performed according to the methods described herein. In some aspects, aspects of the operations of 1710 may be performed by a DCI manager as described with reference to FIGS. 8 through 11. In some cases, the fallback downlink control information communication has a fallback downlink control information format, and where the predetermined number of bits is based on a length of a separate fallback downlink control information format for a downlink grant to the UE.

At 1715, the UE may determine, based on a sub-band information field within the fallback downlink control information communication, one or more sub-bands of a set of available sub-bands in an active bandwidth part for an uplink communication associated with the uplink grant, where the predetermined number of bits of the fallback downlink control information communication is maintained even though the sub-band information field is included within the fallback downlink control information communication. The operations of 1715 may be performed according to the methods described herein. In some aspects, aspects of the operations of 1715 may be performed by a sub-band manager as described with reference to FIGS. 8 through 11. In some cases, the sub-band information field is located adjacent to a frequency division multiplexing resource assignment field in the fallback downlink control information communication, or is located subsequent to a latest information field in the fallback downlink control information communication that is present in an absence of the sub-band information field from the fallback downlink control information communication. In some cases, the sub-band information field occupies one or more bits that are used as zero-padding bits when the sub-band information field is absent from the fallback downlink control information communication.

At 1720, the UE may transmit, to the base station, the uplink communication via the determined one or more sub-bands. The operations of 1720 may be performed according to the methods described herein. In some aspects, aspects of the operations of 1720 may be performed by an uplink transmission manager as described with reference to FIGS. 8 through 11.

FIG. 18 shows a flowchart illustrating a method 1800 that supports sub-band indication in downlink control information in shared radio frequency spectrum in accordance with aspects of the present disclosure. The operations of method 1800 may be implemented by a UE 115 or its components as described herein. In some aspects, the operations of method 1800 may be performed by a communications manager as described with reference to FIGS. 8 through 11. In some aspects, a UE may execute a set of instructions to control the functional elements of the UE to perform the functions described herein. Additionally or alternatively, a UE may perform aspects of the functions described herein using special-purpose hardware.

At 1805, the UE may monitor for a sub-band indication from a base station that indicates a first sub-band of a set of available sub-bands in an active bandwidth part for an uplink communication from the UE to the base station within a shared radio frequency spectrum band. The operations of 1805 may be performed according to the methods described herein. In some aspects, aspects of the operations of 1805 may be performed by a sub-band manager as described with reference to FIGS. 8 through 11.

At 1810, the UE may receive, from the base station, a fallback downlink control information communication that provides an uplink grant to the UE for the uplink communication, where the fallback downlink control information communication has a predetermined number of bits. The operations of 1810 may be performed according to the methods described herein. In some aspects, aspects of the operations of 1810 may be performed by a DCI manager as described with reference to FIGS. 8 through 11.

At 1815, the UE may determine, based on the monitored signaling from the base station, that the first sub-band is to be used for the uplink communication. The operations of 1815 may be performed according to the methods described herein. In some aspects, aspects of the operations of 1815 may be performed by a sub-band manager as described with reference to FIGS. 8 through 11. In some cases, the first sub-band is one of a lowest sub-band of the active bandwidth part, a sub-band used to receive an SSB from the base station, a sub-band indicated in a PBCH received from the base station, a sub-band indicated in an RMSI communication received from the base station, a sub-band used to transmit the fallback downlink control information communication, or a lowest sub-band used to transmit the fallback downlink control information communication.

At 1820, the UE may transmit, to the base station, the uplink communication via the first sub-band responsive to receiving the uplink grant. The operations of 1820 may be performed according to the methods described herein. In some aspects, aspects of the operations of 1820 may be performed by an uplink transmission manager as described with reference to FIGS. 8 through 11.

FIG. 19 shows a flowchart illustrating a method 1900 that supports sub-band indication in downlink control information in shared radio frequency spectrum in accordance with aspects of the present disclosure. The operations of method 1900 may be implemented by a UE 115 or its components as described herein. In some aspects, the operations of method 1900 may be performed by a communications manager as described with reference to FIGS. 8 through 11. In some aspects, a UE may execute a set of instructions to control the functional elements of the UE to perform the functions described herein. Additionally or alternatively, a UE may perform aspects of the functions described herein using special-purpose hardware.

At 1905, the UE may receive, from the base station, configuration information that indicates whether to monitor for the sub-band indication. The operations of 1905 may be performed according to the methods described herein. In some aspects, aspects of the operations of 1905 may be performed by a configuration manager as described with reference to FIGS. 8 through 11. In some cases, the configuration information is received in RRC signaling, in RMSI signaling, in a PBCH transmission, or any combinations thereof.

At 1910, the UE may monitor for a sub-band indication from a base station that indicates a first sub-band of a set of available sub-bands in an active bandwidth part for an uplink communication from the UE to the base station within a shared radio frequency spectrum band. The operations of 1910 may be performed according to the methods described herein. In some aspects, aspects of the operations of 1910 may be performed by a sub-band manager as described with reference to FIGS. 8 through 11.

At 1915, the UE may receive, from the base station, a fallback downlink control information communication that provides an uplink grant to the UE for the uplink communication, where the fallback downlink control information communication has a predetermined number of bits. The operations of 1915 may be performed according to the methods described herein. In some aspects, aspects of the operations of 1915 may be performed by a DCI manager as described with reference to FIGS. 8 through 11.

At 1920, the UE may determine, based on the monitored signaling from the base station, that the first sub-band is to be used for the uplink communication. The operations of 1920 may be performed according to the methods described herein. In some aspects, aspects of the operations of 1920 may be performed by a sub-band manager as described with reference to FIGS. 8 through 11.

At 1925, the UE may transmit, to the base station, the uplink communication via the first sub-band responsive to receiving the uplink grant. The operations of 1925 may be performed according to the methods described herein. In some aspects, aspects of the operations of 1925 may be performed by an uplink transmission manager as described with reference to FIGS. 8 through 11.

FIG. 20 shows a flowchart illustrating a method 2000 that supports sub-band indication in downlink control information in shared radio frequency spectrum in accordance with aspects of the present disclosure. The operations of method 2000 may be implemented by a UE 115 or its components as described herein. In some aspects, the operations of method 2000 may be performed by a communications manager as described with reference to FIGS. 8 through 11. In some aspects, a UE may execute a set of instructions to control the functional elements of the UE to perform the functions described herein. Additionally or alternatively, a UE may perform aspects of the functions described herein using special-purpose hardware.

At 2005, the UE may monitor for a sub-band indication from a base station that indicates a first sub-band of a set of available sub-bands in an active bandwidth part for an uplink control channel communication from the UE to the base station within a shared radio frequency spectrum band. The operations of 2005 may be performed according to the methods described herein. In some aspects, aspects of the operations of 2005 may be performed by a sub-band manager as described with reference to FIGS. 8 through 11.

At 2010, the UE may receive, from the base station, a fallback downlink control information communication that provides a downlink grant to the UE for a first downlink communication, where the fallback downlink control information communication has a predetermined number of bits. The operations of 2010 may be performed according to the methods described herein. In some aspects, aspects of the operations of 2010 may be performed by a DCI manager as described with reference to FIGS. 8 through 11.

At 2015, the UE may receive, from the base station, the first downlink communication. The operations of 2015 may be performed according to the methods described herein. In some aspects, aspects of the operations of 2015 may be performed by a downlink transmission manager as described with reference to FIGS. 8 through 11.

At 2020, the UE may determine, based on the first downlink communication, uplink control channel information to be provided in the uplink control channel communication. The operations of 2020 may be performed according to the methods described herein. In some aspects, aspects of the operations of 2020 may be performed by an acknowledgment feedback manager as described with reference to FIGS. 8 through 11.

At 2025, the UE may transmit, to the base station, the uplink control channel communication via the first sub-band. The operations of 2025 may be performed according to the methods described herein. In some aspects, aspects of the operations of 2025 may be performed by an uplink transmission manager as described with reference to FIGS. 8 through 11.

FIG. 21 shows a flowchart illustrating a method 2100 that supports sub-band indication in downlink control information in shared radio frequency spectrum in accordance with aspects of the present disclosure. The operations of method 2100 may be implemented by a UE 115 or its components as described herein. In some aspects, the operations of method 2100 may be performed by a communications manager as described with reference to FIGS. 8 through 11.

In some aspects, a UE may execute a set of instructions to control the functional elements of the UE to perform the functions described herein. Additionally or alternatively, a UE may perform aspects of the functions described herein using special-purpose hardware.

At 2105, the UE may receive, from the base station, configuration information that indicates to monitor for the sub-band indication from the base station. The operations of 2105 may be performed according to the methods described herein. In some aspects, aspects of the operations of 2105 may be performed by a configuration manager as described with reference to FIGS. 8 through 11. In some cases, the configuration information is received in RRC signaling, in RMSI signaling, in a PBCH transmission, or any combinations thereof.

At 2110, the UE may monitor for a sub-band indication from a base station that indicates a first sub-band of a set of available sub-bands in an active bandwidth part for an uplink control channel communication from the UE to the base station within a shared radio frequency spectrum band. The operations of 2110 may be performed according to the methods described herein. In some aspects, aspects of the operations of 2110 may be performed by a sub-band manager as described with reference to FIGS. 8 through 11. In some cases, the first sub-band is one of a lowest sub-band of the active bandwidth part, a sub-band used to receive an SSB from the base station, a sub-band indicated in a PBCH received from the base station, a sub-band indicated in an RMSI communication received from the base station, a sub-band used to transmit the fallback downlink control information communication, or a lowest sub-band used to transmit the fallback downlink control information communication.

At 2115, the UE may receive, from the base station, a fallback downlink control information communication that provides a downlink grant to the UE for a first downlink communication, where the fallback downlink control information communication has a predetermined number of bits. The operations of 2115 may be performed according to the methods described herein. In some aspects, aspects of the operations of 2115 may be performed by a DCI manager as described with reference to FIGS. 8 through 11.

At 2120, the UE may receive, from the base station, the first downlink communication. The operations of 2120 may be performed according to the methods described herein. In some aspects, aspects of the operations of 2120 may be performed by a downlink transmission manager as described with reference to FIGS. 8 through 11.

At 2125, the UE may determine, based on the first downlink communication, uplink control channel information to be provided in the uplink control channel communication. The operations of 2125 may be performed according to the methods described herein. In some aspects, aspects of the operations of 2125 may be performed by an acknowledgment feedback manager as described with reference to FIGS. 8 through 11.

At 2130, the UE may transmit, to the base station, the uplink control channel communication via the first sub-band. The operations of 2130 may be performed according to the methods described herein. In some aspects, aspects of the operations of 2130 may be performed by an uplink transmission manager as described with reference to FIGS. 8 through 11.

FIG. 22 shows a flowchart illustrating a method 2200 that supports sub-band indication in downlink control information in shared radio frequency spectrum in accordance with aspects of the present disclosure. The operations of method 2200 may be implemented by a UE 115 or its components as described herein. In some aspects, the operations of method 2200 may be performed by a communications manager as described with reference to FIGS. 8 through 11. In some aspects, a UE may execute a set of instructions to control the functional elements of the UE to perform the functions described herein. Additionally or alternatively, a UE may perform aspects of the functions described herein using special-purpose hardware.

At 2205, the UE may receive, from a base station, a fallback downlink control information communication that provides a downlink grant to the UE for a first downlink communication within a shared radio frequency spectrum band, where the fallback downlink control information communication has a predetermined number of bits. The operations of 2205 may be performed according to the methods described herein. In some aspects, aspects of the operations of 2205 may be performed by a DCI manager as described with reference to FIGS. 8 through 11.

At 2210, the UE may determine, based on a sub-band information field within the fallback downlink control information communication, one or more sub-bands of a set of available sub-bands in an active bandwidth part for an uplink control channel communication associated with the downlink grant, where the predetermined number of bits of the fallback downlink control information communication is maintained even though the sub-band information field is included within the fallback downlink control information communication. The operations of 2210 may be performed according to the methods described herein. In some aspects, aspects of the operations of 2210 may be performed by a sub-band manager as described with reference to FIGS. 8 through 11.

At 2215, the UE may receive, from the base station, the first downlink communication. The operations of 2215 may be performed according to the methods described herein. In some aspects, aspects of the operations of 2215 may be performed by a downlink transmission manager as described with reference to FIGS. 8 through 11.

At 2220, the UE may determine, based on the first downlink communication, uplink control channel information to be provided in the uplink control channel communication. The operations of 2220 may be performed according to the methods described herein. In some aspects, aspects of the operations of 2220 may be performed by an acknowledgment feedback manager as described with reference to FIGS. 8 through 11.

At 2225, the UE may transmit, to the base station, the uplink control channel communication via the determined one or more sub-bands. The operations of 2225 may be performed according to the methods described herein. In some aspects, aspects of the operations of 2225 may be performed by an uplink transmission manager as described with reference to FIGS. 8 through 11.

FIG. 23 shows a flowchart illustrating a method 2300 that supports sub-band indication in downlink control information in shared radio frequency spectrum in accordance with aspects of the present disclosure. The operations of method 2300 may be implemented by a UE 115 or its components as described herein. In some aspects, the operations of method 2300 may be performed by a communications manager as described with reference to FIGS. 8 through 11. In some aspects, a UE may execute a set of instructions to control the functional elements of the UE to perform the functions described herein. Additionally or alternatively, a UE may perform aspects of the functions described herein using special-purpose hardware.

At 2305, the UE may receive, from the base station, configuration information that indicates that the fallback downlink control information communication includes the sub-band information field. The operations of 2305 may be performed according to the methods described herein. In some aspects, aspects of the operations of 2305 may be performed by a configuration manager as described with reference to FIGS. 8 through 11. In some cases, the configuration information indicates that a PUCCH resource indicator (PRI) field in the fallback downlink control information communication provides the sub-band information. In some cases, the configuration information is received in RRC signaling, in RMSI signaling, in a PBCH transmission, or any combinations thereof.

At 2310, the UE may receive, from a base station, a fallback downlink control information communication that provides a downlink grant to the UE for a first downlink communication within a shared radio frequency spectrum band, where the fallback downlink control information communication has a predetermined number of bits. The operations of 2310 may be performed according to the methods described herein. In some aspects, aspects of the operations of 2310 may be performed by a DCI manager as described with reference to FIGS. 8 through 11.

At 2315, the UE may determine, based on a sub-band information field within the fallback downlink control information communication, one or more sub-bands of a set of available sub-bands in an active bandwidth part for an uplink control channel communication associated with the downlink grant, where the predetermined number of bits of the fallback downlink control information communication is maintained even though the sub-band information field is included within the fallback downlink control information communication. The operations of 2315 may be performed according to the methods described herein. In some aspects, aspects of the operations of 2315 may be performed by a sub-band manager as described with reference to FIGS. 8 through 11.

At 2320, the UE may receive, from the base station, the first downlink communication. The operations of 2320 may be performed according to the methods described herein. In some aspects, aspects of the operations of 2320 may be performed by a downlink transmission manager as described with reference to FIGS. 8 through 11.

At 2325, the UE may determine, based on the first downlink communication, uplink control channel information to be provided in the uplink control channel communication. The operations of 2325 may be performed according to the methods described herein. In some aspects, aspects of the operations of 2325 may be performed by an acknowledgment feedback manager as described with reference to FIGS. 8 through 11.

At 2330, the UE may transmit, to the base station, the uplink control channel communication via the determined one or more sub-bands. The operations of 2330 may be performed according to the methods described herein. In some aspects, aspects of the operations of 2330 may be performed by an uplink transmission manager as described with reference to FIGS. 8 through 11.

FIG. 24 shows a flowchart illustrating a method 2400 that supports sub-band indication in downlink control information in shared radio frequency spectrum in accordance with aspects of the present disclosure. The operations of method 2400 may be implemented by a base station 105 or its components as described herein. In some aspects, the operations of method 2400 may be performed by a communications manager as described with reference to FIGS. 12 through 15. In some aspects, a base station may execute a set of instructions to control the functional elements of the base station to perform the functions described herein. Additionally or alternatively, a base station may perform aspects of the functions described herein using special-purpose hardware.

At 2405, the base station may identify one or more sub-bands of a set of available sub-bands in an active bandwidth part for an uplink communication from a UE within a shared radio frequency spectrum band. The operations of 2405 may be performed according to the methods described herein. In some aspects, aspects of the operations of 2405 may be performed by a sub-band manager as described with reference to FIGS. 12 through 15.

At 2410, the base station may transmit a fallback downlink control information communication to the UE that provides an uplink grant for the uplink communication and indicates the one or more sub-bands, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication. The operations of 2410 may be performed according to the methods described herein. In some aspects, aspects of the operations of 2410 may be performed by a DCI manager as described with reference to FIGS. 12 through 15.

At 2415, the base station may monitor the one or more sub-bands for the uplink communication from the base station. The operations of 2415 may be performed according to the methods described herein. In some aspects, aspects of the operations of 2415 may be performed by an uplink transmission manager as described with reference to FIGS. 12 through 15.

FIG. 25 shows a flowchart illustrating a method 2500 that supports sub-band indication in downlink control information in shared radio frequency spectrum in accordance with aspects of the present disclosure. The operations of method 2500 may be implemented by a base station 105 or its components as described herein. In some aspects, the operations of method 2500 may be performed by a communications manager as described with reference to FIGS. 12 through 15. In some aspects, a base station may execute a set of instructions to control the functional elements of the base station to perform the functions described herein. Additionally or alternatively, a base station may perform aspects of the functions described herein using special-purpose hardware.

At 2505, the base station may transmit a sub-band indication to a UE that indicates a first sub-band of a set of available sub-bands in an active bandwidth part for an uplink communication from the UE to the base station within a shared radio frequency spectrum band. The operations of 2505 may be performed according to the methods described herein. In some aspects, aspects of the operations of 2505 may be performed by a sub-band manager as described with reference to FIGS. 12 through 15.

At 2510, the base station may transmit, to the UE, a fallback downlink control information communication that provides an uplink grant to the UE for the uplink communication, where the fallback downlink control information communication has a predetermined number of bits. The operations of 2510 may be performed according to the methods described herein. In some aspects, aspects of the operations of 2510 may be performed by a DCI manager as described with reference to FIGS. 12 through 15.

At 2515, the base station may monitor the first sub-band for the uplink communication from the UE. The operations of 2515 may be performed according to the methods described herein. In some aspects, aspects of the operations of 2515 may be performed by an uplink transmission manager as described with reference to FIGS. 12 through 15.

FIG. 26 shows a flowchart illustrating a method 2600 that supports sub-band indication in downlink control information in shared radio frequency spectrum in accordance with aspects of the present disclosure. The operations of method 2600 may be implemented by a base station 105 or its components as described herein. In some aspects, the operations of method 2600 may be performed by a communications manager as described with reference to FIGS. 12 through 15. In some aspects, a base station may execute a set of instructions to control the functional elements of the base station to perform the functions described herein. Additionally or alternatively, a base station may perform aspects of the functions described herein using special-purpose hardware.

At 2605, the base station may transmit, to a UE, a sub-band indication that indicates a first sub-band of a set of available sub-bands in an active bandwidth part for an uplink control channel communication from the UE to the base station within a shared radio frequency spectrum band. The operations of 2605 may be performed according to the methods described herein. In some aspects, aspects of the operations of 2605 may be performed by a sub-band manager as described with reference to FIGS. 12 through 15.

At 2610, the base station may transmit, to the UE, a fallback downlink control information communication that provides a downlink grant to the UE for a first downlink communication, where the fallback downlink control information communication has a predetermined number of bits. The operations of 2610 may be performed according to the methods described herein. In some aspects, aspects of the operations of 2610 may be performed by a DCI manager as described with reference to FIGS. 12 through 15.

At 2615, the base station may transmit the first downlink communication to the UE based on the downlink grant. The operations of 2615 may be performed according to the methods described herein. In some aspects, aspects of the operations of 2615 may be performed by a downlink transmission manager as described with reference to FIGS. 12 through 15.

At 2620, the base station may monitor the first sub-band for the uplink control channel communication from the UE. The operations of 2620 may be performed according to the methods described herein. In some aspects, aspects of the operations of 2620 may be performed by an uplink transmission manager as described with reference to FIGS. 12 through 15.

FIG. 27 shows a flowchart illustrating a method 2700 that supports sub-band indication in downlink control information in shared radio frequency spectrum in accordance with aspects of the present disclosure. The operations of method 2700 may be implemented by a base station 105 or its components as described herein. In some aspects, the operations of method 2700 may be performed by a communications manager as described with reference to FIGS. 12 through 15. In some aspects, a base station may execute a set of instructions to control the functional elements of the base station to perform the functions described herein. Additionally or alternatively, a base station may perform aspects of the functions described herein using special-purpose hardware.

At 2705, the base station may identify one or more sub-bands of a set of available sub-bands in an active bandwidth part for an uplink control channel communication from a UE within a shared radio frequency spectrum band. The operations of 2705 may be performed according to the methods described herein. In some aspects, aspects of the operations of 2705 may be performed by a sub-band manager as described with reference to FIGS. 12 through 15.

At 2710, the base station may transmit a fallback downlink control information communication to the UE that provides a downlink grant to the UE for a first downlink communication, where the fallback downlink control information communication includes a sub-band information field that indicates the one or more sub-bands, and where the fallback downlink control information communication has a predetermined number of bits, where the predetermined number of bits of the fallback downlink control information communication is maintained even though the sub-band information field is included within the fallback downlink control information communication. The operations of 2710 may be performed according to the methods described herein. In some aspects, aspects of the operations of 2710 may be performed by a DCI manager as described with reference to FIGS. 12 through 15.

At 2715, the base station may transmit the first downlink communication to the UE. The operations of 2715 may be performed according to the methods described herein. In some aspects, aspects of the operations of 2715 may be performed by a downlink transmission manager as described with reference to FIGS. 12 through 15.

At 2720, the base station may monitor the one or more sub-bands for the uplink control channel communication from the UE. The operations of 2720 may be performed according to the methods described herein. In some aspects, aspects of the operations of 2720 may be performed by an uplink transmission manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method of wireless communication implemented by a UE, comprising: receiving, from a base station, a fallback downlink control information communication that provides an uplink grant to the UE within a shared radio frequency spectrum band, wherein the fallback downlink control information communication has a predetermined number of bits; determining, based at least in part on a sub-band information field within the fallback downlink control information communication, one or more sub-bands of a plurality of available sub-bands in an active bandwidth part for an uplink communication associated with the uplink grant, wherein the predetermined number of bits of the fallback downlink control information communication is maintained even though the sub-band information field is included within the fallback downlink control information communication; and transmitting, to the base station, the uplink communication via the determined one or more sub-bands.

Aspect 2: The method of aspect 1, wherein the fallback downlink control information communication has a fallback downlink control information format, and the predetermined number of bits is based at least in part on a length of a separate fallback downlink control information format for a downlink grant to the UE.

Aspect 3: The method of aspect 2, further comprising: receiving, from the base station, configuration information that indicates whether the fallback downlink control information communication includes the sub-band information field.

Aspect 4: The method of aspect 3, wherein the configuration information is received in radio resource control signaling, in remaining minimum system information signaling, in a physical broadcast channel transmission, or any combinations thereof.

Aspect 5: The method of any of aspects 3 through 4, wherein the sub-band information field is located adjacent to a frequency division multiplexing resource assignment field in the fallback downlink control information communication, or is located subsequent to a latest information field in the fallback downlink control information communication that is present in an absence of the sub-band information field from the fallback downlink control information communication.

Aspect 6: The method of any of aspects 3 through 5, wherein the sub-band information field occupies one or more bits that are used as zero-padding bits when the sub-band information field is absent from the fallback downlink control information communication.

Aspect 7: The method of any of aspects 1 through 6, wherein a number of bits in the sub-band information field is determined based at least in part on a number of sub-bands of the plurality of available sub-bands.

Aspect 8: The method of aspect 7, wherein the number of bits in the sub-band information field corresponds to a number of sub-bands in the active bandwidth part, a number of sub-bands in an initial bandwidth part used to establish a connection between the UE and the base station, is a predetermined number of sub-bands, is based at least in part on a maximum number of sub-bands that is supported in a largest configurable bandwidth, or any combinations thereof.

Aspect 9: The method of any of aspects 1 through 8, wherein the sub-band information field is a bitmap having a bit length that corresponds to a number of sub-bands of the plurality of available sub-bands.

Aspect 10: The method of any of aspects 1 through 9, wherein the sub-band information field is a bitfield, and different available values of the bitfield are mapped to different contiguous sets of sub-bands.

Aspect 11: A method of wireless communication implemented by a UE, comprising: monitoring for a sub-band indication from a base station that indicates a first sub-band of a plurality of available sub-bands in an active bandwidth part for an uplink communication from the UE to the base station within a shared radio frequency spectrum band; receiving, from the base station, a fallback downlink control information communication that provides an uplink grant to the UE for the uplink communication, wherein the fallback downlink control information communication has a predetermined number of bits; determining, based at least in part on the monitored signaling from the base station, that the first sub-band is to be used for the uplink communication; and transmitting, to the base station, the uplink communication via the first sub-band responsive to receiving the uplink grant.

Aspect 12: The method of aspect 11, wherein the first sub-band is a lowest sub-band of the active bandwidth part, or a sub-band used to receive a synchronization signal block from the base station, or a sub-band indicated in a physical broadcast channel received from the base station, or a sub-band indicated in a remaining minimum system information communication received from the base station, or a sub-band used to transmit the fallback downlink control information communication, or a lowest sub-band used to transmit the fallback downlink control information communication, or a combination thereof.

Aspect 13: A method of wireless communication implemented by a UE, comprising: identifying one or more sub-bands of a plurality of available sub-bands in an active bandwidth part for an uplink control channel communication associated with a downlink grant; receiving, from a base station, a fallback downlink control information communication that provides the downlink grant to the UE for a first downlink communication, wherein the fallback downlink control information communication has a predetermined number of bits; receiving, from the base station, the first downlink communication; determining, based at least in part on the first downlink communication, uplink control channel information to be provided in the uplink control channel communication; and transmitting, to the base station, the uplink control channel communication via the one or more sub-bands.

Aspect 14: The method of aspect 13, wherein identifying the one or more sub-bands further comprises: monitoring for a sub-band indication from the base station that indicates a first sub-band of the plurality of available sub-bands in the active bandwidth part for the uplink control channel communication from the UE to the base station, wherein the first sub-band is one of the one or more sub-bands.

Aspect 15: The method of any of aspects 13 through 14, wherein identifying the one or more sub-bands further comprises: determining the one or more sub-bands based at least in part on a sub-band information field with the fallback downlink control information communication, wherein the predetermined number of bits of the fallback downlink control information communication is maintained even though the sub-band information field is included within the fallback downlink control information communication.

Aspect 16: The method of any of aspects 13 through 15, wherein the configuration information and a physical uplink control channel resource indicator field in the fallback downlink control information communication is indicative of the one or more sub-bands.

Aspect 17: The method of aspect 16, wherein the configuration information is received in radio resource control signaling, in remaining minimum system information signaling, in a physical broadcast channel transmission, or any combinations thereof.

Aspect 18: The method of any of aspects 13 through 17, further comprising: receiving, from the base station, configuration information that comprises information for a sub-band indication from the base station.

Aspect 19: The method of any of aspects 13 through 18, wherein a first sub-band of the one or more sub-bands is a lowest sub-band of the active bandwidth part, or a sub-band used to receive a synchronization signal block from the base station, or a sub-band indicated in a physical broadcast channel received from the base station, or a sub-band indicated in a remaining minimum system information communication received from the base station, or a sub-band used to transmit the fallback downlink control information communication, or a lowest sub-band used to transmit the fallback downlink control information communication, or a combination thereof.

Aspect 20: The method of any of aspects 13 through 19, wherein the fallback downlink control information communication has a fallback downlink control information format which is indicative that the UE is to identify the one or more sub-bands by monitoring for a sub-band indication.

Aspect 21: The method of any of aspects 13 through 20, further comprising: receiving, from the base station, configuration information that indicates that the fallback downlink control information communication includes a sub-band information field.

Aspect 22: The method of aspect 21, wherein the configuration information indicates that a PUCCH resource indicator (PRI) field in the fallback downlink control information communication provides the sub-band information.

Aspect 23: The method of aspect 22, wherein the configuration information is received in RRC signaling, in remaining minimum system information (RMSI) signaling, in a physical broadcast (PBCH) transmission, or any combinations thereof.

Aspect 24: The method of any of aspects 13 through 23, further comprising: receiving, from the base station, configuration information that indicates whether the fallback downlink control information communication includes a sub-band information field.

Aspect 25: The method of aspect 24, wherein the configuration information is received in radio resource control signaling, in remaining minimum system information signaling, in a physical broadcast channel transmission, or any combinations thereof.

Aspect 26: An apparatus comprising a processor; memory coupled with the processor; and instructions stored in the memory and executable by the processor to cause the apparatus to perform a method of any of aspects 1 through 10.

Aspect 27: An apparatus comprising at least one means for performing a method of any of aspects 1 through 10.

Aspect 28: A non-transitory computer-readable medium storing code the code comprising instructions executable by a processor to perform a method of any of aspects 1 through 10.

Aspect 29: An apparatus comprising a processor; memory coupled with the processor; and instructions stored in the memory and executable by the processor to cause the apparatus to perform a method of any of aspects 11 through 12.

Aspect 30: An apparatus comprising at least one means for performing a method of any of aspects 11 through 12.

Aspect 31: A non-transitory computer-readable medium storing code the code comprising instructions executable by a processor to perform a method of any of aspects 11 through 12.

Aspect 32: An apparatus comprising a processor; memory coupled with the processor; and instructions stored in the memory and executable by the processor to cause the apparatus to perform a method of any of aspects 13 through 25.

Aspect 33: An apparatus comprising at least one means for performing a method of any of aspects 13 through 25.

Aspect 34: A non-transitory computer-readable medium storing code the code comprising instructions executable by a processor to perform a method of any of aspects 13 through 25.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, in some aspects, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. In some aspects, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, micro-controller, or state machine. A processor may also be implemented as a combination of computing devices (e.g., a combination of a DSP and a microprocessor, multiple micro-processors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. In some aspects, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. In some aspects, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, in some aspects, a list of at least one of A, B, or C means A or B or C or AB or AC or BC or ABC (i.e., A and B and C). Also, as used herein, the phrase "based on" shall not be construed as a reference to a closed set of conditions. In some aspects, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication implemented by a user equipment (UE), comprising:
receiving, from a network entity, a fallback downlink control information communication that provides an uplink grant to the UE within a shared radio frequency spectrum band, wherein the fallback downlink control information communication has a predetermined number of bits, wherein the fallback downlink control information communication has a fallback downlink control information format, and wherein the predetermined number of bits is based at least in part on a length of a separate fallback downlink control information format for a downlink grant to the UE;
determining, based at least in part on a sub-band information field within the fallback downlink control information communication, one or more sub-bands of a plurality of available sub-bands in an active bandwidth part for an uplink communication associated with the uplink grant, wherein the predetermined number of bits of the fallback downlink control information communication is maintained even though the sub-band information field is included within the fallback downlink control information communication; and
transmitting, to the network entity, the uplink communication via the determined one or more sub-bands.

2. The method of claim 1, further comprising:
receiving, from the network entity, configuration information that indicates whether the fallback downlink control information communication includes the sub-band information field.

3. The method of claim 2, wherein the configuration information is received in radio resource control signaling, in remaining minimum system information signaling, in a physical broadcast channel transmission, or any combinations thereof.

4. The method of claim 2, wherein the sub-band information field is located adjacent to a frequency division multiplexing resource assignment field in the fallback downlink control information communication, or is located subsequent to a latest information field in the fallback downlink control information communication that is present in an absence of the sub-band information field from the fallback downlink control information communication.

5. The method of claim 2, wherein the sub-band information field occupies one or more bits that are used as zero-padding bits when the sub-band information field is absent from the fallback downlink control information communication.

6. The method of claim 1, wherein a number of bits in the sub-band information field is determined based at least in part on a number of sub-bands of the plurality of available sub-bands.

7. The method of claim 6, wherein the number of bits in the sub-band information field corresponds to a number of sub-bands in the active bandwidth part, a number of sub-bands in an initial bandwidth part used to establish a connection between the UE and the network entity, is a predetermined number of sub-bands, is based at least in part on a maximum number of sub-bands that is supported in a largest configurable bandwidth, or any combinations thereof.

8. The method of claim 1, wherein the sub-band information field is a bitmap having a bit length that corresponds to a number of sub-bands of the plurality of available sub-bands.

9. The method of claim 1, wherein the sub-band information field is a bitfield, and wherein different available values of the bitfield are mapped to different contiguous sets of sub-bands.

10. A method of wireless communication implemented by a user equipment (UE), comprising:
receiving, from a network entity, fallback downlink control information that provides an uplink grant to the UE for an uplink communication, wherein a sub-band on which the fallback downlink control information is received indicates a first sub-band of a plurality of available sub-bands in an active bandwidth part for the uplink communication from the UE to the network entity within a shared radio frequency spectrum band, wherein the first sub-band is a lowest sub-band of multiple subbands used to receive the fallback downlink control information, wherein the fallback downlink control information is received on more than one of the multiple subbands; and
transmitting, to the network entity, the uplink communication via the first sub-band responsive to receiving the uplink grant.

11. A method of wireless communication implemented by a user equipment (UE), comprising:
identifying one or more sub-bands of a plurality of available sub-bands in an active bandwidth part for an uplink control channel communication associated with a downlink grant;

receiving, from a network entity, a fallback downlink control information communication that provides the downlink grant to the UE for a first downlink communication, wherein the fallback downlink control information communication has a predetermined number of bits;

receiving, from the network entity, the first downlink communication;

determining, based at least in part on the first downlink communication, uplink control channel information to be provided in the uplink control channel communication; and transmitting, to the network entity, the uplink control channel communication via the one or more sub-bands.

12. The method of claim 11, wherein identifying the one or more sub-bands further comprises:

monitoring for a sub-band indication from the network entity that indicates a first sub-band of the plurality of available sub-bands in the active bandwidth part for the uplink control channel communication from the UE to the network entity, wherein the first sub-band is one of the one or more sub-bands.

13. The method of claim 11, wherein identifying the one or more sub-bands further comprises:

determining the one or more sub-bands based at least in part on a sub-band information field with the fallback downlink control information communication, wherein the predetermined number of bits of the fallback downlink control information communication is maintained even though the sub-band information field is included within the fallback downlink control information communication.

14. The method of claim 11, wherein configuration information and a physical uplink control channel resource indicator field in the fallback downlink control information communication is indicative of the one or more sub-bands.

15. The method of claim 11, further comprising:

receiving, from the network entity, configuration information that comprises information for a sub-band indication from the network entity.

16. The method of claim 15, wherein the configuration information is received in radio resource control signaling, in remaining minimum system information signaling, in a physical broadcast channel transmission, or any combinations thereof.

17. The method of claim 11, wherein a first sub-band of the one or more sub-bands is a lowest sub-band of the active bandwidth part, or a sub-band used to receive a synchronization signal block from the network entity, or a sub-band indicated in a physical broadcast channel received from the network entity, or a sub-band indicated in a remaining minimum system information communication received from the network entity, or a sub-band used to transmit the fallback downlink control information communication, or a lowest sub-band used to transmit the fallback downlink control information communication, or a combination thereof.

18. The method of claim 11, wherein the fallback downlink control information communication has a fallback downlink control information format which is indicative that the UE is to identify the one or more sub-bands by monitoring for a sub-band indication.

19. The method of claim 11, further comprising:

receiving, from the network entity, configuration information that indicates that the fallback downlink control information communication includes a sub-band information field.

20. The method of claim 19, wherein the configuration information indicates that a physical uplink control channel (PUCCH) resource indicator (PRI) field in the fallback downlink control information communication provides sub-band information.

21. The method of claim 20, wherein the configuration information is received in radio resource control (RRC) signaling, in remaining minimum system information (RMSI) signaling, in a physical broadcast (PBCH) transmission, or any combinations thereof.

22. The method of claim 11, further comprising:

receiving, from the network entity, configuration information that indicates whether the fallback downlink control information communication includes a sub-band information field.

23. The method of claim 22, wherein the configuration information is received in radio resource control signaling, in remaining minimum system information signaling, in a physical broadcast channel transmission, or any combinations thereof.

24. An apparatus for wireless communication at a user equipment (UE), comprising:

one or more memories storing processor-executable code; and one or more processors coupled with the one or more memories and operable to execute the code to cause the one or more processors, individually or collectively, to:

receive, from a network entity, a fallback downlink control information communication that provides an uplink grant to the UE within a shared radio frequency spectrum band, wherein the fallback downlink control information communication has a predetermined number of bits, wherein the fallback downlink control information communication has a fallback downlink control information format, and wherein the predetermined number of bits is based at least in part on a length of a separate fallback downlink control information format for a downlink grant to the UE;

determine, based at least in part on a sub-band information field within the fallback downlink control information communication, one or more sub-bands of a plurality of available sub-bands in an active bandwidth part for an uplink communication associated with the uplink grant, wherein the predetermined number of bits of the fallback downlink control information communication is maintained even though the sub-band information field is included within the fallback downlink control information communication; and transmit, to the network entity, the uplink communication via the determined one or more sub-bands.

25. The apparatus of claim 24, wherein the one or more processors are further operable to execute the code to cause the one or more processors, individually or collectively, to:

receive, from the network entity, configuration information that indicates whether the fallback downlink control information communication includes the sub-band information field.

26. The apparatus of claim 25, wherein the sub-band information field is located adjacent to a frequency division multiplexing resource assignment field in the fallback downlink control information communication, or is located subsequent to a latest information field in the fallback downlink control information communication that is present in an absence of the sub-band information field from the fallback downlink control information communication.

27. The apparatus of claim 25, wherein the sub-band information field occupies one or more bits that are used as zero-padding bits when the sub-band information field is absent from the fallback downlink control information communication.

28. A user equipment (UE) for wireless communication, comprising:

one or more memories storing processor-executable code; and one or more processors coupled with the one or more memories and operable to execute the code to cause the one or more processors, individually or collectively, to:

receive, from a network entity, fallback downlink control information that provides an uplink grant to the UE for an uplink communication, wherein a sub-band on which the fallback downlink control information is received indicates a first sub-band of a plurality of available sub-bands in an active bandwidth part for the uplink communication from the UE to the network entity within a shared radio frequency spectrum band, wherein the first sub-band is a lowest sub-band of multiple subbands used to receive the fallback downlink control information, wherein the fallback downlink control information is received on more than one of the multiple subbands; and transmitting, to the network entity, the uplink communication via the first sub-band responsive to receiving the uplink grant.

* * * * *